(12) United States Patent
Mark et al.

(10) Patent No.: US 11,420,382 B2
(45) Date of Patent: *Aug. 23, 2022

(54) APPARATUS FOR FIBER REINFORCED ADDITIVE MANUFACTURING

(71) Applicant: MARKFORGED, INC., Watertown, MA (US)

(72) Inventors: Gregory Thomas Mark, Brookline, MA (US); Antoni S. Gozdz, Acton, MA (US)

(73) Assignee: MARKFORGED, INC., Watertown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/840,868

(22) Filed: Apr. 6, 2020

(65) Prior Publication Data

US 2020/0324461 A1 Oct. 15, 2020

Related U.S. Application Data

(63) Continuation of application No. 15/445,227, filed on Feb. 28, 2017, now Pat. No. 10,611,082, which is a
(Continued)

(51) Int. Cl.
*B29C 64/118* (2017.01)
*B29C 64/321* (2017.01)
(Continued)

(52) U.S. Cl.
CPC .......... *B29C 64/118* (2017.08); *B29C 64/209* (2017.08); *B29C 64/295* (2017.08);
(Continued)

(58) Field of Classification Search
CPC ... B29C 64/118; B29C 64/321; B29C 64/209; B29C 64/393; B33Y 30/00; B33Y 50/02; B33Y 70/00
See application file for complete search history.

(56) References Cited

U.S. PATENT DOCUMENTS 4,291,841 A 9/1981 Dalrymple et al.
4,720,251 A 1/1988 Mallay et al.
(Continued)

FOREIGN PATENT DOCUMENTS

CN 1659320 A 8/2005
CN 101133107 A 2/2008
(Continued)

OTHER PUBLICATIONS

"List of thermal conductives" https://en.wikipedia.org/wiki/List_of_thermal_conductivities, accessed Mar. 27, 2019 (Year: 2019).
(Continued)

*Primary Examiner* — Jerzi H Moreno Hernandez
(74) *Attorney, Agent, or Firm* — Lando & Anastasi, LLP

(57) ABSTRACT

Methods for additive manufacturing using a three-dimensional printer including at least one linear feed mechanism and a print head positioned proximate a build platen are disclosed. The methods include a step of providing and/or feeding an unmelted fiber reinforced composite filament at a feed rate by the at least one linear feed mechanism. The methods include heating the filament to a temperature at which a matrix material therein flows within at least one rounded outlet of the print head. The methods include moving the print head and the build platen relative to one another at a printing rate. The methods include applying a spreading force to the filament between the at least one rounded outlet of the print head and the build platen. The methods include a step of controlling a differential in the feed rate and printing rate using the at least one linear feed mechanism so that the feed rate and the printing rate are substantially the same.

19 Claims, 29 Drawing Sheets

Related U.S. Application Data continuation of application No. 14/333,947, filed on Jul. 17, 2014, now Pat. No. 9,579,851, which is a continuation-in-part of application No. 14/297,437, filed on Jun. 5, 2014, now Pat. No. 9,370,896, which is a continuation-in-part of application No. 14/222,318, filed on Mar. 21, 2014, now abandoned, said application No. 14/297,437 is a continuation-in-part of application No. 14/222,318, filed on Mar. 21, 2014, now abandoned.

(60) Provisional application No. 61/907,431, filed on Nov. 22, 2013, provisional application No. 61/902,256, filed on Nov. 10, 2013, provisional application No. 61/883,440, filed on Sep. 27, 2013, provisional application No. 61/881,946, filed on Sep. 24, 2013, provisional application No. 61/880,129, filed on Sep. 19, 2013, provisional application No. 61/878,029, filed on Sep. 15, 2013, provisional application No. 61/847,113, filed on Jul. 17, 2013, provisional application No. 61/831,600, filed on Jun. 5, 2013, provisional application No. 61/815,531, filed on Apr. 24, 2013, provisional application No. 61/804,235, filed on Mar. 22, 2013.

(51) Int. Cl.
  *B33Y 50/02* (2015.01)
  *B29C 64/209* (2017.01)
  *B29C 64/393* (2017.01)
  *B33Y 30/00* (2015.01)
  *B33Y 70/00* (2020.01)
  *B29C 64/295* (2017.01)

(52) U.S. Cl.
  CPC .......... *B29C 64/321* (2017.08); *B29C 64/393* (2017.08); *B33Y 30/00* (2014.12); *B33Y 50/02* (2014.12); *B33Y 70/00* (2014.12)

(56) References Cited

U.S. PATENT DOCUMENTS

| | | |
|---|---|---|
| 5,002,712 A | 3/1991 | Goldmann et al. |
| 5,037,691 A | 8/1991 | Medney et al. |
| 5,096,530 A | 3/1992 | Cohen |
| 5,121,329 A | 6/1992 | Crump |
| 5,155,324 A | 10/1992 | Deckard et al. |
| 5,340,433 A | 8/1994 | Crump |
| 5,447,793 A | 9/1995 | Montsinger |
| 5,764,521 A | 6/1998 | Batchelder et al. |
| 5,866,058 A | 2/1999 | Batchelder et al. |
| 5,885,316 A | 3/1999 | Sato et al. |
| 5,906,863 A | 5/1999 | Lombardi et al. |
| 5,936,861 A | 8/1999 | Jang et al. |
| 5,955,119 A | 9/1999 | Andris et al. |
| 6,054,077 A | 4/2000 | Comb et al. |
| 6,080,343 A | 6/2000 | Kaufman et al. |
| 6,085,957 A | 7/2000 | Zinniel et al. |
| 6,099,783 A | 8/2000 | Scranton et al. |
| 6,129,872 A | 10/2000 | Jang |
| 6,153,034 A | 11/2000 | Lipsker |
| 6,214,279 B1 | 4/2001 | Yang et al. |
| 6,363,606 B1 | 4/2002 | Johnson, Jr. et al. |
| 6,372,178 B1 | 4/2002 | Tseng |
| 6,421,820 B1 | 7/2002 | Mansfield et al. |
| 6,504,127 B1 | 1/2003 | McGregor et al. |
| 6,547,210 B1 | 4/2003 | Marx et al. |
| 6,823,230 B1 | 11/2004 | Jamalabad et al. |
| 6,859,681 B1 | 2/2005 | Alexander |
| 6,934,600 B2 | 8/2005 | Jang et al. |
| 6,986,739 B2 | 1/2006 | Warren et al. |
| 7,020,539 B1 | 3/2006 | Kovacevic et al. |
| 7,083,697 B2 | 8/2006 | Dao et al. |
| 7,127,309 B2 | 10/2006 | Dunn et al. |
| 7,625,200 B2 | 12/2009 | Leavitt |
| 8,050,786 B2 | 11/2011 | Holzwarth |
| 8,066,842 B2 | 11/2011 | Farmer et al. |
| 8,221,669 B2 | 7/2012 | Batchelder et al. |
| 8,295,972 B2 | 10/2012 | Coleman et al. |
| 8,815,141 B2 | 8/2014 | Swanson et al. |
| 8,827,684 B1 | 9/2014 | Schumacher et al. |
| 8,916,085 B2 | 12/2014 | Jackson et al. |
| 8,920,697 B2 | 12/2014 | Mikulak et al. |
| 9,126,365 B1 | 9/2015 | Mark et al. |
| 9,126,367 B1 | 9/2015 | Mark et al. |
| 9,156,205 B2 | 10/2015 | Mark et al. |
| 9,207,540 B1 | 12/2015 | Bhargava et al. |
| 9,327,453 B2 | 5/2016 | Mark et al. |
| 9,370,896 B2 | 6/2016 | Mark |
| 9,427,399 B2 | 8/2016 | Adams et al. |
| 9,511,544 B2 | 12/2016 | Hemingway et al. |
| 9,579,851 B2 * | 2/2017 | Mark .................... B29C 64/118 |
| 9,694,544 B2 | 7/2017 | Mark et al. |
| 9,849,631 B1 | 12/2017 | Goss et al. |
| 10,029,415 B2 | 7/2018 | Swanson et al. |
| 10,059,057 B2 | 8/2018 | Schirtzinger et al. |
| 10,061,301 B2 | 8/2018 | Burton |
| 10,076,876 B2 | 9/2018 | Mark et al. |
| 10,118,375 B2 | 11/2018 | Hickman et al. |
| 10,131,088 B1 | 11/2018 | Tyler et al. |
| 10,160,193 B2 | 12/2018 | Nielsen-Cole et al. |
| 10,254,499 B1 | 4/2019 | Cohen et al. |
| 10,293,594 B2 | 5/2019 | Gardiner |
| 10,414,147 B2 | 9/2019 | Sweeney et al. |
| 10,611,082 B2 * | 4/2020 | Mark .................... B29C 64/393 |
| 2001/0030383 A1 * | 10/2001 | Swanson ................ B33Y 30/00 |
| | | 264/308 |
| 2002/0009935 A1 | 1/2002 | Hsiao et al. |
| 2002/0062909 A1 | 5/2002 | Jang et al. |
| 2002/0079607 A1 | 6/2002 | Hawley et al. |
| 2002/0102322 A1 | 8/2002 | Gunther |
| 2002/0113331 A1 | 8/2002 | Zhang et al. |
| 2002/0165304 A1 | 11/2002 | Mulligan et al. |
| 2002/0172817 A1 | 11/2002 | Owens |
| 2003/0044593 A1 | 3/2003 | Vaidyanathan et al. |
| 2003/0056870 A1 | 3/2003 | Comb et al. |
| 2003/0090034 A1 | 5/2003 | Mulhaupt et al. |
| 2003/0186042 A1 | 10/2003 | Dunlap et al. |
| 2003/0236588 A1 | 12/2003 | Jang et al. |
| 2004/0067711 A1 | 4/2004 | Bliton et al. |
| 2004/0124146 A1 | 7/2004 | Dao et al. |
| 2004/0140078 A1 | 7/2004 | Liu et al. |
| 2004/0166140 A1 | 8/2004 | Santini et al. |
| 2004/0253365 A1 | 12/2004 | Warren et al. |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0156352 A1 | 7/2005 | Burkle et al. |
| 2005/0230029 A1 | 10/2005 | Vaidyanathan et al. |
| 2005/0279185 A1 | 12/2005 | Cook et al. |
| 2006/0047052 A1 | 3/2006 | Barrera et al. |
| 2007/0003650 A1 | 1/2007 | Schroeder |
| 2007/0036964 A1 | 2/2007 | Rosenberger et al. |
| 2007/0151167 A1 | 7/2007 | Cook et al. |
| 2007/0179657 A1 | 8/2007 | Holzwarth |
| 2007/0225856 A1 | 9/2007 | Slaughter et al. |
| 2007/0228592 A1 | 10/2007 | Dunn et al. |
| 2007/0252871 A1 | 11/2007 | Silverbrook |
| 2008/0176092 A1 | 7/2008 | Owens |
| 2008/0206394 A1 | 8/2008 | Bouti |
| 2008/0251975 A1 | 10/2008 | Gallagher et al. |
| 2008/0274229 A1 | 11/2008 | Barnett |
| 2009/0022615 A1 | 1/2009 | Entezarian |
| 2009/0054552 A1 | 2/2009 | Yano et al. |
| 2009/0065965 A1 | 3/2009 | Bowen |
| 2009/0092833 A1 | 4/2009 | Schmitt et al. |
| 2009/0095410 A1 | 4/2009 | Oldani |
| 2009/0174709 A1 | 7/2009 | Kozlak et al. |
| 2009/0199948 A1 | 8/2009 | Kisch |
| 2009/0220632 A1 | 9/2009 | Haque |
| 2009/0234616 A1 | 9/2009 | Perkins |

(56) References Cited

U.S. PATENT DOCUMENTS

| | | |
|---|---|---|
| 2010/0024987 A1 | 2/2010 | Saine et al. |
| 2010/0028641 A1 | 2/2010 | Zhu et al. |
| 2010/0151072 A1 | 6/2010 | Scheurich |
| 2010/0191360 A1 | 7/2010 | Napadensky et al. |
| 2010/0203351 A1 | 8/2010 | Nayfeh |
| 2010/0243764 A1 | 9/2010 | Okesaku et al. |
| 2011/0001264 A1 | 1/2011 | Minoura et al. |
| 2011/0032301 A1 | 2/2011 | Fienup et al. |
| 2011/0070394 A1 | 3/2011 | Hopkins et al. |
| 2011/0143108 A1 | 6/2011 | Fruth et al. |
| 2011/0178621 A1 | 7/2011 | Heide |
| 2011/0222081 A1 | 9/2011 | Yi et al. |
| 2011/0230111 A1 | 9/2011 | Weir et al. |
| 2011/0289791 A1 | 12/2011 | Menchik et al. |
| 2012/0060468 A1 | 3/2012 | Dushku et al. |
| 2012/0070523 A1 | 3/2012 | Swanson et al. |
| 2012/0092724 A1 | 4/2012 | Pettis |
| 2012/0140041 A1 | 6/2012 | Burgunder et al. |
| 2012/0144795 A1 | 6/2012 | Knappe |
| 2012/0156445 A1 | 6/2012 | Schmidt et al. |
| 2012/0231225 A1 | 9/2012 | Mikulak et al. |
| 2012/0247655 A1 | 10/2012 | Erb et al. |
| 2013/0004610 A1 | 1/2013 | Hartmann et al. |
| 2013/0075952 A1 | 3/2013 | Seman, Sr. et al. |
| 2013/0164498 A1 | 6/2013 | Langone et al. |
| 2013/0205920 A1 | 8/2013 | Tow |
| 2013/0209600 A1 | 8/2013 | Tow |
| 2013/0221192 A1 | 8/2013 | Rocco et al. |
| 2013/0233471 A1 | 9/2013 | Kappesser et al. |
| 2013/0241102 A1 | 9/2013 | Rodgers et al. |
| 2013/0320467 A1 | 12/2013 | Buchanan et al. |
| 2013/0327917 A1 | 12/2013 | Steiner et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0036035 A1 | 2/2014 | Buser et al. |
| 2014/0039663 A1 | 2/2014 | Boyer et al. |
| 2014/0044822 A1 | 2/2014 | Mulliken |
| 2014/0048969 A1 | 2/2014 | Swanson et al. |
| 2014/0048970 A1 | 2/2014 | Batchelder et al. |
| 2014/0061974 A1 | 3/2014 | Tyler |
| 2014/0065847 A1 | 3/2014 | Salmon et al. |
| 2014/0090528 A1 | 4/2014 | Graf |
| 2014/0120197 A1 | 5/2014 | Swanson et al. |
| 2014/0121813 A1 | 5/2014 | Schmehl |
| 2014/0154347 A1 | 6/2014 | Dilworth et al. |
| 2014/0159284 A1 | 6/2014 | Leavitt |
| 2014/0175706 A1 | 6/2014 | Kritchman |
| 2014/0210137 A1 | 7/2014 | Patterson et al. |
| 2014/0232035 A1 | 8/2014 | Bheda |
| 2014/0265037 A1 | 9/2014 | Stirling et al. |
| 2014/0268604 A1 | 9/2014 | Wicker et al. |
| 2014/0277661 A1 | 9/2014 | Amadio et al. |
| 2014/0287139 A1 | 9/2014 | Farmer et al. |
| 2014/0291886 A1 | 10/2014 | Mark et al. |
| 2014/0322383 A1 | 10/2014 | Rutter |
| 2014/0328963 A1 | 11/2014 | Mark et al. |
| 2014/0328964 A1 | 11/2014 | Mark et al. |
| 2014/0358273 A1 | 12/2014 | LaBossiere et al. |
| 2014/0361460 A1 | 12/2014 | Mark |
| 2015/0014885 A1 | 1/2015 | Hofmann et al. |
| 2015/0037446 A1 | 2/2015 | Douglass et al. |
| 2015/0165666 A1 | 6/2015 | Butcher et al. |
| 2015/0165690 A1 | 6/2015 | Tow |
| 2015/0165691 A1 | 6/2015 | Mark et al. |
| 2015/0183161 A1 | 7/2015 | Molinari et al. |
| 2015/0197063 A1 | 7/2015 | Shinar et al. |
| 2015/0201499 A1 | 7/2015 | Shinar et al. |
| 2015/0239178 A1 | 8/2015 | Armstrong |
| 2015/0242737 A1 | 8/2015 | Glazberg et al. |
| 2015/0266243 A1 | 9/2015 | Mark et al. |
| 2015/0266244 A1 | 9/2015 | Page |
| 2015/0287247 A1 | 10/2015 | Willis et al. |
| 2015/0290875 A1 | 10/2015 | Mark et al. |
| 2015/0298393 A1 | 10/2015 | Suarez |
| 2015/0321427 A1 | 11/2015 | Gunnarsson et al. |
| 2015/0342720 A1 | 12/2015 | Koc et al. |
| 2016/0067927 A1 | 3/2016 | Voris et al. |
| 2016/0068678 A1 | 3/2016 | Luo et al. |
| 2016/0075089 A1 | 3/2016 | Duro Royo et al. |
| 2016/0114432 A1 | 4/2016 | Ferrar et al. |
| 2016/0120040 A1 | 4/2016 | Elmieh et al. |
| 2016/0129634 A1 | 5/2016 | Keicher et al. |
| 2016/0179064 A1 | 6/2016 | Arthur et al. |
| 2016/0192741 A1 | 7/2016 | Mark |
| 2016/0221259 A1 | 8/2016 | Kobida et al. |
| 2016/0257033 A1 | 9/2016 | Jayanti et al. |
| 2016/0263832 A1 | 9/2016 | Bui et al. |
| 2016/0290880 A1 | 10/2016 | Lewis et al. |
| 2016/0303794 A1 | 10/2016 | Atwood et al. |
| 2016/0325491 A1 | 11/2016 | Sweeney et al. |
| 2016/0339633 A1 | 11/2016 | Stolyarov et al. |
| 2016/0346997 A1 | 12/2016 | Lewis et al. |
| 2016/0361873 A1 | 12/2016 | Maier |
| 2017/0021564 A1 | 1/2017 | Ooba et al. |
| 2017/0057164 A1 | 3/2017 | Hemphill et al. |
| 2017/0057170 A1 | 3/2017 | Gupta et al. |
| 2017/0080642 A1 | 3/2017 | Tyler |
| 2017/0087635 A1 | 3/2017 | Wilkes et al. |
| 2017/0106594 A1 | 4/2017 | Gardiner |
| 2017/0129170 A1 | 5/2017 | Kim et al. |
| 2017/0129171 A1 | 5/2017 | Gardner et al. |
| 2017/0136703 A1 | 5/2017 | Hayes et al. |
| 2017/0136707 A1 | 5/2017 | Batchelder et al. |
| 2017/0137955 A1 | 5/2017 | Hofmann et al. |
| 2017/0151713 A1 | 6/2017 | Steele |
| 2017/0173889 A1 | 6/2017 | Thomas-Lepore et al. |
| 2017/0255183 A1 | 9/2017 | Clement et al. |
| 2017/0259502 A1 | 9/2017 | Chapiro et al. |
| 2017/0361497 A1 | 12/2017 | Crescenti Savall et al. |
| 2019/0022922 A1 | 1/2019 | Swanson et al. |
| 2019/0202119 A1 | 7/2019 | Budge |
| 2021/0362406 A1 | 11/2021 | Kim et al. |
| 2022/0063190 A1 | 3/2022 | De Backer et al. |

FOREIGN PATENT DOCUMENTS

| | | |
|---|---|---|
| CN | 101193953 A | 6/2008 |
| CN | 101300299 A | 11/2008 |
| CN | 101484397 A | 7/2009 |
| CN | 101689229 A | 3/2010 |
| CN | 101801647 A | 8/2010 |
| CN | 101815746 A | 8/2010 |
| CN | 102548737 A | 7/2012 |
| CN | 104149339 A | 11/2014 |
| DE | 4102257 A1 | 7/1992 |
| EP | 2762520 A1 | 8/2014 |
| JP | S58-122116 A | 7/1983 |
| JP | 1-266231 A | 10/1989 |
| JP | H7-117141 A | 5/1995 |
| JP | H11207828 A | 8/1999 |
| JP | 2003-534159 A | 11/2003 |
| JP | 2004-331706 A | 11/2004 |
| JP | 2010535117 A | 11/2010 |
| JP | 2012-97449 A | 5/2012 |
| KR | 20100004475 A | 1/2010 |
| KR | 100995983 B1 | 11/2010 |
| KR | 101172859 B1 | 8/2012 |
| WO | 0189714 A1 | 11/2001 |
| WO | 2004050323 A1 | 6/2004 |
| WO | 2009009137 A1 | 1/2009 |
| WO | 2013017284 A2 | 2/2013 |
| WO | 2014028826 A1 | 2/2014 |
| WO | 2014153535 A2 | 9/2014 |
| WO | 2014193505 A1 | 12/2014 |
| WO | 2015042422 A1 | 3/2015 |
| WO | 2015061855 A1 | 5/2015 |
| WO | 2015077262 A1 | 5/2015 |
| WO | 2015120429 A1 | 8/2015 |

(56) References Cited

OTHER PUBLICATIONS

"Printed strain gauges for aircraft load detection using Aerosol Jet printing", Fraunhofer, 39 pages (Year: 2011).
"Sandwich-structured Composite", wikipedia.com, Dec. 29, 2009 version, accessed Apr. 18, 2018 at https://en.Wikipedia.org/w/index.php?title=Sandwich-structured_composite&oldid=334666649 (Year: 2009).
"Thermal Conductivity of Metals", The Engineering Toolbox, http://www.engineeringtoolbox.com/thermal-conductivity-metalsd_858.html, Sep. 15, 2017, 6 pages.
Ahn et al., Anisoptropic material properties of fused deposition modeling ABS, Rapid Prorotyping vol. 8, No. 4, 2002, pp. 248-257.
ATI technical data sheet, ATI metals, Allegheny Technologies Incorporated, https://www.atimetals.com/Products/Documents/ <http://www.atimetals.com/Products/Documents/datasheets/stainless-specialty-steel/martensitic/ati_410_420_425_mod_440a_440c_tds_en2_v2.pdf (Year: 2014).
August et al., Recent Developments in Automated Fiber Placement of Thermoplastic Composites, SAMPE Technical Conference Proceedings, Wichita, KS, Oct. 23, 2013.
Bales, Steven, "Know Your Mold Coatings", Plastics Technology, http://www.ptonlinecom/articles/know-your-mold-coatings, Dec. 1, 2004, 8 pages.
Brett Compton, "3D printing of composites with controlled architecture," Engineering Conferences International, ECI Digital Archives, Composites at Lake Louise (CALL 2015), Fall Nov. 9, 2015, pp. 30.
Compton, B. G. et al., "3D-Printing of Lightweight Cellular Composites," Advanced Materials 2014, vol. 26, pp. 5930-5935.
Dell'Anno et al., Automated Manufacture of 3D Reinforced Aerospace Composite Structures, International Journal of Structural Integrity, 2012, vol. 3, Iss 1, pp. 22-40.
Devlieg et al., High-Speed Fiber Placement on Large Complex Structures, No. 2007-01-3843. SAE International 2007.
Donghong, Ding et al: "A tool-path generation strategy for wire and arc additive manufacturing," The International Journal of Advanced Manufacturing Technology, vol. 73, No. 1-4, Apr. 11, 2014 (Apr. 11, 2014), pp. 173-183, XP055472255, London, ISSN: 0268-3768, DOI: 10.1007/s00170-014-5808-5.
Geek magazine—hacker daily blog "To Skolkovo created the Russia's first composite 3D-printer", Feb. 24, 2015, Retreived from the internet: <http://geek-mag.com/posts/246332/>.
Gray IV, R.W., Baird, D.G. and Bøhn, J.H., 1998. Thermoplastic composites reinforced with long fiber thermotropic liquid crystalline polymers for fused deposition modeling. Polymer composites, 19(4), pp. 383-394. (Year: 1998).
Gray, R.W. IV et al., 1997, Effects of Processing Conditions on Prototypes Reinforced with TLCPs for Fused Deposition Modeling, In 1997 International Solid Freeform Fabrication Symposium (Year: 1998).
Hasenjaeger, Programming and Simulating Automated Fiber Placement (AFP) CNC Machines, SAMPE Journal, vol. 49, No. 6, Nov./Dec. 2013.
Hossain et al., Improving Tensile Mechanical Properties of FDM-Manufactured Specimens via Modifying Build Parameters, Proceedings of Solid Freeform Fabrication Symposium, Austin, Texas, Aug. 16, 2013.
https://community.ultimaker.com/topic/3248-some-questions-on-perimeters-100-infill-extrusion-width/ (Year: 2013).
International Search Report for PCT/US2014/041161 dated Dec. 3, 2014.
Lamontia et al, "Contoured Tape Laying and Fiber Placement Heads for Automated Fiber Placement of Large Composite Aerospace Structures," 34th ISTC, Baltimore, Md, Nov. 4-7, 2002.
Lantern Robotics (https://www.fabbaloo.eom/blog/2014/4/18/how-to-make-any-3d-printed-part-much-stronger and see https:// imgur.com/a/EHxkE & https://www.reddit.eom/r/3Dprinting/comments/22jwlm/injecting_hot_melt_adhesive_for_100_solid_faster/ (Year: 2014).
Liu et al., "Wear of Materials", 2003, p. 1345.
Mondo et al., Overview of Thermoplastic Composite ATL and AFP Technologies, ITHEC 2012, Oct. 30, 2012, Messe Bremen, Germany.
Notification of Transmittal of the International Search Report and the Written Opinion of the International Searching Authority from Corresponding PCT/US2015/040749 dated Oct. 20, 2015.
Rower, Robot Driven Automatic Tapehead for Complex Composite Lay-ups, No. 10AMAF-0066, SAE International 2010, Aerospace Manufacturing and Automated Fastening Conference & Exhibition, Sep. 28, 2010.
Shofner, M.L. et al., 2003, Nanofiber-reinforced polymers prepared by fused deposition modeling, Journal of applied polymer science, 89(11), pp. 3081-3090 (Year: 2003).
Shofner, M.L. et al., 2003, Single wall nanotube and vapor grown carbon fiber reinforced polymers processed by extrusion freeform fabrication. Composites Part A: Applied Science and Manufacturing, 34( 12), pp. 1207-1217 (Year: 2003).
Slocum, Alexander: "Kinematic Couplings: A Review of Design Principles and Applications", International Journal of Machine Tools and Manufacture 50.4 (2010): 310-327.
This 3D printer could allow ISS components to be created in space—YouTube. Published on May 20, 2016. Retreived from the internet: <URL:<https://www.youtube.com/watch?v=YwrTfOjEFtw>.
Zieman et al., Anisotropic Mechanical Properties of ABS Parts Fabricated by Fused Deposition Modelling, INTECH Open Access Publisher, 2012.
Donghong, Ding et al: "A tool-path generation strategy for wire and arc additive manufacturing," The International Journal of Advanced Manufacturing Technology, vol. 73, No. 1-4, Aprl. 11, 2014 (Apr. 11, 2014), pp. 173-183, XP055472255, London, ISSN: 0268-3768, DOI: 10.1007/s00170-014-5808-5.
Lantern Robotics (https://www.fabbaloo.com/blog/2014/4/18/how-to-make-any-3d-printed-part-much-stronger and see https:// imgur.com/a/EHxkE & https://www.reddit.com/r/3Dprinting/comments/22jwlm/injecting_hot_melt_adhesive_for_100_solid_faster/ (Year: 2014).

\* cited by examiner

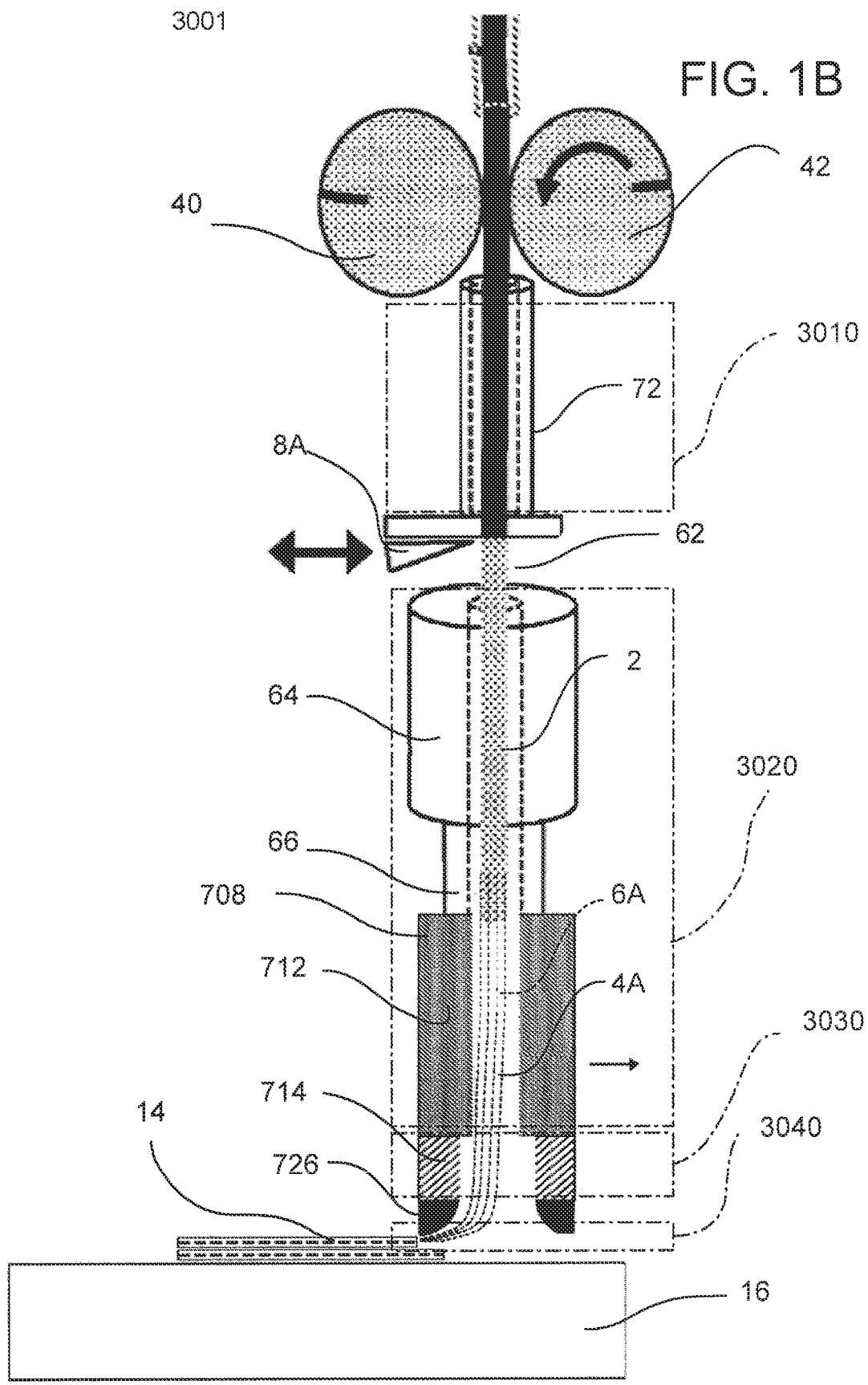

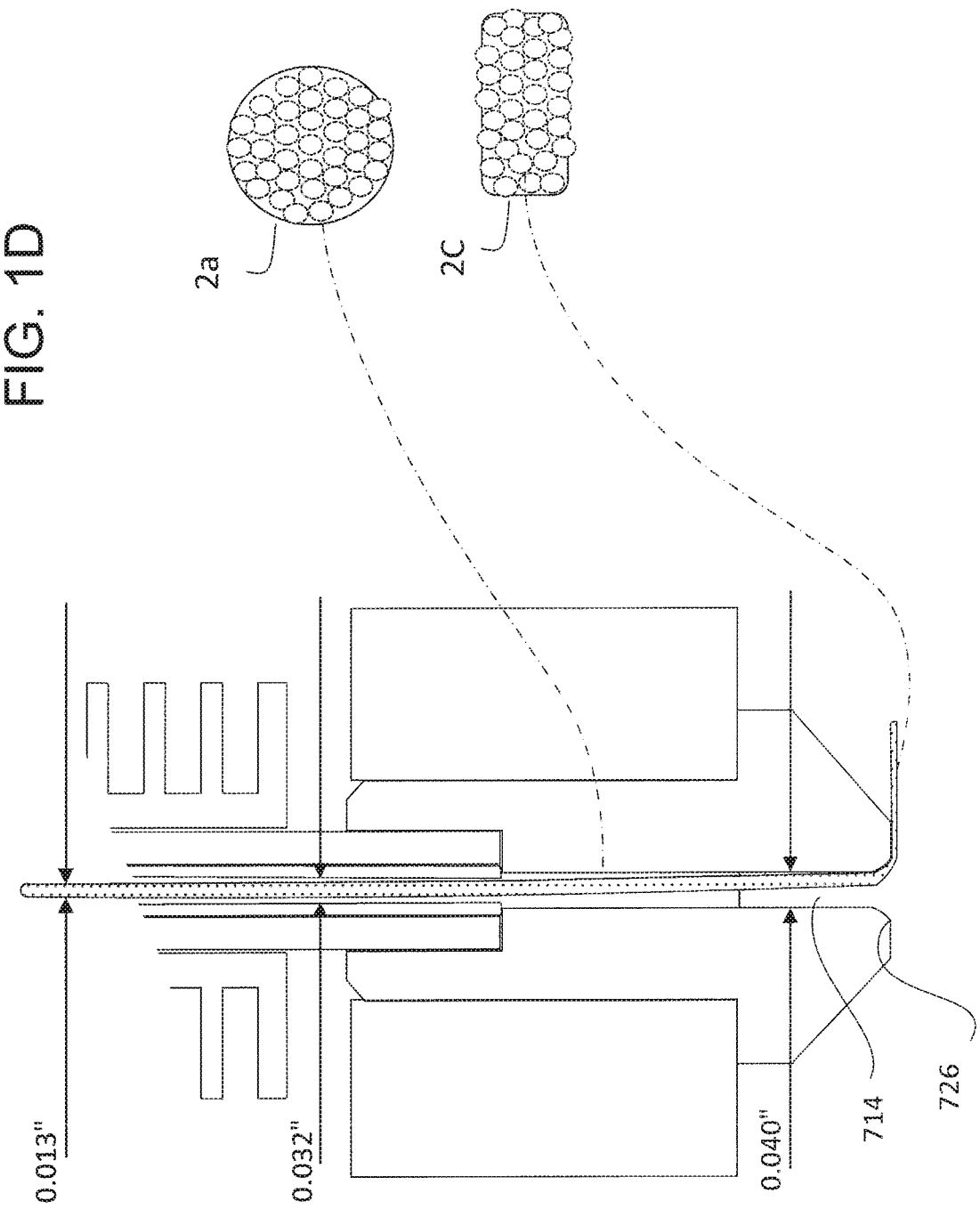

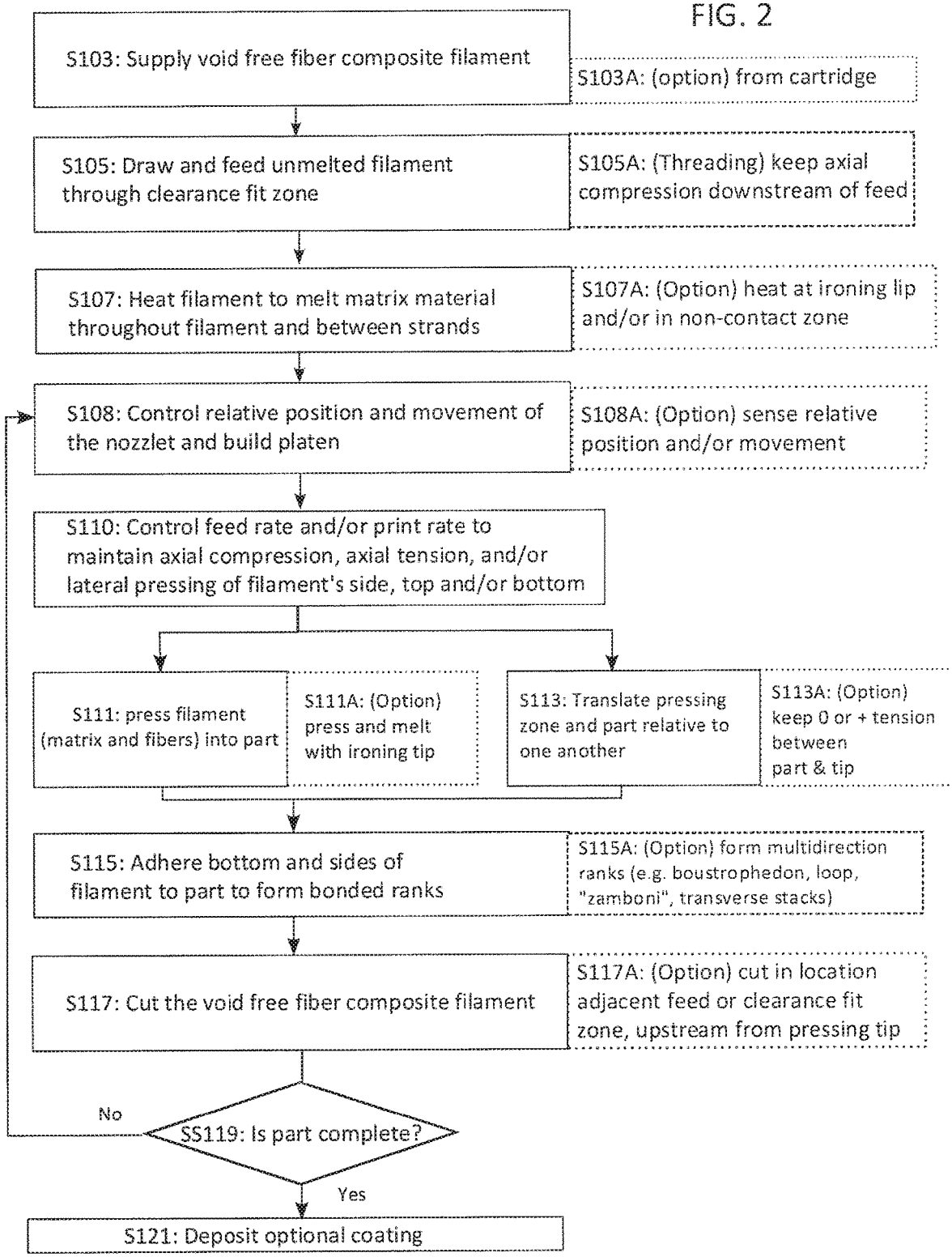

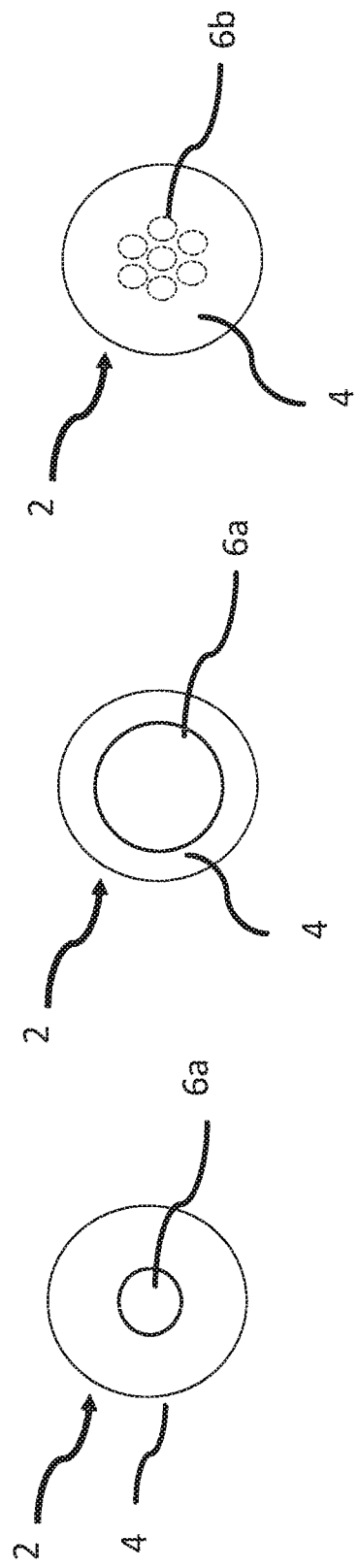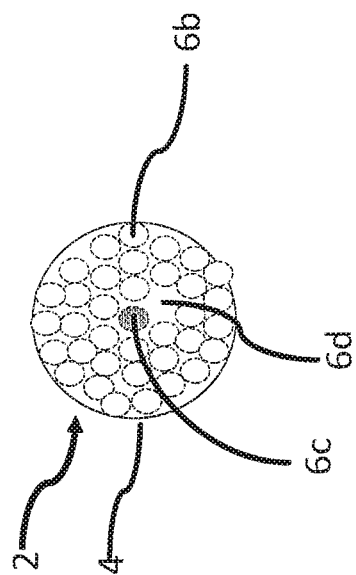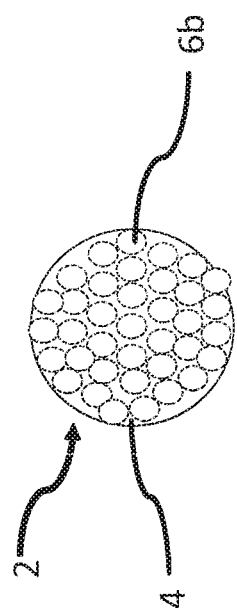

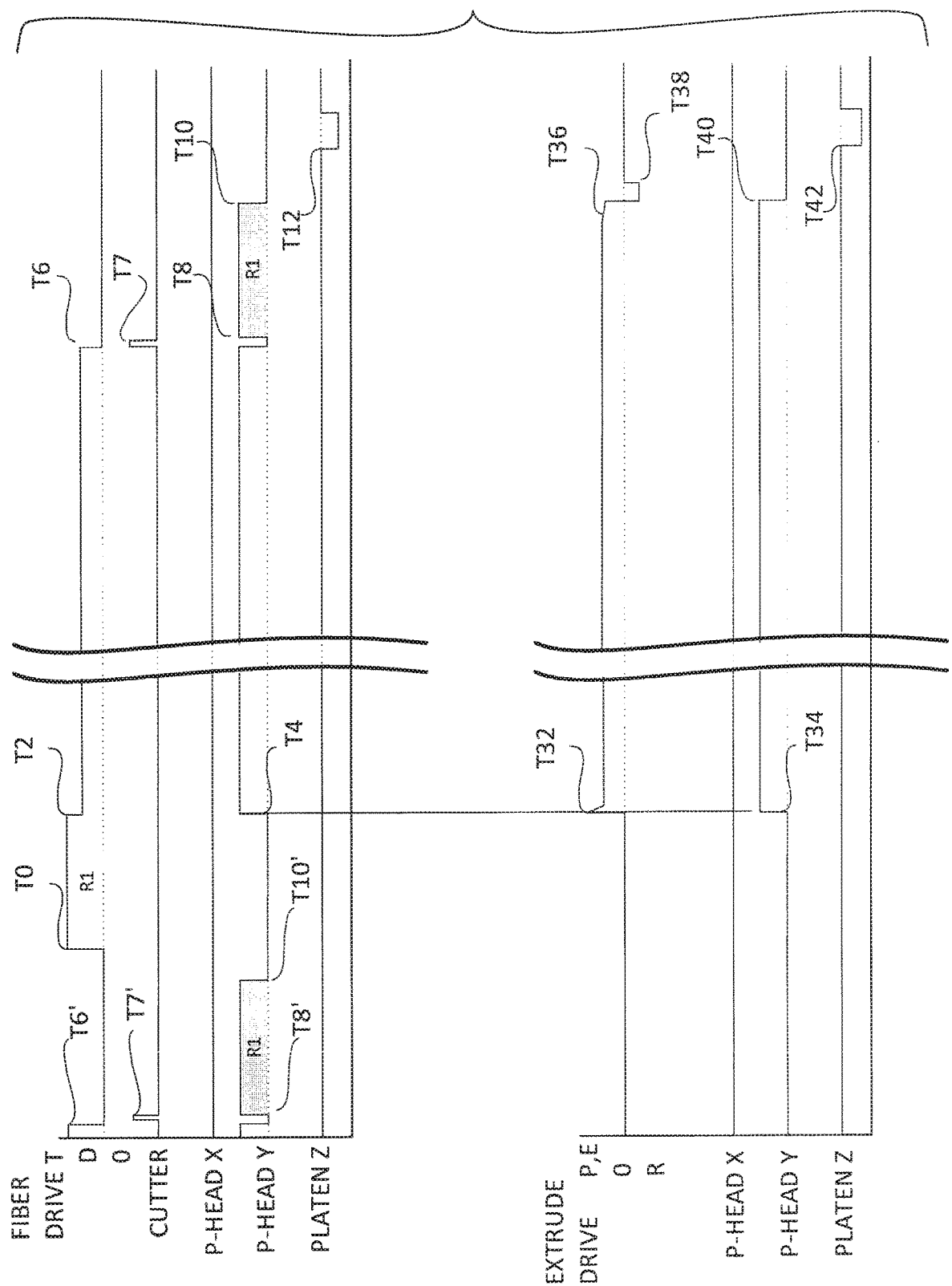

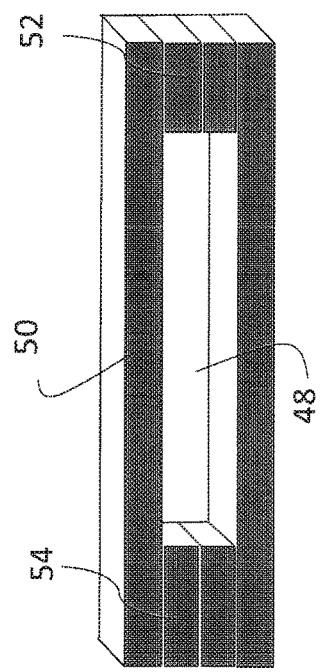
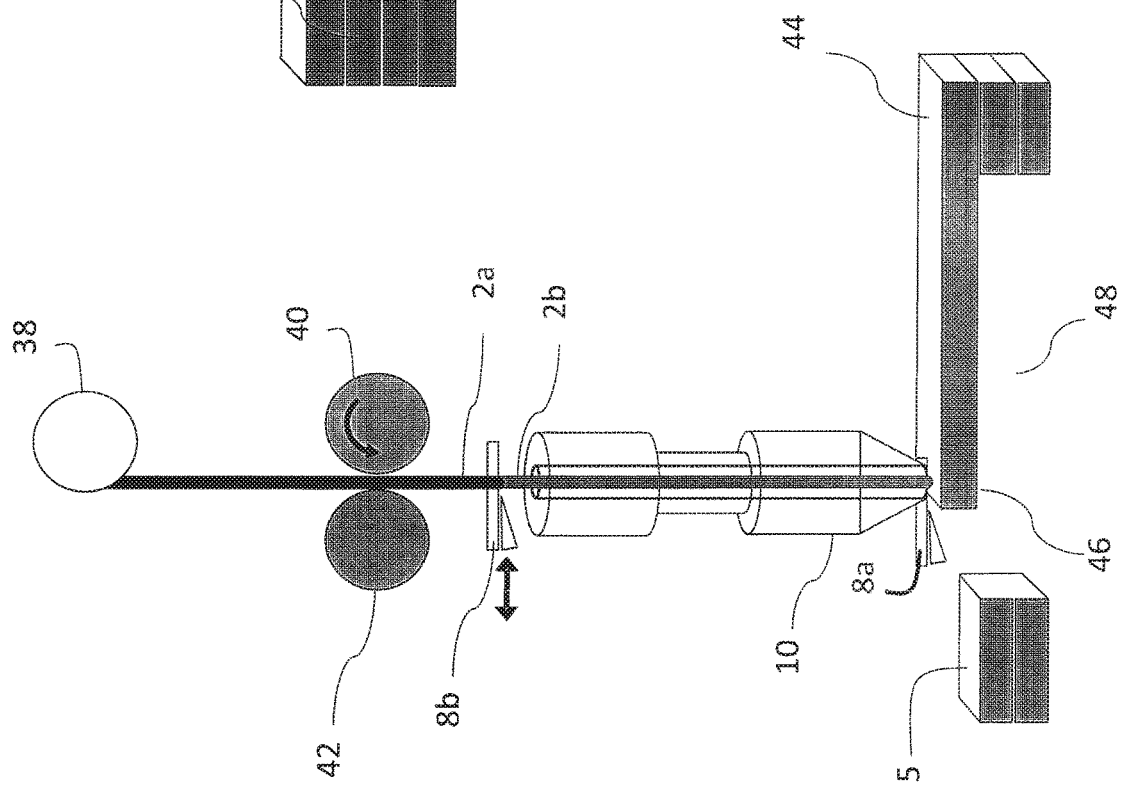

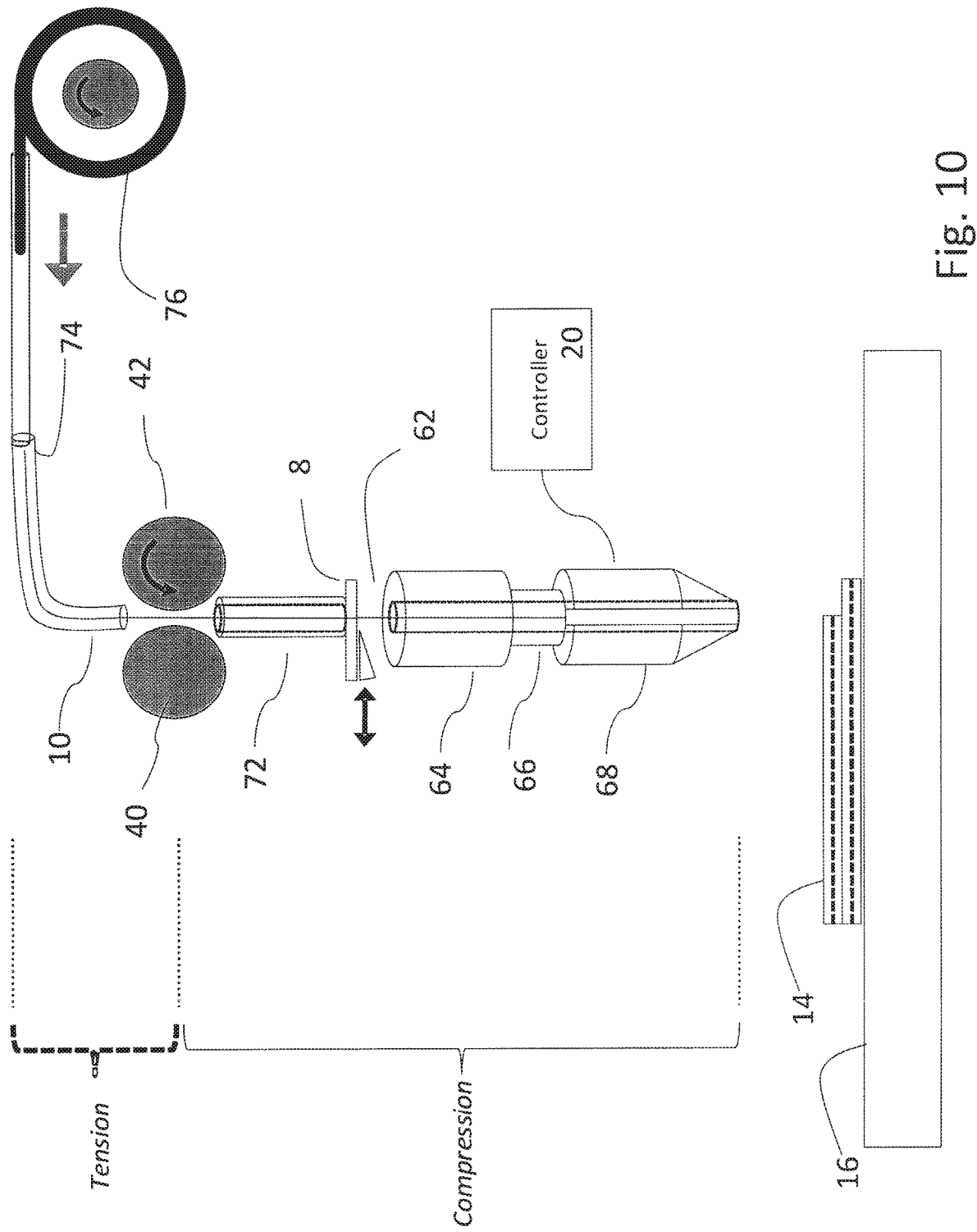

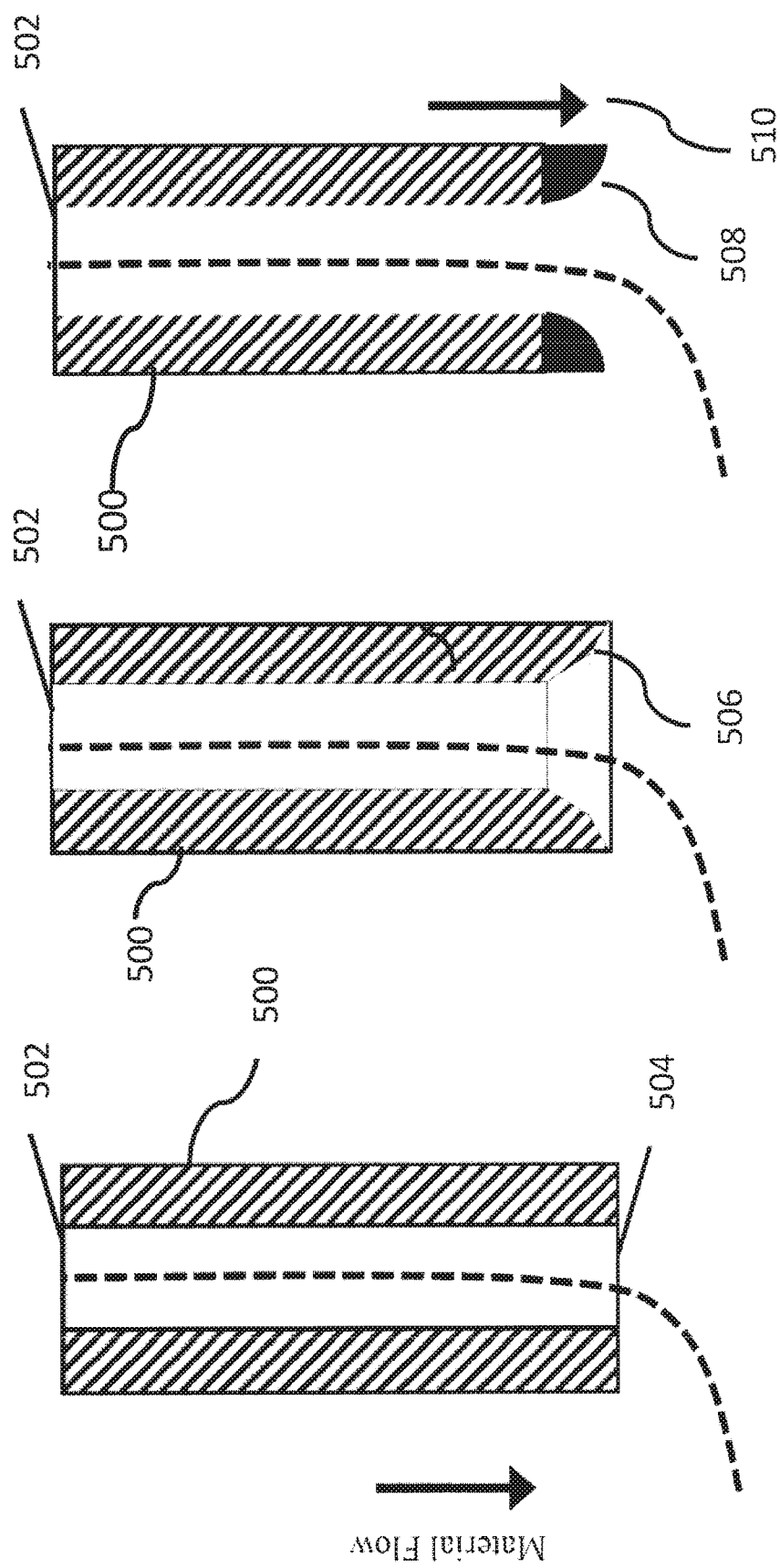

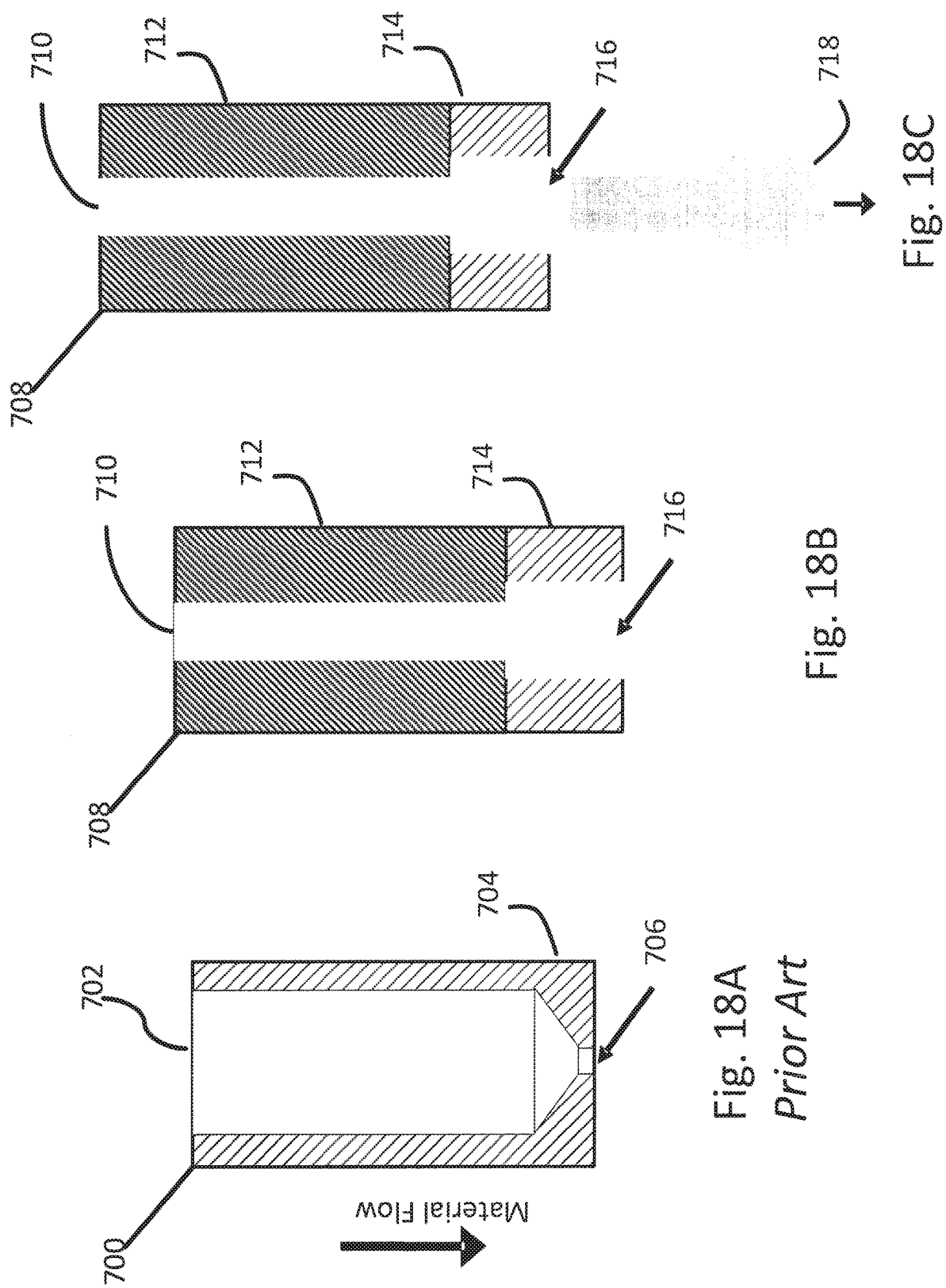

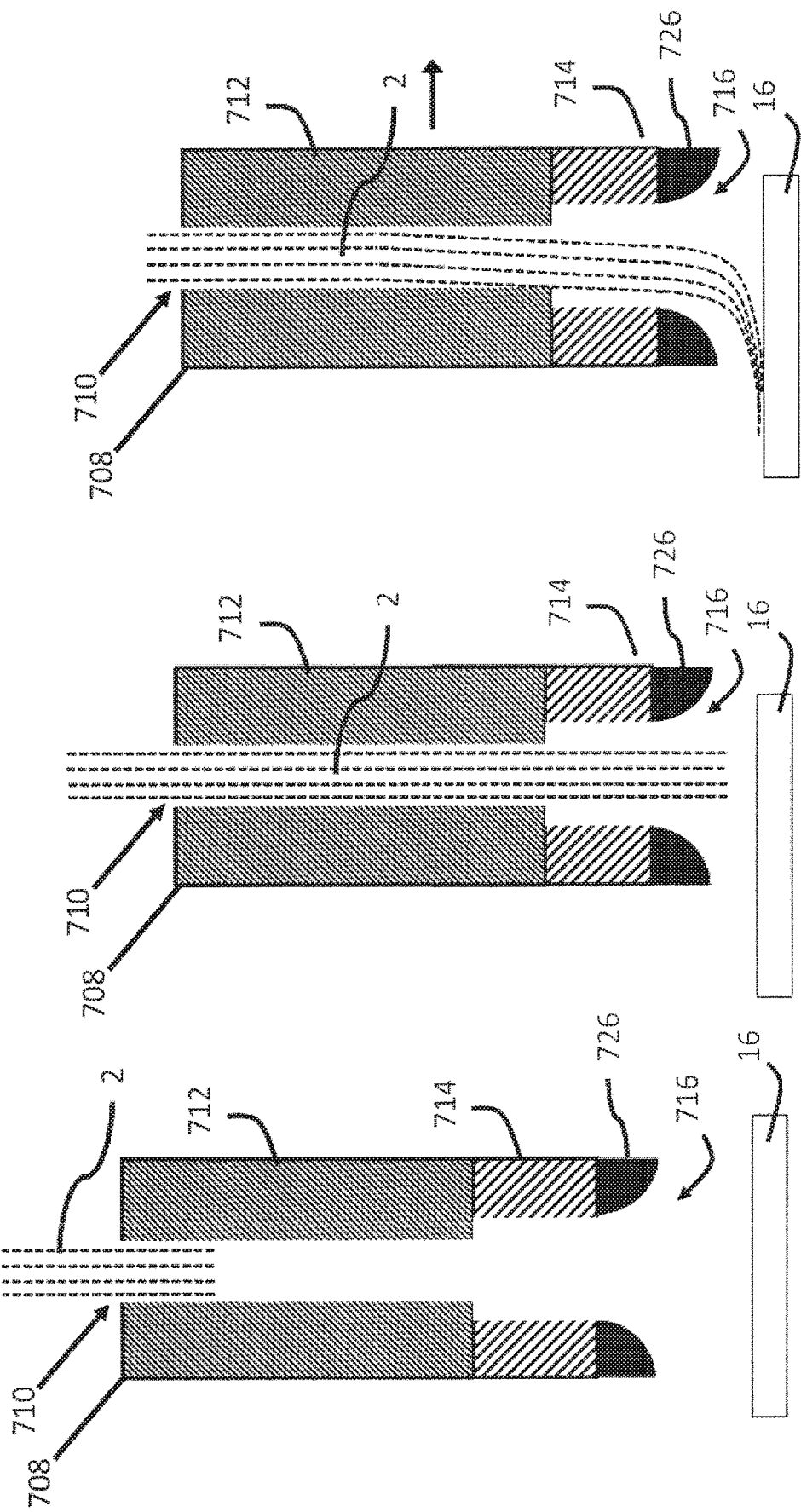

APPARATUS FOR FIBER REINFORCED ADDITIVE MANUFACTURING

CROSS-REFERENCE TO RELATED APPLICATIONS

This application continuation of U.S. patent application Ser. No. 15/445,227, filed Feb. 28, 2017 [now U.S. Pat. No. 10,611,082], which is a continuation of U.S. patent application Ser. No. 14/333,947, filed Jul. 17, 2014 [now U.S. Pat. No. 9,579,851], the disclosures of which are herein incorporated by references in their entirety. U.S. patent application Ser. No. 14/333,947 is a continuation in part of each of U.S. patent application Ser. No. 14/222,318, filed Mar. 21, 2014 [now Abandoned] and Ser. No. 14/297,437, filed Jun. 5, 2014 [now U.S. Pat. No. 9,370,896], the disclosures of which are herein incorporated by reference in their entirety. U.S. patent application Ser. No. 14/222,318 claims the benefit under 35 U.S.C. § 119(e) of U.S. provisional application Ser. No. 61/804,235, filed Mar. 22, 2013; 61/815,531, filed Apr. 24, 2013; 61/831,600, filed Jun. 5, 2013; 61/847,113, filed Jul. 17, 2013; 61/878,029, filed Sep. 15, 2013; 61/880,129, filed Sep. 19, 2013; 61/881,946, filed Sep. 24, 2013; 61/883,440, filed Sep. 27, 2013; 61/902,256, filed Nov. 10, 2013, and 61/907,431, filed Nov. 22, 2013, the disclosures of which are herein incorporated by reference in their entirety. U.S. patent application Ser. No. 14/297,437 claims the benefit under 35 U.S.C. § 119(e) of U.S. provisional application Ser. No. 61/831,600, filed Jun. 5, 2013; 61/847,113, filed Jul. 17, 2013; 61/878,029, filed Sep. 15, 2013; 61/881,946, filed Sep. 24, 2013; and 61/902,256, filed Nov. 10, 2013, the disclosures of which are herein incorporated by reference in their entirety. U.S. patent application Ser. No. 14/297,437 is also a continuation in part of U.S. patent application Ser. No. 14/222,318, the disclosure of which is herein incorporated by reference in its entirety.

FIELD

Aspects relate to three dimensional printing.

BACKGROUND

"Three dimensional printing" as an art includes various methods such as Stereolithography (SLA) and Fused Filament Fabrication (FFF). SLA produces high-resolution parts, typically not durable or UV-stable, and is used for proof-of-concept work; while FFF extrudes through a nozzle successive filament beads of ABS or a similar polymer.

"Composite Lay-up" is not conventionally related to three dimensional printing. In this art, preimpregnated ("prepreg") composite sheets of fabric are impregnated with a resin binder into two-dimensional patterns. One or more of the individual sheets are then layered into a mold and heated to liquefy the binding resin and cure the final part.

"Composite Figment Winding" is also not conventionally related to three dimensional printing. In this art, sticky "tows" including multiple thousands of individual carbon strands are wound around a custom mandrel to form a rotationally symmetric part. Filament winding is typically limited to convex shapes due to the taut filaments "bridging" any concave shape.

There is no commercial or experimental three dimensional "printing" technique which provides the benefits of composite lay-up, or composite filament winding.

SUMMARY

According to a first embodiment and/or aspect of the present invention, one combination of steps and/or a three dimensional printer employing a subset or superset of such steps for additive manufacturing of a part includes supplying an unmelted void free fiber reinforced composite filament including one or more axial fiber strands extending within a matrix material of the filament, having no substantial air gaps within the matrix material. The unmelted composite filament is fed at a feed rate along a clearance fit zone that prevents buckling of the filament until the filament reaches a buckling section (i.e., at a terminal and of the conduit nozzle, opposing the part, optionally with a clearance between the conduit nozzle end and the part of a filament diameter or less) of the conduit nozzle. The filament is heated to a temperature greater than a melting temperature of the matrix material to melt the matrix material interstitially within the filament, in particular in a transverse pressure zone. A ironing force is applied to the melted matrix material and the one or more axial fiber strands of the fiber reinforced composite filament with an ironing lip as the fiber reinforced composite filament is deposited in bonded ranks to the part. In this case, the ironing lip is translated adjacent to the part at a printing rate that maintains a neutral to positive tension in the fiber reinforced composite filament between the ironing lip and the part, this neutral-to-positive (i.e., from no tension to some tension) tension being less than that necessary to separate a bonded rank from the part.

According to a second embodiment and/or aspect of the present invention, an additional or alternative combination of steps and/or a three dimensional printer employing a subset or superset of such steps for additive manufacturing of a part includes the abovementioned supplying step, and feeding the fiber reinforced composite filament at a feed rate. The filament is similarly heated, in particular in a transverse pressure zone. The melted matrix material and the at least one axial fiber strand of the composite filament are threaded (e.g., through a heated print head, and in an unmelted state) to contact the part in a transverse pressure zone. This transverse pressure zone is translated relative to and adjacent to the part at a printing rate to bring an end of the filament (including the fiber and the matrix) to a melting position. The end of the filament may optionally buckle or bend to reach this position. At the melting position, the matrix material is melted interstitially within the filament.

According to a third embodiment and/or aspect of the present invention, a three-dimensional printer, and or a subset or superset of method steps carried out by such a printer, for additive manufacturing of a part includes a fiber composite filament supply (e.g., a spool of filament, or a magazine of discrete filament segments) of unmelted void free fiber reinforced composite filament including one or more axial fiber strands extending within a matrix material of the filament, having no substantial air gaps within the matrix material. One or more linear feed mechanisms (e.g., a driven frictional rollers or conveyors, a feeding track, gravity, hydraulic or other pressure, etc., optionally with included slip clutch or one-way bearing to permit speed differential between material feed speed and printing speed) advances unmelted composite filament a feed rate, optionally along a clearance fit channel (e.g., a tube, a conduit, guide a channel within a solid part, conveyor rollers or balls) which guides the filament along a path or trajectory and/or prevents buckling of the filament. A print head may include (all optional and/or alternatives) elements of a heater and/or hot zone and/or hot cavity, one or more filament guides, a cold feed zone and/or cooler, and/or a reshaping lip, pressing tip, ironing tip, and/or ironing plate, and/or linear and/or rotational actuators to move the print head in any of X, Y, Z, directions and/or additionally in one to three rotational degrees of freedom.

In this third embodiment/aspect and optionally other embodiments/aspects of the invention, a build platen may include a build surface, and may include one or more linear actuators to move the build platen in any of X, Y, Z, directions and/or additionally in one to three rotational degrees of freedom. The heater (e.g., a radiant heater, an inductive heater, a hot air jet or fluid jet, a resistance heater, application of beamed or radiant electromagnetic radiation, optionally heating the ironing tip) heats the filament, and in particular the matrix material, to a temperature greater than a melting temperature of the matrix material (to melt the matrix material around a single fiber, or in the case of multiple strands, interstitially among the strands within the filament). The linear actuators and/or rotational actuators of the print head and/or build platen may each solely and/or in cooperation define a printing rate, which is the velocity at which a bonded rank is formed. A controller optionally monitors the temperature of the heater, of the filament, and/or and energy consumed by the heater via sensors.

In this third embodiment/aspect and optionally other embodiments/aspects of the invention, the feed mechanism, clearance fit channel, linear or rotational actuators of the build platen and/or the linear and rotational actuators, guides, hot cavity, and/or reshaping or ironing lip or tip of the print head may optionally cooperate (any combination or permutation thereof or all) as a transverse pressure zone that presses and/or melts filaments onto the build platen or into the part being printed. Optionally, the linear and rotational actuators of the print head and/or build platen, and/or one or more linear feed mechanisms may be controlled by a controller monitoring force, displacement, and/or velocity sensors to apply a compressive force along the axial strands (e.g., tangentially to a feed roller diameter) of the filament and/or apply a reaction force from the build platen or part being printed to press melted matrix filaments against the build platen or against or into previous layers of the part to form bonded ranks (i.e., substantially rectangular ranks adhered to substantially flat surfaces below and to one side thereof).

In this third embodiment/aspect and optionally other embodiments/aspects of the invention, fully optionally in addition or the alternative, the linear and rotational actuators of the print head and/or build platen, and/or one or more linear feed mechanisms may be controlled by a controller monitoring force, displacement, and/or velocity sensors to apply a transverse, sideways, downwards, ironing and/or ironing force (optionally using a surface of or adjacent the print head, which may be a reshaping and/or ironing lip, tip, or plate) to the side of the melted matrix filament to press and/or iron the melted matrix filaments against the build platen or against or into previous layers of the part to form bonded ranks. Fully optionally in addition or the alternative, the linear and rotational actuators of the print head and/or build platen, and/or one or more linear feed mechanisms may be controlled by a controller monitoring force, displacement, and/or velocity sensors to apply a neutral to positive tension force through the strand and unmelted matrix of the filament and/or between the build platen, previously deposited bonded ranks and the print head or feeding mechanism(s) (optionally using a surface of or adjacent the print head, which may be a reshaping and/or ironing lip, tip, or plate, and further optionally using interior surfaces of the print head or guides, and/or feeding mechanism clutches, slips, motor drive, idling, motor internal resistance, and/or small resistance currents) adjacent to the part at a printing rate that maintains neutral to positive tension in the fiber reinforced composite filament between the reshaping lip and the part. This tension force is optionally a neutral to positive tension force less than that necessary to separate a bonded rank from the part for sustained formation of bonded ranks, and further optionally and/or in the alternative, may be sufficient to separate or sever a filament with a discontinuous internal fiber connected by melted matrix to the print head.

In this third embodiment/aspect and optionally other embodiments/aspects of the invention, including the first and second embodiment/aspects thereof, the linear and rotational actuators of the print head and/or build platen, and/or one or more linear feed mechanisms may be controlled by a controller monitoring force, displacement, and/or velocity sensors to apply a transverse, sideways, downwards, reshaping and/or ironing force (optionally using a surface of or adjacent the print head, which may be a reshaping and/or ironing lip, tip, or plate) to generate a different balance of forces within the printer, filament, and part in different printing phases (e.g., threading phases versus printing phases). For example, in one embodiment or aspect of the invention, the linear and rotational actuators of the print head and/or build platen, and/or one or more linear feed mechanisms may be controlled by a controller monitoring force, displacement, and/or velocity sensors to apply a transverse, sideways, downwards, reshaping and/or ironing force (optionally using a surface of or adjacent the print head, which may be a reshaping and/or ironing lip, tip, or plate) may apply bonded ranks primarily via lateral pressing and axial tension in a continuous printing phase of applying bonded ranks, and primarily via lateral pressing and axial compression in a threading or initialization phase.

In a fourth embodiment and/or aspect of the present invention, a three-dimensional printer, and or a subset or superset of method steps carried out by such a printer, for additive manufacturing of a part includes a fiber composite filament supply of unmelted fiber reinforced composite filament including one or more inelastic axial fiber strands extending within a matrix material of the filament. A movable build platen for supports the part. A print head opposes the build platen and includes a composite filament ironing tip and a heater that heats the composite filament ironing tip above a melting temperature of the matrix material. A plurality of printing actuators move the print head and the build platen relative to one another in three degrees of freedom, and a filament drive that drives the unmelted fiber reinforced composite filament, and the inelastic fiber strands embedded within, into the print head at a linear feed rate. A cold feed zone positioned between the filament drive and the ironing tip is maintained below a melting temperature of the matrix material. A controller operatively connected to the heater, the filament drive and the printing actuators executes instructions which cause the filament drive to hold an unattached terminal end of the composite filament in the cold feed zone between the filament drive and the ironing tip. The controller may optionally execute further instructions to cause the attached operative elements to carry out the functions described herein below.

In this fourth embodiment/aspect and optionally other embodiments/aspects of the invention ("other embodiments/aspects" including without limitation the first, second, third and fourth embodiment/aspects thereof), the filament drive to advances the unattached terminal end of the composite filament through the print head and to the heated composite filament ironing tip without stopping, such that the unattached terminal end advances at least at the current feeding rate as it passes through locations having a temperature sufficient to melt the matrix material of the filament. Fully optionally, the filament drive may advance the unattached terminal end of the composite filament through the print head and to the heated composite filament ironing tip at a speed sufficient to prevent the unattached terminal end from receiving sufficient heat transfer to adhere to interior walls of the print head adjacent the composite filament ironing tip.

Additionally and/or optionally in this fourth embodiment/ aspect and optionally other embodiments/aspects of the invention, the actuators to begin moving the print head and the build platen relative to one another in at least one degree of freedom substantially at the moment the filament drive advances the unattached terminal end of the composite filament to the heated composite filament ironing tip. Alternatively, or in addition, the filament drive advances until the terminal end and at least a portion of the one or more inelastic axial fiber strands are anchored within a part on the build platen.

Additionally and/or optionally in this fourth embodiment/ aspect and optionally other embodiments/aspects of the invention, a cutter is positioned between the filament drive and the ironing tip, which severs the unmelted fiber reinforced composite filament within the cold feed zone. Subsequent to severing the unmelted fiber reinforced composite filament, the actuators may drag remaining unmelted fiber reinforced composite filament from the print head through the cold feed zone and the composite filament ironing tip. Alternatively, or in addition, subsequent to severing the unmelted fiber reinforced composite filament, the filament drive may hold the unattached terminal end of the unmelted fiber reinforced composite filament in the cold feed zone adjacent the cutter. Alternatively, or in addition, the cutter may be positioned between the filament drive and the ironing tip, and severs the unmelted fiber reinforced composite filament prior to holding the unattached terminal end of the unmelted fiber reinforced composite filament in the cold feed zone between the filament drive and the ironing tip. Alternatively, or in addition, the cutter has a blade having a thickness of less than the diameter of the unmelted fiber reinforced composite filament between an entrance guide tube and an exit guide tube, the distance between the entrance and the exit guide tubes and the thickness of the blade are equal to or less than the diameter of the unmelted fiber reinforced composite filament.

Additionally and/or optionally in this fourth embodiment/ aspect and optionally other embodiments/aspects of the invention, a clutch permits the filament drive to slip to accommodate a difference in the printing rate and the feeding rate. Fully optionally alternatively or in addition, a clearance fit channel within the cold feed zone has an inner diameter between 1½ and 2½ times the diameter of the unmelted fiber reinforced composite filament and guides the filament along a path or trajectory and/or prevents buckling of the filament. Fully optionally alternatively or in addition, an interior diameter of the print head between the clearance fit channel and the composite filament ironing tip is from two to six times the diameter of the unmelted fiber reinforced composite filament, sufficient to prevent the unattached terminal end from receiving sufficient heat transfer to adhere to interior walls of the print head adjacent the composite filament ironing tip.

Additionally and/or optionally in this fourth embodiment/ aspect and optionally other embodiments/aspects of the invention, the printing actuators and the filament drive cooperate to maintain a transverse pressure zone that both presses and melts fiber reinforced composite filament to form the part on the build platen as the build platen and printhead are moved relative to one another; and or to cooperate to apply a compressive force along the inelastic axial strands of the filament; and/or to apply an ironing force, using a surface of the heated composite filament ironing tip, to the side of the melted matrix filament to form the part on the build platen; and/or to apply a neutral to positive tension force along the embedded inelastic fiber and between a part anchoring an embedded inelastic fiber and the heated composite filament ironing tip.

Additionally and/or optionally in this fourth embodiment/ aspect and optionally other embodiments/aspects of the invention, the printing actuators and the filament drive substantially simultaneously pause, the cutter then severs the unmelted fiber reinforced composite filament during said pause, and the print head and the build platen then move relative to one another along at least one degree of freedom for at least a runout distance (measured between the cutter and the ironing tip) to complete bonding the remainder of the fiber reinforced composite filament.

Additionally and/or optionally in this fourth embodiment/ aspect and optionally other embodiments/aspects of the invention, the filament drive advances the unmelted fiber reinforced composite filament by the runout distance before causing the printing actuators and the filament drive to substantially simultaneously drive along at least one common degree of freedom at a substantially common speed of advance of the inelastic axial fiber strands within the fiber reinforced composite filament as anchored to the part and fed past the filament drive.

Additionally and/or optionally in this fourth embodiment/ aspect and optionally other embodiments/aspects of the invention, the printing actuators and the filament drive hold the heated composite filament ironing tip at a height above the part to iron the fiber reinforced composite filament as it is deposited to reshape a substantially oval bundle of inelastic axial fiber strands within the fiber reinforced composite filament to a substantially flattened block of inelastic fibers strands within a bonded rank of the part. Optionally, or in addition, the print head and the build platen move relative to one another to iron the fiber reinforced composite filament by flattening the matrix material including the at least one axial strand with the composite filament ironing tip as the matrix material is melted and pulled through the composite filament ironing tip.

None of the abovementioned steps or structures in the first through fourth embodiments and/or aspects are critical to the invention, and the invention can be expressed as different combinations of these. In particular, pressing a fiber reinforced filament into a part may optionally be temporarily performed during threading or initialization by axial compression along the fiber composite (unmelted fiber strand(s), partially melted and partially glass matrix), and/or by "ironing" and/or reshaping in the transverse pressure zone (e.g., print head tip) and/or by the reshaping lip and/or by a companion "ironing" plate following the printhead. Each approach and structure is effective in itself, and in the invention is considered in permutations and combinations thereof. Further, the pressing may be done in combination with compression or tension maintained in the filament via the unmelted fiber strands. Pressing or ironing may be done in the presence of tension upstream and downstream of the transverse pressure zone (e.g., print head tip) and/or the ironing lip and/or companion "ironing" plate, but also or alternatively in the presence of tension downstream of the pressing and also upstream of the transverse pressure zone (e.g., print head tip) and/or ironing lip and/or by companion "ironing" plate.

In each of these first through fourth embodiments or aspects of the invention, as well as other embodiments or aspects thereof, optionally the matrix material comprises a thermoplastic resin having an unmelted elastic modulus of approximately 0.1 through 5 OPa and/or unmelted ultimate tensile strength of approximately 10 through 100 MPa, and a melted elastic modulus of less than 0.1 GPa and melted ultimate tensile strength of less than 10 MPa, and the one or more axial fiber strands have an elastic modulus of approximately 5-1000 OPa and an ultimate tensile strength of approximately 200-100000 MPa. These embodiments or aspects may optionally maintain a substantially constant cross sectional area of the fiber reinforced composite filament in clearance fit zone, the non-contact zone, the transverse pressure zone, and as a bonded rank is attached to the workpiece. In each of these first through third embodiments or aspects of the invention, optionally the filament has a cross sectional area greater than 1×10E-5 inches and less than 2×10E-3 inches. Further optionally, the at least one axial strand includes, in any cross-sectional area, between 100 and 6000 overlapping axial strands or parallel continuous axial strands. Such matrix materials include acrylonitrile butadiene styrene, epoxy, vinyl, nylon, polyetherimide, polyether ether ketone, polylactic acid, or liquid crystal polymer, and such axial strand materials include carbon fibers, aramid fibers, or fiberglass.

Optionally in any of the first through fourth embodiments or aspects of the invention, as well as other embodiments or aspects thereof, at least one of the feed rate and the printing rate are optionally controlled to maintain compression in the fiber reinforced composite filament within the clearance fit zone. Additionally or in the alternative for these and other embodiments or aspects, optionally in a threading or initialization phase, the filament is heated in an non-contact zone immediately upstream of the ironing, and the feed and printing rates controlled to induce axial compression along the filament within the non-contact zone primarily via axial compressive force within the one or more axial fiber strands extending along the filament. Additionally or in the alternative for these and other embodiments or aspects of the invention, optionally in a threading or initialization phase, at least one of the feed rate and the printing rate are controlled to compress the fiber reinforced composite filament and translate an end of the filament abutting the part laterally underneath an ironing lip to be ironed by application of heat and pressure. Additionally or in the alternative for these and other embodiments or aspects of the invention, the filament is heated and/or melted by the ironing lip, and one or both of the feed rate and the printing rate are controlled to maintain neutral to positive tension in the fiber reinforced composite filament between the ironing lip and the part primarily via tensile force within the at least one axial fiber strand extending along the filament.

Optionally in any of the first through fourth embodiments or aspects of the invention, as well as other embodiments or aspects thereof, supplying is optionally via a cartridge to decouple the speed of manufacturing or forming the reinforced fiber material (e.g., combining the fiber with the matrix) from the speed of printing.

Optionally in any of the first through fourth embodiments or aspects of the invention, as well as other embodiments or aspects thereof, the method may include forming a solid shell with the filament; and/or the ironing lip may be rounded. Additionally or in the alternative for these and other embodiments or aspects of the invention, the ironing lip may be at the tip of a conduit nozzle or printing guide with a cross-sectional area of the conduit nozzle eyelet or outlet larger than a cross-sectional area of the conduit nozzle or printing guide inlet. Additionally or in the alternative for these and other embodiments or aspects of the invention, the cross sectional area within the walls of a heating cavity or non-contact zone is larger than a cross-sectional area of the clearance fit zone.

Optionally in any of the first through fourth embodiments or aspects of the invention, as well as other embodiments or aspects thereof, the one or more fiber cores may be constructed as a train of separate segments extending in an axial direction of the filament. In this case, the segments may be located at pre-indexed locations along the axial direction of the filament; and/or at least some of the segments may overlap along the axial direction of the filament. Additionally or in the alternative for these and other embodiments or aspects of the invention, the average length of the segments may be less than or equal to a length of the heated or non-contact zone.

Optionally in any of the first through fourth embodiments or aspects of the invention, as well as other embodiments or aspects thereof, the push-pultrusion process of depositing a first filament into a layer of matrix material in a first desired pattern may be followed by or performed in parallel with curing a matrix layer (e.g., stereolithography or selective laser sintering) to form a layer of a part including the deposited first filament. Additionally or in the alternative for these and other embodiments or aspects of the invention, this alternative may optionally include cutting the first filament and depositing a second filament in a second desired pattern in the layer of matrix material.

Optionally in any of the first through fourth embodiments or aspects of the invention, as well as other embodiments or aspects thereof, the three dimensional printer prints structures using a substantially void-free preimpregnated (prepreg) material that remains void-free throughout the printing process. One form of this material is a reinforced filament including a core with multiple continuous strands preimpregnated with a thermoplastic resin that has already been "wicked" into the strands, and applied using one of the push-pultrusion approaches of the present invention to form a three dimensional structure. A composite formed of thermoplastic (or uncured thermoset) resin having wetted or wicked strands, may not be "green" and is also rigid, low-friction, and substantially void free. Another form may employ a single, solid continuous core. Still another form may use a sectioned continuous core, i.e., a continuous core sectioned into a plurality of portions along the length is also contemplated. Still another form may employ a solid core or multiple individual strands that are either evenly spaced from one another or include overlaps. "Void free" as used herein with respect to a printing material may mean, at an upper limit, a void percentage between 1% than 5%, and at a lower limit 0%, and with respect to a printed part, at an upper limit, a void percentage between 1 and 13%, and at a lower limit 0%. Optionally, the push-pultrusion process may be performed under a vacuum to further reduce or eliminate voids.

A fiber or core "reinforced" material is described herein. The fiber or core may either be positioned within an interior of the filament or the core material may extend to an exterior surface of the filament, or for multistrand implementations, both. The term including "reinforced" may optionally extend to strands, fibers, or cores which do not provide exceptional reinforcing structural strength to the composite, such as optical fibers or fluid conducting materials, as well as conductive materials. Additionally, it should be understood that a core reinforced material also includes functional reinforcements provided by materials such as optical fibers, fluid conducting channels or tubes, electrically conductive wires or strands.

The present invention contemplates that optionally, the entire process of push-pultrusion, including the use of different compatible materials herein, many be a precursor or a parallel process other modes of additive manufacturing, in particular stereolithography (SLA), selective laser sintering (SLS), or otherwise using a matrix in liquid or powder form. Push-pultrusion may embed within or about parts made by these mode substantially void free parts, enabling the entire part to exhibit enhanced strength.

If the push-pultrusion process is used to lay down bonded ranks with a dominant direction or directions, these directions may optionally exhibit anisotropic strength both locally and overall. Directionality or anisotropy of reinforcement within a structure can optionally provide enhanced part strength in desired locations and directions to meet specific design requirements or enable lighter and/or stronger parts.

Optionally in any above-described invention, the matrix material may be acrylonitrile butadiene styrene (ABS), epoxy, vinyl, nylon, polyetherimide (PEI), Polyether ether ketone (PEEK), Polylactic Acid (PLA), or Liquid Crystal Polymer. The core or strands of the core may reinforce structurally, conductively (electrically and/or thermally), insulatively (electrically and/or thermally), optically and/or in a manner to provide fluidic transport. The core or strands of the core may include, in particular for structural reinforcing, carbon fiber, aramid or high strength nylon fiber, fiberglass. Further, multiple types of continuous cores or strands may be combined in a single continuous core reinforced filament to provide multiple functionalities such as both electrical and optical properties.

Optionally in any above-described invention or embodiments or aspects of the invention, fiber reinforced composite filaments with different resin to fiber ratios may provide different properties within different sections of the part, e.g., printed with different printheads at different stages. Similarly optionally, a "low-resin" fiber reinforced composite filament skeletal filler may be used for the internal construction to maximize the strength-to-weight ratio (e.g. 30% resin/70% fiber by cross sectional area). "Low-resin" means a resin percentage in cross sectional area from 30% to 50%. Similarly optionally a "High-resin" fiber reinforced composite filament shell coating (e.g., 90% resin/I 0% fiber by cross sectional area) may be used to prevent the possible print through of an underlying core or individual fiber strand of the core. Additionally, in some embodiments and embodiments or aspects of the invention, the consumable material may have zero fiber content, and be exclusively resin and/or printed with conventional FFF.

All of the listed options apply individually, and in any operable permutation or combination to each of the first, second, third, and other embodiments or aspects of the invention, including that acts or steps are implemented with apparatus structures disclosed herein as would be understood by one of skill in the art, and apparatus structures perform acts or steps as disclosed herein as would be understood by one of skill in the art. In all cases throughout the disclosure, the term "may" denotes an optional addition or alternative material, structure, act, or invention to the invention. It should be noted that discussion of a controller causing "the plurality of actuators" to move the build platen and/or printhead is inclusive of individually instructing any one, two, three or more of the actuators.

BRIEF DESCRIPTION OF DRAWINGS

FIGS. 1A through 1D are schematic representations of a three dimensional printing system using a continuous core reinforced filament, in which FIGS. 1A and 1B are schematic views of a continuous core reinforced filament printhead, FIG. 1C is a cross-sectional and schematic view of a compound extrusion and fiber printhead assembly, and FIG. 1D is a close-up cross-section of a fiber printhead assembly;

FIG. 2 is a representative flow chart of a three dimensional printing process;

FIGS. 3A-3E are schematic representations of various embodiments of core configurations of a continuous core reinforced filament 2;

FIG. 5 is a compound timing diagram contrasting extrusion and fiber printing control;

FIG. 8 is a schematic representation of a three dimensional printing system including a cutter and a printing process bridging an open space;

FIG. 9 is a schematic representation of a part formed by the three-dimensional printing system and/or process that includes an enclosed open space;

FIG. 10 is a schematic representation of a three-dimensional printing system including a guide tube;

FIGS. 14A-14C are schematic representations of nozzles and rounded outlet nozzles respectively;

FIG. 18A is a schematic representation of a prior art extrusion nozzle;

FIG. 18B is a schematic representation of a divergent nozzle;

FIG. 18C is a schematic representation of the divergent nozzle of FIG. 18B shown in a feed forward cleaning cycle;

FIGS. 19C-19E are schematic representations of a continuous core filament being threaded and printed with a divergent nozzle;

DETAILED DESCRIPTION

Figure 1A:
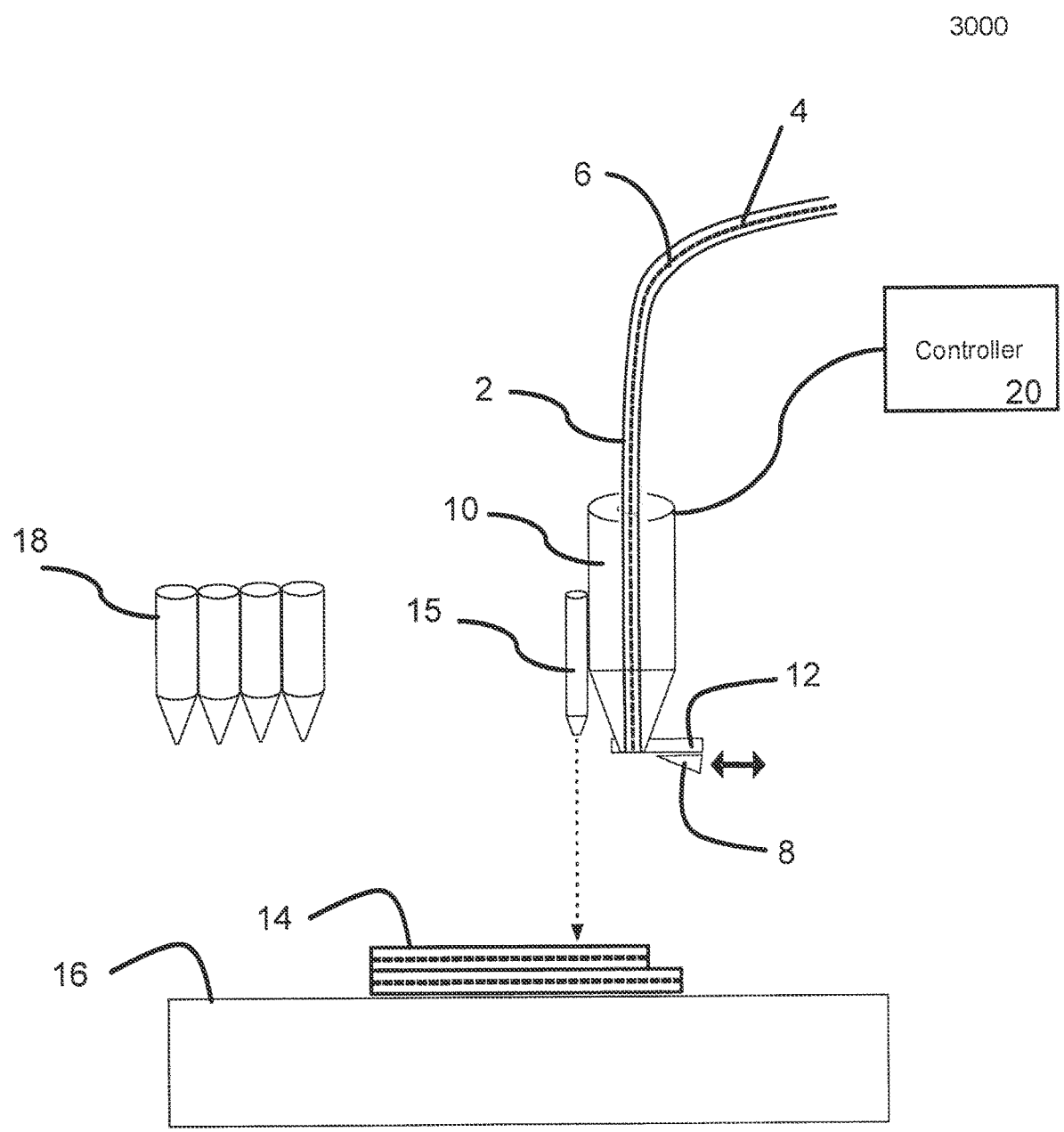

In both of the relatively recent arts of additive manufacturing and composite lay-up, coined words have become common. For example, a "prepreg" is a pre-impregnated composite material in which a resin matrix and a fiber assembly are prepared ahead of time as a composite raw material. A "towpreg" is "prepreg" formed from a combination of a "tow" (a bundle of hundreds to thousands of fiber strands at very high fiber percentage, e.g., 95%) and a sticky (at room temperature) resin, conventionally being dominated by the fibers of the impregnated tow (e.g., 75% fiber strands), with the sticky resin being impregnated as a means of transferring shear between fiber strands roughly adjacent in a filament winding process and sticking the towpreg to the rotated member. "Pultrusion" is one of the processes of making a towpreg, where a tow is pulled through a resin to form—in a process conducted entirely in tension—elongated and typically hardened composites including the tow embedded in the resin.

As used herein, "extrusion" shall have its conventional meaning, e.g., a process in which a stock material is pressed through a die to take on a specific shape of a lower cross-sectional area than the stock material. Fused Filament Fabrication (FFF) is an extrusion process. Similarly, "extrusion nozzle" shall have its conventional meaning, e.g., a device designed to control the direction or characteristics of an extrusion fluid flow, especially to increase velocity and/or restrict cross-sectional area, as the fluid flow exits (or enters) an enclosed chamber.

In contrast, the present disclosure shall use the coined word "push-pultrusion" to describe the overall novel process according to the invention, in which unlike extrusion, forward motion of the fiber reinforced composite printing material includes a starting, threading, or initialization phase of compression followed by tension of embedded fiber strands, as well as melted/cured and unmelted/uncured states of the matrix throughout the printhead as the printing material forms bonded ranks on a build table, and successively within a part. The present disclosure shall also use the coined word "conduit nozzle" or "nozzlet" to describe a terminal printing head according to the invention, in which unlike a FFF nozzle, there is no significant back pressure, or additional velocity created in the printing material, and the cross sectional area of the printing material, including the matrix and the embedded fiber(s), remains substantially similar throughout the process (even as deposited in bonded ranks to the part).

As used herein, "deposition head" shall include extrusion nozzles, conduit nozzles, and/or hybrid nozzles.

The present disclosure shall also use the coined word "push-pulpreg" to describe a material useful in push-pultrusion, which—in contrast to a conventional towpreg—the resin is preferably a thermoplastic that (i) provides sufficient friction and exposed resin material to be fed by rollers or other friction feed (ii) is sufficiently stiff (i.e., normal unmelted elastic modulus) to be pushed through a clearance fit tube or channel without buckling in an unmelted, "glass" state, the stiffness provided by the embedded fiber strands and to a lesser extent the unmelted matrix resin (iii) and/or has no appreciable "tack"/molecular diffusion in ambient conditions, i.e., is in a "glass" state in ambient or even warmed conditions so that it can be readily pushed through such a tube without sticking.

Consolidation is typically advantageous to remove voids that result from the inability of the resin to fully displace air from the fiber bundle, tow, or roving during the processes that have been used to impregnate the fibers with resin. The individually impregnated roving yarns, tows, plies, or layers of prepregs are usually consolidated by heat and pressure by compacting in an autoclave. The consolidation step has generally required the application of very high pressures and high temperatures under vacuum for relatively long times. Furthermore, the consolidation process step using an autoclave or oven requires a "bagging" operation to provide the lay-up with a sealed membrane over the tool to allow a vacuum to be applied for removal of air and to provide the pressure differential necessary to effect consolidation in the autoclave. This process step further reduces the total productivity of the composite part operation. Thus, for a thermoplastic composite it would be advantageous to in-situ consolidate to a low void composite while laminating the tape to the substrate with the ATL/AFP machine. This process is typically referred to as in-situ ATL/AFP and the material used in that process called an in-situ grade tape.

Lastly, in the three-dimensional printing art, "filament" typically refers to the entire cross-sectional area of a spooled build material, while in the composites art, "filament" refers to individual fibers of, for example, carbon fiber (in which, for example, a "1K tow" will have 1000 individual strands). For the purposes of the present disclosure, "filament" shall retain the meaning from three-dimensional printing, and "strand" shall mean individual fibers that are, for example, embedded in a matrix, together forming an entire composite "filament".

Additive manufacturing methods often result in reduced the strength and durability versus conventional molding methods. For example, Fused Filament Fabrication results in a part exhibiting a lower strength than a comparable injection molded part, due to weaker bonding between the adjoining strips (e.g., "bonded ranks") of deposited material (as well as air pockets and voids.

Prepreg sheet composite construction method are time consuming and difficult, and thereby expensive. Further, bending prepreg sheets around curves may cause the fibers to overlap, buckle, and/or distort resulting in undesirable soft spots.

Feeding a commercial fiber "Towpreg" through a plastic bath to add matrix resin, then further feeding through a custom print head does not result in a viable additive process, due to the extremely flexible and high-friction (sticky) construction. Moreover, this process binds the speed of manufacturing this composite to the speed of printing it (even were printing viable). Towpreg typically requires, and is sold with appropriate "tack" (a level of room-temperature adhesion sufficient to maintain the position of the tow after it has been deposited on a tool or lay-up). Further, towpreg "green" materials tend to entrap air and include air voids, which are only removed by high tension and/or a subsequent vacuum and/or heating steps. These steps also slow down the printing process.

Accordingly, there is a need for composite additive manufacturing that is faster than lay-up or winding; that reduces or prevents entrapped air in the bonded ranks, avoiding most vacuum or heating post-processes; that provides an ability to deposit composite material in concave shapes, and/or construct discrete features on a surface or composite shell.

Turning now to the figures, specific embodiments of the disclosed materials and three dimensional printing processes are described.

FIG. 1A depicts an embodiment of a three dimensional printer 3000 in before applying a fiber reinforced composite filament 2 to build a structure. The fiber reinforced composite filament 2 (also referred to herein as continuous core reinforced filament) may be a push-pulpreg that is substantially void free and includes a polymer or resin 4 that coats or impregnates an internal continuous single core or multistrand core 6.

The fiber reinforced composite filament 2 is fed through a conduit nozzle 10 heated (e.g., by a band heater or coil heater) to a controlled push-pultrusion temperature selected for the matrix material to maintain a predetermined viscosity, and/or a predetermined amount force of adhesion of bonded ranks, and/or a surface finish. In some embodiments, the filament 2 is dragged or pulled through the conduit nozzle 10 as described herein. The push-pultrusion may be greater than the melting temperature of the polymer 4, less than a decomposition temperature of the polymer 4 and less than either the melting or decomposition temperature of the core 6.

After being heated in the conduit nozzle 10 and having the matrix material or polymer 4 substantially melted, the continuous core reinforced filament 2 is applied onto a build platen 16 to build successive layers 14 to form a three dimensional structure. One or both of (i) the position and orientation of the build platen 16 or (ii) the position and orientation of the conduit nozzle 10 are controlled by a controller 20 to deposit the continuous core reinforced filament 2 in the desired location and direction. Position and orientation control mechanisms include gantry systems, robotic arms, and/or H frames, any of these equipped with position and/or displacement sensors to the controller 20 to monitor the relative position or velocity of conduit nozzle 10 relative to the build platen 16 and/or the layers 14 of the part being constructed. The controller 20 may use sensed X, Y, and/or Z positions and/or displacement or velocity vectors to control subsequent movements of the conduit nozzle 10 or platen 16. For example, the three dimensional printer 1000 may include a rangefinder 15 to measure distance to the platen 16, a displacement transducers in any of three translation and/or three rotation axes, distance integrators, and/or accelerometers detecting a position or movement of the conduit nozzle 10 to the build platen 16. As depicted in FIG. 1A, a range sensor 15 (e.g., laser) may scan the section ahead of the conduit nozzle 10 in order to correct the Z height of the conduit nozzle 10, or the fill volume required, to match a desired deposition profile. This measurement may also be used to fill in voids detected in the part. The range finder 15 may measure the part after the filament is applied to confirm the depth and position of the deposited bonded ranks.

The three dimensional printer 3000 may include a cutter 8 controlled by the controller 20 that cuts the continuous core reinforced filament (e.g., without the formation of tails) during the deposition process in order to (i) form separate features and components on the structure as well as (ii) control the directionality or anisotropy of the deposited material and/or bonded ranks in multiple sections and layers. As depicted the cutter 8 is a cutting blade associated with a backing plate 12 located at the conduit nozzle eyelet or outlet. Other cutters include laser, high-pressure air or fluid, or shears.

FIG. 1A also depicts at least one secondary print head 18 optionally employed with the three dimensional printer 3000 to print, e.g., protective coatings on the part including 100% resin FFF extrusion, a UV resistant or a scratch resistant coating. A description of a coupled or compound FFF printhead 1800 may be found herein, and this description applies to protective coatings in general.

FIG. 1B depicts an embodiment of a three dimensional printer 3001 in applying a fiber reinforced composite filament 2 to build a structure. Like numbered features are similar to those described with respect to FIG. 1A.

As depicted in FIG. 1B, upstream of a driven roller 42 and an idle roller 40, a spool (not shown) supplies under mild tension an unmelted void free fiber reinforced composite filament. The filament including at least one axial fiber strand extending within a matrix material of the filament, having no substantial air gaps within the matrix material. In this example, the fiber reinforced composite filament 2 is a push-pulpreg including a nylon matrix 4A that impregnates hundreds or thousands of continuous carbon fiber strands 6A.

A "zone" as discussed herein is a segment of the entire trajectory of the filament from the spool (not shown) to the part. The driven roller 42 and an idle roller 40 feed or push the unmelted filament at a feed rate (which is optionally variably controllable by the controller 20, not shown, and optionally is less than the printing rate, with any differential between these rates absorbed along the filament by a slip clutch or one-way bearing), along a clearance fit zone 3010, 3020 that prevents buckling of filament. Within a non-contact cavity or non-contact zone 714, the matrix material of the composite filament may be heated. The fibers 6A within may be under axial compression at the threading stage or beginning of the printing process, as the feeding or pushing force of the rollers 42, 40 transmits through the unmelted matrix to the fibers along the clearance fit zone 3010, 3020.

"Threading" is a method of pushing a pushpreg or push-pulpreg through an outlet wherein the stiffness of the pushpreg or push-pulpreg is sufficiently greater than the sticking/drag force (to prevent buckling or flaring I jamming of the pushpreg or push-pulpreg) over the time scale of the stitching operation. Initially, in a threading stage, the melted matrix material 6A and the axial fiber strands 4A of the filament 2 are pressed into the part with axial compression, and as the build platen and print head are translated with respect to one another, the end of the filament contacts the ironing lip 726 and is subsequently continually ironed in a transverse pressure zone 3040 to form bonded ranks in the part 14. Transverse pressure means pressure to the side of the filament, and is also discussed herein as "ironing". As shown by the arrow, this transverse pressure zone 3040 (along with attached parts of the print head) may be translated adjacent to the part 14 at a printing rate (or the printing rate may be a result of translation of both or either one of the platen 16 and print head).

The matrix material is, in this example, with respect to tensile and compressive elastic modulus, a thermoplastic resin having an unmelted elastic modulus of approximately 0.1 through 5 GPa and a melted elastic modulus of less than 0.1 GPa, and the fiber strands are of a stranded material having an elastic modulus of approximately 5-1000 GPa. In this manner, the strands of fiber are sufficiently resistant to deformation to enable the entire filament to be "pushed" through limited friction in small clearance channels, and even through free space when the matrix is melted. With respect to tensile ultimate strength, the matrix material is preferably a thermoplastic resin having an unmelted ultimate tensile strength of approximately 10 through 100 MPa and a melted ultimate tensile strength of less than 10 MPa, and the at least one axial strand includes a stranded material having an ultimate tensile strength of approximately 200-100000 MPa. In this manner, the internal strands of fiber are sufficiently resistant to stretching or snapping to enable the entire filament to be maintained in neutral to positive (i.e., from zero tension and higher amounts of tension) tension over significant distances extending through free space from the bonded ranks, in some cases before the matrix fully solidifies. Most filaments will have a cross sectional area greater than $1 \times 10^{-5}$ (1×10E-5) inches and less than $2 \times 10^{-3}$ (2×10E-3) inches. In the case of multi-strand fibers, the filament may include, in any cross-section area, between 100 and 6000 overlapping axial strands or parallel continuous axial strands (particularly in the case of carbon fiber strands).

Either or both of the printing head or conduit nozzle 708 or the build platform 16 may be translated, e.g., the feed rate and/or the printing rate are controlled to maintain compression in the filament in the threading stage, and to maintain neutral to positive tension in the printing operation. The matrix material 4A of the filament 2 may be heated and melted in the non-contact zone 3030 (in particular, so that there is less opportunity to stick to the walls of the conduit nozzle 708), but is melted or liquefied at the ironing lip or tip 726. The larger or diverging diameter of the non-contact zone optionally prevents the filament from touching a heated wall 714 of the cavity defining the non-contact zone. The feed and printing rates may be monitored or controlled to maintain compression, neutral tension, or positive tension within the unsupported zone as well as primarily via axial compressive or tensile force within fiber strand(s) extending along the filament.

Figure 1C:
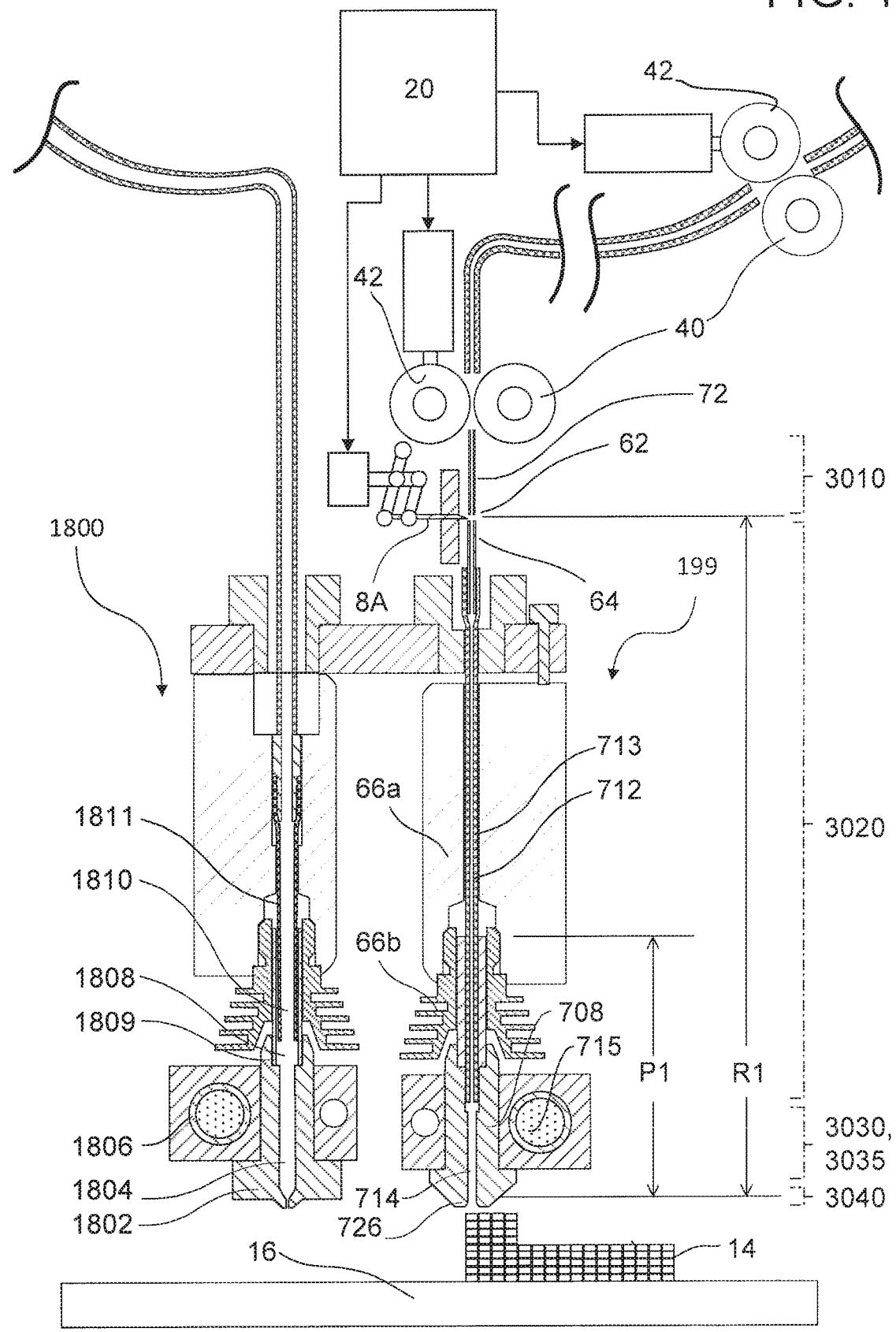

As shown in FIGS. 1B and 1C, the transverse pressure zone 3040 includes an ironing lip 726 that reshapes the filament 2. This ironing lip 726 may be a member that compacts or presses the filament 2 into the part to become bonded ranks. The ironing lip 726 may also receive heat conducted from the heated walls 714 or other heat source, in order to melt or liquefy the matrix material 4A of the filament 2 in the transverse pressure zone 3040. Optionally, the ironing lip 726 in the transverse pressure zone 3040 flattens the melted filament 2 on the top side, applying an ironing force to the melted matrix material and the axial fiber strands as the filament 2 is deposited in bonded ranks. This may be facilitated by ensuring that the height of the bottom of the ironing lip 726 to the top of the layer below is less than the diameter of the filament. Another reshaping force is applied spaced opposite of the ironing lip 726 to the melted matrix material and the axial fiber strands as a normal reaction force from the part itself. This flattens the bonded ranks on at least two sides as the melted matrix material 4A and the axial fiber strands 6A are pressed into the part 14 in the transverse pressure zone 3040 to form laterally and vertically bonded ranks (i.e., the ironing also forces the bonded ranks into adjacent ranks).

Accordingly, the ironing lip 726 and the normal reaction force from the part itself oppose one another and sandwich or press the melted composite filament therebetween to form the bonded ranks in the part 14. The pressure and heat applied by ironing improves diffusion and fiber penetration into neighboring ranks.

As shown in FIG. 1B, in this example, unmelted fiber reinforced filament is cut at or adjacent the clearance fit zone 3010, 3020. It may be cut, as shown in FIG. 1A, in a gap 62 between a guide tube 72 (having a clearance fit) and the conduit nozzle 708, or may be cut within the conduit nozzle 708, e.g., upstream of the non-contact zone 3030. Alternatively or in addition, the core reinforced filament may be cut by a cutter 8 positioned at or adjacent either one of the clearance fit zone 3010, 3020 or the ironing lip 725. The clearance fit zone 3010, 3020 includes an optionally interrupted channel forming a clearance fit about the fiber reinforced composite filament 2, and this is preferably one of a running fit or a clearance location fit, in any even sufficient clearance to permit the filament to be pushed along, even in axial compression, without sticking and without buckling.

The pushing/feeding along the axial direction, and ironing within the transverse pressure zone 3040 are not necessarily the only forces forming the bonded rows. Alternatively, or in addition, the transverse pressure zone 3040 and/or ironing lip 726 are translated respective to the part 14 at a printing rate that maintains neutral to positive tension in the fiber reinforced composite filament 2 between the ironing lip 726 and the bonded ranks of the part 14, this tension being less than that necessary to separate a bonded rank from the part 14.

For example, after the matrix material 6A is melted by the ironing lip or tip 726, the feed and/or printing rate can be controlled by the controller 20 to maintain neutral to positive tension in the composite filament 2 between the ironing lip 726 and the part 14 primarily via tensile force within the fiber strands 4A extending along the filament 2. This is especially the case at the end of bonded ranks and in making a turn to begin a new adjacent rank in the opposite direction, as pressure from the ironing lip into the part 14 may be released. This can also be used to form bridges through open space, e.g. by drawing the fiber reinforced composite filament 2 in the transverse pressure zone 3040 from a connection to a first portion of the part 14; then translating the transverse pressure zone 3040 through free space; then ironing to reconnect the fiber reinforced composite filament 2 to a second portion of the part 14.

Unlike a true extrusion process, the cross sectional area of the filament 2 is substantially maintained the entire time, and none of the strands, the matrix, nor the filament 2 lengthens nor shortens appreciably. The feed rate of the spooled push-pulpreg and the formation rate (the printing rate) of the bonded ranks are substantially the same (although for portions of the conveyance or feeding, slip clutches or one-way bearings may permit slack, build-up or differential). At times, the feed rate and the compression rate may be temporarily and differentially controlled to balance sufficient neutral to positive axial tension downstream of the ironing lip 726, or a slip clutch may be used to allow one of feed rate or printing rate to slip.

However, a substantially constant cross sectional area of the fiber reinforced composite filament is maintained in the clearance fit zone, the unsupported zone, the transverse pressure zone, and also as a bonded rank is attached to the workpiece or part 14.

FIG. 1C depicts a cross section of a compound (dual) print head with an extrusion printhead 1800 and extrusion nozzle 1802 for FFF and a fiber deposition printhead 199 and conduit nozzle 708 for continuous fiber reinforced thermoplastic deposition. Like numbered features are similar to those described with respect to FIGS. 1A and 1B. These two contrasting material types are not necessarily printed simultaneously, so it can be efficient to place them on the same X-Y mechanism (or X-Y-Z). This enables the two printheads 1800, 199 to share optional components both in manufacturing (e.g., commonly configured heat sinks, heater blocks, or insulation block) as well as share active components in operation (e.g., common cooling fans at the part-nozzle interface and/or for the heat sinks).

While each printhead 1800, 199 can be located independently and on its own movement mechanism, the adjacent juxtaposition in FIG. 1C facilitates the following contrasting discussion.

As noted herein, the FFF process uses pressure within upstream molten material to extrude downstream molten material out of the extrusion nozzle. That is, during a print run, slice, or path segment within a slice, thermoplastic FFF extrusion, maintains the part material loaded in a reservoir 1804, 1808 in the heated zone of the print head 1800 such that the material therein is molten, and thereby ready to print as quickly as possible after the prior segment is complete. While the filament is driven upstream in an unmelted temperature state, following a sharp thermal gradient 1808 created by a thermal isolator or resistor 1809 and maintained by air cooling, a reservoir 1804 of melted material awaits driving and pressurization.

As noted herein, in contrast, the fiber reinforced thermoplastic filament is specifically held in a non-molten position (e.g., within Teflon tube 713) so that it can be threaded to being each segment and then deposited. The process of "fiber force transfer" uses the stiffness of confined fiber 2 (e.g., confined via the relatively cold thermoplastic matrix and/or small-clearance tubes at 712, 64, 72) to push/pull a fiber and resin bundle through the fiber reinforced filament deposition side of the print head 199. This uses axial force extending within and along the non-molten strands that advance all the way through the tip 726 of the deposition nozzle 708, pulling the plastic resin coating with said fiber.

It is non-critical, but advantageous, to keep the fiber reinforced filament at ambient temperature and/or below glass transition temperature until it is within ½-3 cm from the ironing tip 726, i.e., retain it upstream and out of or insulated from/isolated from any heated zone 3030, 3035.

It is also non-critical, but advantageous, to reduce the surface area in contact or the residence time of potential filament-to-wall contact in the last ¼-1 cm of the conduit nozzle 708 by the techniques discussed herein, e.g., to allow mostly radiant heat transfer only, employing an inner diameter of the last stage 714 of the conduit nozzle of ½-5 times the filament diameter, e.g., 40 thou inner diameter nozzle for 13 thou filament, this larger inner diameter 714 being downstream of a smaller inner diameter (e.g., 32 thou at channel 712) to encourage staying away from the walls of cavity 714 and avoid interior ledges that may catch the filament 2 as it is threaded. As described herein, this is also a self-cleaning technique—wherein the pre-preg fiber embedded filament material 2 is guided to minimally touch the walls 714 of a hot conduit nozzle 708, such that the filament 2 can be threaded through without clogging, or peeling back fiber strands in the bundle.

It is also non-critical, but advantageous, to reduce the residence time of potential filament-to-wall 2-to-714 contact in the last ¼-1 cm of the conduit nozzle by the techniques discussed herein, e.g., to employ sufficient threading speed—e.g., 100 mm/s or higher—during threading to reduce the amount of heat transfer from any adjacent surface such as the inner diameter wall 714.

These non-critical techniques may be combined. As the conduit nozzle temperature increases above the glass transition temperature, it may be advantageous to reduce the residence time of the composite strand filament 2 in the conduit nozzle 708 by keeping the filament 2 upstream in the non-heated zone, and threading the filament 2 through the conduit nozzle 708 sufficiently quickly to prevent melting of the matrix Stationing the pre-preg continuous fiber filament 2 upstream of a hot conduit nozzle 708 when not printing, and/or using a larger diameter nozzle tip 714-726, and increases the ability to push the fiber core filament 2 through the nozzle 708 (threading), and discourages jamming or clogging, as the fiber core filament 2 do not stick to the nozzle wall 714 through adhesion and friction, and tend not to flare out when pushed. Some melting of matrix material in the last portion 714 of the conduit nozzle 708 is tolerable, as the small inner diameters 72, 712 and fiber 2 may retain sufficient stiffness to thread to the part. However, this increases the likelihood of clogging.

It is non-critical, but a less advantageous alternative, to use a cold conduit nozzle 708 for threading. In this case, the temperature of the conduit nozzle 708 is reduced to below the melting point of the matrix material (e.g., 40 degrees C.), and the cold filament 2 threaded therethrough. In this case, there is no short dwell time or filament speed requirement in threading. Disadvantageously, the conduit nozzle 708 would have to be cycled through cooling and heating steps for each segment printed, which could increase printing time considerably for short-segment prints.

Continuing with reference to FIG. 1C, each of the printheads 1800 and 199 are mounted on the same linear guide such that the X, Y motorized mechanism of the printer moves them in unison. As shown, the FFF printhead 1800 includes an extrusion nozzle 1802 with melt zone or melt reservoir 1804, a heater 1806 for heating the heater block and the nozzle. The melt reservoir 1804 continues into a high thermal gradient zone 1808, substantially formed by a thermal resistor 1809 mounted outside the heating block. A heat sink surrounds the thermal resistor 1809 to further enhance the thermal gradient. The thermal gradient separates the melt reservoir 1804 from an unmelted zone 1810, which may be inside the thermal resistor 1809 and/or a Teflon tube 1811. A 1.75-1.8 mm or 3 mm thermoplastic filament driven through, e.g., a Bowden tube provides extrusion back pressure in the melt reservoir 1804.

Parallel to, adjacent to, and of substantially the same height from the build platen 16, the a continuous fiber printhead 199 can be adjusted via a flexure and set-screw mechanism to move vertically relative to the extrusion printhead 1800 while firmly restricted to move only in the vertical direction relative to the extrusion printhead 1800. The companion continuous fiber embedded filament printhead 199, as shown, includes the conduit nozzle 708, the composite ironing tip 728, and the limited contact cavity 714, in this example each within a heating block heated by a heater 715. A cold feed zone 712 is formed within a receiving tube 64, including a capillary-like receiving tube of rigid material and a small diameter (e.g. inner diameter of 32 thou) Teflon/PTFE tube extending into the nozzle 708. The cold feed zone is surrounded in this case by a PEEK insulating block 66a and a heat sink 66b, but these are fully optional. In operation, an unattached terminal end of the fiber-embedded filament may be held in the cold feed zone, e.g., at height Pl. Distance Pl, as well as cutter-to-tip distance R1, arc retained in a database for permitting the controller to thread and advance the fiber-embedded filament as discussed herein. A thermal resistor, optionally of less thermal resistance than the thermal resistor 1809 of the FFF printhead 1800, cooperates with the Teflon/PTFE tube, Teflon/PEEK block 66a, and heat sink 66b to provide a thermal gradient marking the transition from the cold feed zone 712. Further as shown, the controller 20 is operatively connected to the cutter 8, 8A, and feed rollers 42 facing idle rollers 40.

FIG. 1D shows a schematic close-up cross section of the conduit nozzle 708. As shown in FIG. 1D, and depicted essentially proportionately, the inner diameter of the receiving tube 64 (in this case, at a position where a Teflon/PTFE inner tube forms the inner diameter) is approximately 1½ to 2½ times (at, e.g., 32 thou) the diameter of the filament 2 (at, e.g., 13 thou) shown therewithin. The inner diameter or inner width of the terminal cavity 714 (at, e.g., 40 thou (is from two to six times the diameter of the filament 2 shown therein. These are preferred ranges, it is considered the diameter of the receiving tube may be from 1 1/10 to 3 times the diameter of the filament, and the inner diameter of the terminal cavity from two to 12 times the diameter of the filament. The terminal cavity is preferably of larger diameter than the receiving tube.

In addition, as shown in essentially proportionately in FIG. 1D, the heated composite filament ironing tip 726 is moved relative to the part, at a height above the part of less than the filament diameter, to iron the fiber reinforced composite filament as it is deposited to reshape a substantially oval or circular bundle of inelastic axial fiber strands (labeled 2a) within the fiber reinforced composite filament to a substantially flattened block of inelastic fibers strands within a bonded rank (labeled 2C) of the part.

Features of the compound printing head are among the inventions discussed herein. For example, it is considered an optional part of the present invention to provide a three dimensional printer and printing process in which compound print heads (two or more) are provided, wherein one printing head 199 includes a composite filament ironing tip 708 that irons deposited fiber with heat and pressure as discussed herein, as well as an extrusion nozzle 1802 that extrudes thermoplastic compatible with the deposited fiber, but does not iron the thermoplastic ("ironing" fluidized thermoplastic is unlikely if not impossible); and/or where one printing head 199 holds filament and thermoplastic substantially away from the nozzle tip 726 between printing segments, and the other printing head 1800 maintains a molten thermoplastic reservoir 1804 immediately adjacent the nozzle 1802 tip between printing segments; and/or wherein one printing head 199 employs a cutter 8 to sever the filament 2 at a known distance R1 from the tip 708 in a cold feed zone 712 to separate one printed segment from a subsequent printed segment, where the other printing head 1800 employs no cutter but melts filament near a thermal gradient created by thermal resistor 1809 to separate one segment from the subsequent segment.

In addition or in the alternative, it is considered an optional part of the present invention to provide a three dimensional printer and printing process in which compound print heads (two or more) are provided, wherein one printing head 199 includes a terminal cavity 714 having at least 4 times the volume of any partially melted or melted thermoplastic-containing filament 2 resident therein or passing therethrough, and thereby the filament does not substantially contact, wet, or adhere to walls of that cavity 714, where the other printing head 1800 includes a terminal reservoir 1804 of identical volume to partially melted or melted thermoplastic-containing filament resident therein or passing therethrough, and thereby the molten thermoplastic fully contacts, wets, and/or adheres to walls of that reservoir 1804.

In addition or in the alternative, it is considered an optional part of the present invention to provide a three dimensional printer and printing process in which compound print heads (two or more) are provided, wherein the filament feed mechanism leading to the printing head 199 advances a continuous length filament 2 at substantially constant cross-sectional area and linear feed rate substantially through the entire printhead 199 to deposit it to a part 14 on a build platen 16, where the other print head 1800 melts and transforms, adjacent and upstream of the nozzle 1802 at the thermal gradient 1809, the cross-sectional area and linear feed rate to, e.g., for 1.75 mm supply filament, in the neighborhood of 10-20 times the linear feed rate (e.g., printing at 1/15 cross sectional area of the filament), and for 3.0 mm supply filament, in the neighborhood of 40-60 times the linear feed rate (e.g., printing at 1/50 cross sectional area of the filament).

In modification of any or all of the above, it is considered part of the present invention to provide a three dimensional printer and printing process in which compound print heads (two or more) are provided, wherein each print head 199, 1800 includes a Teflon/PTFE or other low-friction channel therethrough; and/or each print head 199, 1800 includes a thermal resistor that provides between ½ to ⅔ of a temperature drop between the respective nozzle 708, 1802 and unmelted zone; this thermal resistor being one of stainless steel, Hastelloy, Inconel, Incoloy, ceramic, or ceramic composite.

FIG. 2 presents a schematic flow diagram of a three dimensional printing process using the system and controller depicted in FIG. 1A, 1B, 1C or 4. In FIG. 2, more optional steps of the invention that individually or in any combination may modify some embodiments or aspects of the invention disclosed in FIG. 2 are denoted with dotted lines and an "A" suffix, although none of the steps shown are individually critical or in the particular order shown, except as inherently necessary. Initially a continuous core or multistrand fiber reinforced filament 2 is supplied (e.g., from a spool, as a push-pulpreg) at step S103. As shown in step S103A, supplying in cartridge form can be important, as it permits complete independence between processes of manufacturing the push-pulpreg and printing. That is, either manufacturing of push-pulpreg or printing could be a limiting speed factor, and by using prepared cartridges or rolls of interchangeable filament, each is made independent. In step SI 05, the filament 2 is drawn from the supply or spool (e.g., by rollers) and fed in an unmelted, relatively stiff state through a clearance fit, or a succession of clearance fits, that may prevent buckling of the filament as it is pushed and fed. Optionally, as shown in step S105A, during the threading or stitching process, the filament is fed in a manner that keeps axial compression in the filament 2 downstream of the feed (noting that this may change into axial neutral or positive tension in optional step S113A after the lateral pressing step S111) into the heated conduit nozzle 708.

In step S107, the filament (and thereby the matrix material) is heated to a desired temperature that is greater than a melting temperature of the resin and is less than a melting temperature of the continuous core or strands at step S107. This completion of this step may be out of order with respect to that shown in FIG. 2, i.e., the heating of the ironing tip 726 or other heating zone may be initiated at step S107, but the actual melting may take place only in step S111A. Moreover the heating zone may be the final zones along the path, i.e., the ironing tip or non-contact zone, as shown in optional step S107A. This step melts the matrix material throughout and permits the shape of the filament to change, e.g., from a circular cross section or an oval cross section to a square or rectangular cross section as it is packed/pressed into the part, while nonetheless keeping a substantially similar or identical cross sectional area. As noted in optional step S107A, this heating may take place in or at an ironing tip 726 at the tip of the conduit nozzle. Further, within a non-contact the zone 714 or 3030, the walls of the conduit nozzle 708 are sufficiently distant from the filament 2 such that even heating into a plastic, glass transition or tacky form will not adhere the filament to the walls. At step S108, the controller 20 of the three dimensional printer 1000, 199 controls, (optionally in step S108A using the sensors described herein), position, speed, or acceleration of the conduit nozzle 708 relative to the build platen 16 or part, and may also monitor distances therebetween and temperature properties at each zone or within each zone.

In step S110, while controlling the position and movement of the heated conduit nozzle 708, the controller 20 controls the feed rate, print rate, cutter 8 and/or temperatures to maintain an axial compression in the close fitting zone 3010 or 3020 (upstream and downstream of a cutter 8) and the heating and/or non-contact zone 714, 3030 in the threading phase, or, in the printing phase; and/or controls pressing, compressing, or flattening pressure or force within zone 3040; and/or in the printing phase controls axial neutral to positive tension within the filament between the bonded ranks within the part 14 and the lateral or transverse pressure zone 3040 and/or ironing lip 208, 508, and/or 726.

In step S111, under the control of the controller 120, the filament (matrix and fibers) 2 is pressed into the part 14. Optionally, as shown in step S111A, this is performed with an ironing lip or tip 208, 508, and/or 726, which may be smooth but also may be more like a doctor blade (for abrasion resistant fibers such as aramid). Simultaneously, the pressing zone 3040 and/or built platen or platform 16 are translated (optionally in 3 axes, and further optionally rotated in 3 rotational axes) with respect to one another at step S113. Optionally as shown by optional step S113A, in this step S113, neutral or positive tension is maintained and/or increased in the filament between the tip 208, 508, and/or 726 and the part 14.

In step S115, the ironing (pressing and heating) and relative translating (or relative printing motion for multi-axis implementations) adheres the bottom and sides of melted matrix within the filament 2 to form bonded ranks in the part 14. As discussed herein and as shown in step S115A, these ranks may optionally be tight boustrophedon ranks, may be circular, oval or oblate loops (e.g., racetrack shapes for long parts), may proceed with small turns in a "Zamboni" pattern, and in any of these patterns or other patterns may be successively laid up such that one layer is parallel with or overlapping the layer below, or is transverse to (perpendicular or angled) to the layer below.

In step S117, after reaching the desired termination point, the continuous core reinforced filament may be cut. As discussed in steps S117 and S117A, "cut" includes cutting at a position within the compression zone 3010, 3020, in particular upstream of the conduit nozzle 708, and in particular of the filament in an unmelted, glass state of the matrix material. "Cut" may also include cutting at a position in downstream or adjacent of the conduit nozzle 708. In addition, "cut" may include, for embodiments in which the continuous strands are formed in discrete, separated segments within the filament, pulling the conduit nozzle 708 and build platen 16 away from one another to separate the matrix material at a location where one segment of continuous fiber is adjacent the next. The controller 20 may then determine if the three-dimensional part is completed. If the printing process is not completed the controller may return to step S108 during which it senses the current position and movement of the conduit nozzle prior to depositing the next piece of continuous core reinforced filament. If the part is completed, the final part may be removed from the build platen. Alternatively, an optional coating may be deposited on the part using a secondary print head at S121 to provide a protective coating and/or apply a figure or image to the final part.

Figure 4:
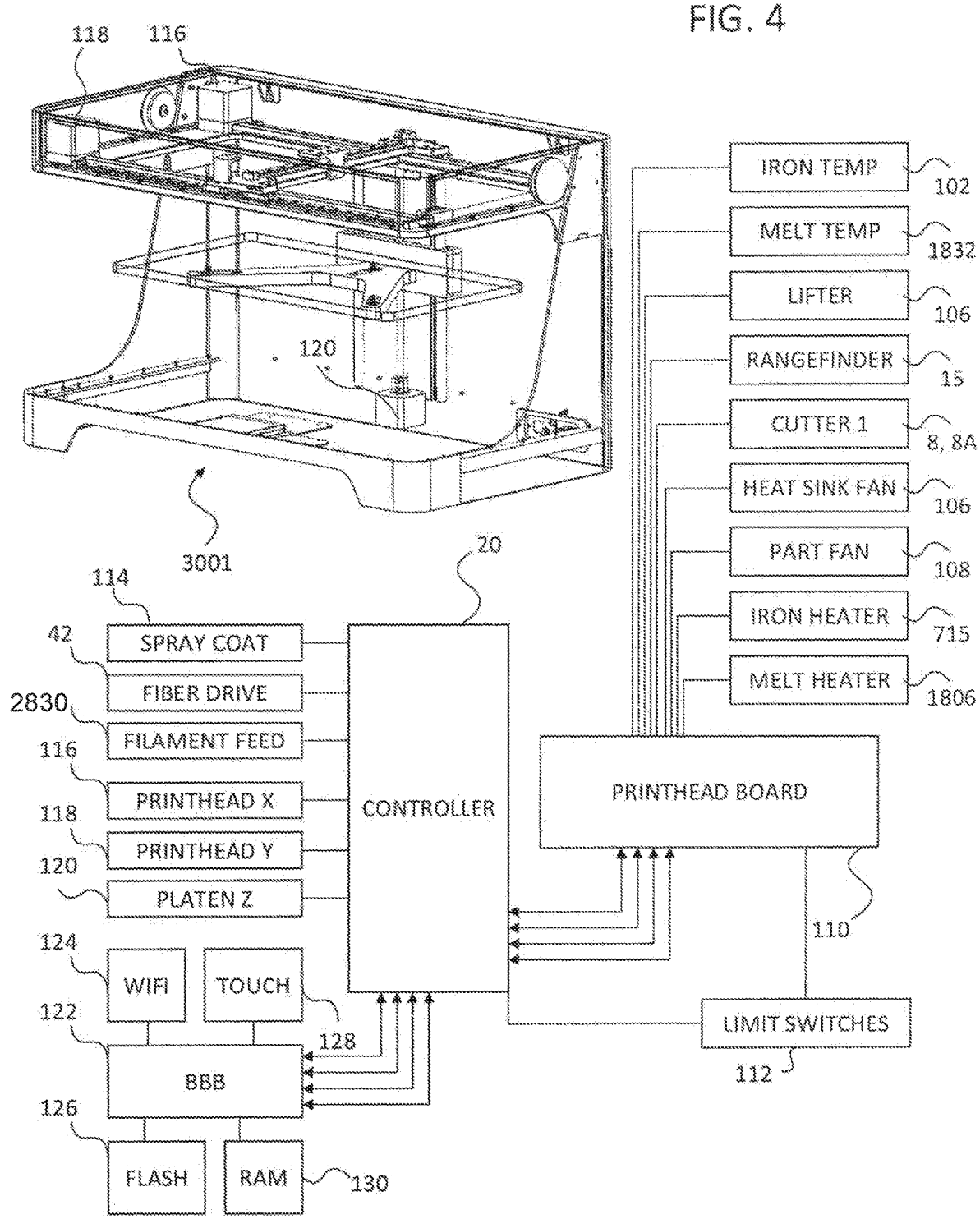
FIG. 4 is a block diagram and schematic representation of a three dimensional printer capable of printing with the compound extrusion and fiber printhead assembly of FIG. 1C.

FIGS. 3A-3D are schematic representations of a different possible filaments useful with the invention, although these are not necessarily to scale. FIGS. 3A and 3B depict cross-sections having a solid continuous core 6a (e.g., a fiberglass fiber) and surrounding thermoplastic polymer 4 or resin, respectively greater than 70% resin by cross-sectional area and less than 30% resin (each by cross-sectional area). FIGS. 3C and 3D depict cross-sections having multi-strand fibers surrounded by and wicked/wetted by thermoplastic resin, respectively greater than 60% resin and all fibers being 1% diameter or more from the perimeter; and less than 30% resin with fibers distributed throughout the filament and protruding from the perimeter. FIG. 4 depicts a cross-section similar to FIG. 3D but including one or more separate secondary functional strands 6c and 6d (with electrical, optical, thermal or fluidic conducting properties to conduct power, signals, heat, and/or fluids as well as for structural health monitoring and other desired functionalities). For carbon fiber, resin amounts for printing in push-pulpreg manner are from 30-90% (i.e., 10-70% fiber by cross sectional area).

According to one embodiment or aspect of the invention, the polymer material is pre-impregnated as a push-pulpreg such that the molten polymer or resin wicks into the reinforcing fibers during the initial production of the material, optionally into the entire cross-section of a multifilament. Optionally per this aspect of the invention, strands of fiber may be pre-treated with a coating(s) or agents, such as a plasticizer, energy application by radiation, temperature, pressure, or ultrasonic application to aid the polymer or resin wicking into the cross section of the multifilament core without voids. The heating temperature of the printing process in zone 3030 may be at a lower temperature and/or higher viscosity of melted material than the temperature or energy necessary to accomplish wetting, wicking, tacking, or interstitial penetration at lower viscosity to fill voids. Preparing the push-pulpreg as a void-free prepreg permits filament width and other properties (e.g., stiffness, smoothness) to be predetermined, reducing the need for complicated measurement and variable control for different filaments (of the same type, or of different types).

According to one embodiment or aspects of the invention, a vacuum is provided within the heated section 714 of conduit nozzle 708 to remove air (including voids) while the matrix material is melted. This construction may be used even with filaments which may have air voids within (e.g., "green material") including a solid or multifilament core while under vacuum. In the alternative to or in addition to the vacuum removal of voids the present invention, the filament may be forced through a circuitous path, which may be provided by offset rollers or other configurations, to mechanically work out entrapped air.

FIG. 4 depicts a block diagram and control system of the three dimensional printer which controls the mechanisms, sensors, and actuators therein, and executes instructions to perform the control profiles depicted in FIG. 5 and processes depicted in FIGS. 2 and 11-13. A printer is depicted in schematic form to show possible configurations of three commanded motors 116, 118, and 120. It should be noted that this printer may include the compound assembly of printheads 199, 1800 depicted in FIG. 1C.

As depicted in FIG. 4, the three-dimensional printer 3001 includes a controller 20 which is operatively connected to the fiber head heater 715, the driven roller 42 and the plurality of actuators 116, 118, 120, wherein the controller 20 executes instructions which cause the filament drive to hold an unattached terminal end of the composite filament 2 in the cold feed zone 712 between the driven roller 42 and the ironing tip 726. The instructions are held in flash memory and executed in RAM (not shown; may be embedded in the controller 20). An actuator 114 for applying a spray coat, as discussed herein, may also be connected to the controller 20. In addition to the driven roller 42, a filament feed 2830 be controlled by the controller to supply the extrusion printhead 1800. A printhead board 110, optionally mounted on the compound printhead 199, 1800 and moving therewith and connected to the main controller 20 via ribbon cable, breaks out certain inputs and outputs. The temperature of the ironing tip 726 may be monitored by the controller 20 by a thermistor or thermocouple 102; and the temperature of the heater block holding nozzle 1802 of any companion extrusion printhead 1800 may be measured by a thermistor or thermocouple 1832. A heater 715 for heating the ironing tip 726 and a heater 1806 for heating the extrusion nozzle 1802 are controlled by the controller 20. A heat sink fan 106 and a part fan 108, each for cooling, may be shared between the printheads 199, 1800 and controlled by the controller 20. Rangefinder 15 is also monitored by the controller 20. The cutter 8 actuator, which may be a servomotor, a solenoid, or equivalent, is also operatively connected. A lifter motor for lifting one or either printhead 199, 1800 away from the part (e.g., to control dripping) may also be controlled. Limit switches 112 for detecting when the actuators 116, 118, 120 have reached the end of their proper travel range are also monitored by the controller 20.

As depicted in FIG. 4, an additional breakout board 122, which may include a separate microcontroller, provides user interface and connectivity to the controller 20. An 802.11 Wi-Fi transceiver connects the controller to a local wireless network and to the Internet at large and sends and receives remote inputs, commands, and control parameters. A touch screen display panel 128 provides user feedback and accepts inputs, commands, and control parameters from the user. Flash memory 126 and RAM 130 store programs and active instructions for the user interface microcontroller and the controller 20.

Figure 12:
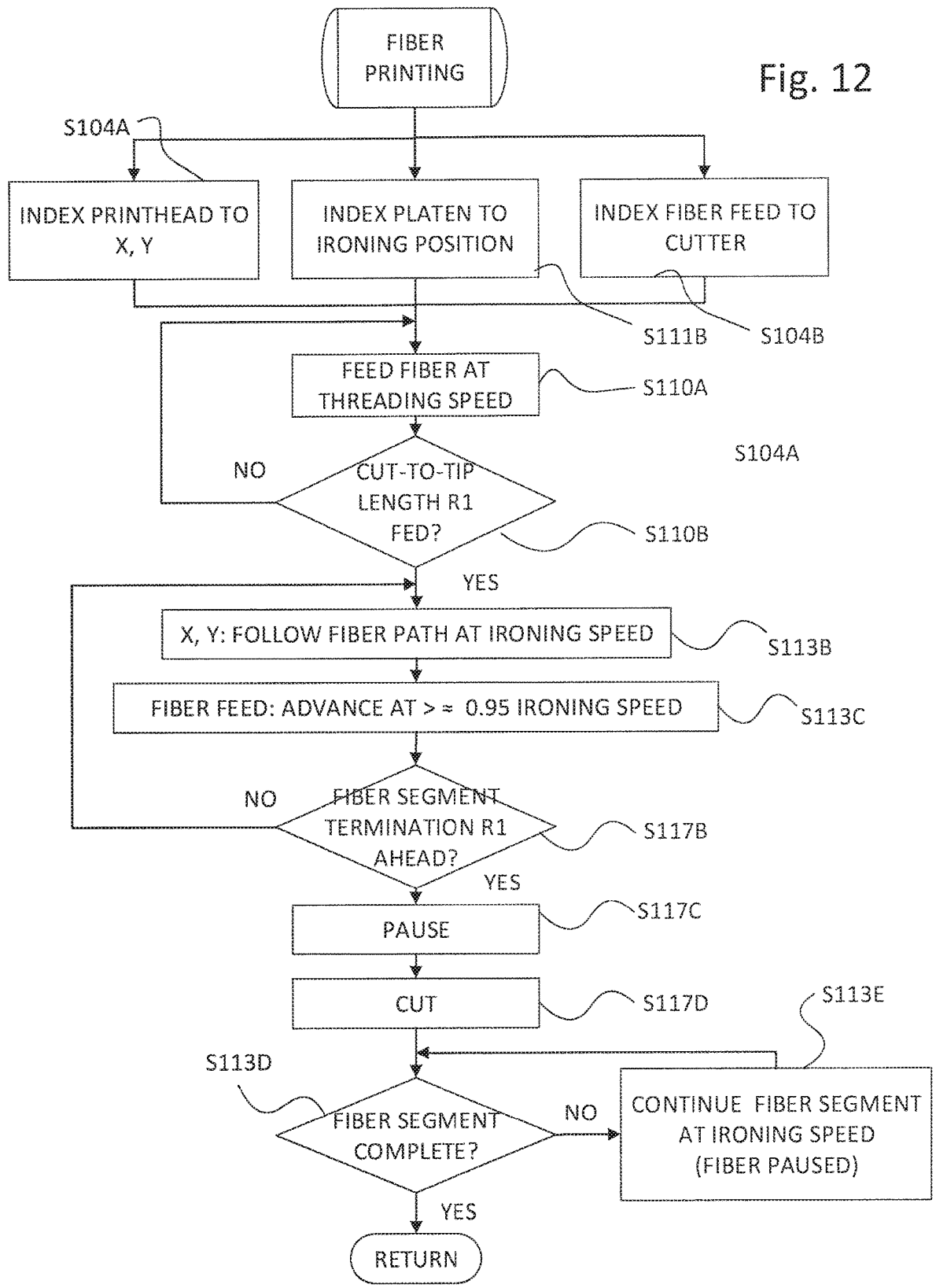
FIG. 12 is a flowchart describing control and command execution of the printer shown in FIGS. 1C and 5, for printing fiber modes as shown in FIG. 5.
Figure 13:
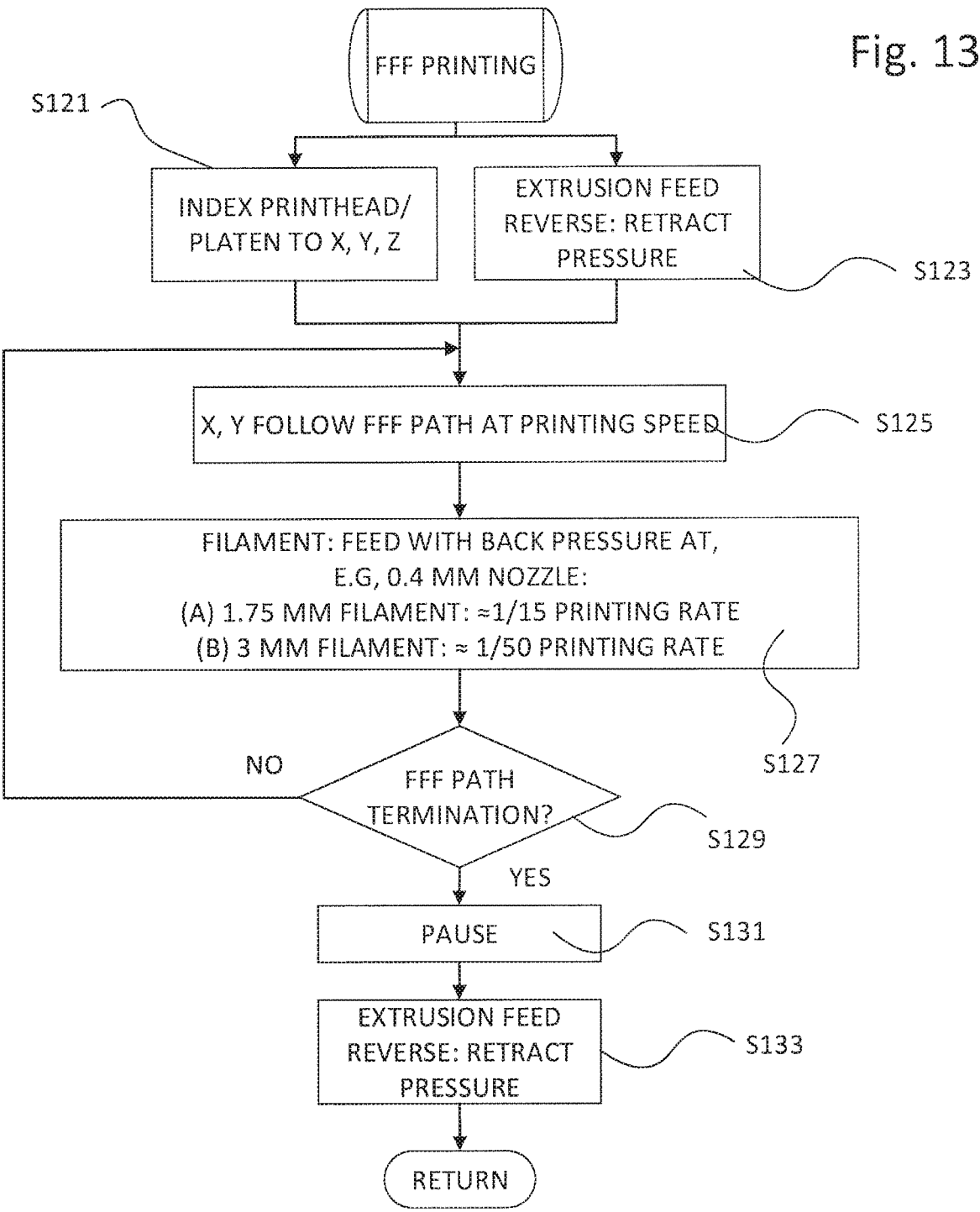
FIG. 13 is a flowchart describing control and command execution of the printer shown in FIGS. 1C and 5, for printing in extrusion mode as shown in FIG. 5.

FIG. 5 includes timing diagrams representative of a threading and segment printing operation of the fiber printhead 199 and carried out, e.g., pursuant to instructions representative of the routine in FIG. 12, and comparative or companion extrusion operations of the extrusion printhead 1800 as carried out, e.g., pursuant to instructions representative of the routine in FIG. 13 (or another extrusion printhead). For convenience in comparison, each timing diagram carries out the beginning of a segment to be printed in alignment at time T4 (for fiber) and T34 (for extrusion), although in practice this would not be carried out if the printheads were borne by the same actuating assembly.

Beginning with the fiber deposition process at the top of FIG. 5, at time T0, the controller 20 commands the driven roller 42 to advance the fiber filament 2 from its resting position (e.g., in the cold feed zone 712, or adjacent the cutter 8, or both). The threading speed "T" is retained in the database in flash and/or RAM. This begins the threading process. It should be noted that an initial threading process will not include a cut from the previous rank (shown at T6'). The threading process continues while the fiber filament 2 is driven all the way to the ironing tip 726 at time T2 at the threading speed T by the runout distance R1 (also stored in the database in flash and/or RAM). At this point, the unattached terminal end of the fiber filament 2 has reached the part 14 or build platen 16 itself if this is the first segment. At T2, deposition of the fiber filament 2 beings. FIG. 5 depicts a speed transition at T2, i.e., a faster threading speed T than feeding speed F, but the feeding speed F may be the same, higher, or lower than the threading speed.

More importantly, substantially simultaneously with time T2, at time T4 at least one of the actuators 116, 118 is driven to begin moving the build platen 16 with respect to the printhead 199 at a velocity similar to that of the feeding speed F. Both actuators 116, 118 may activate in the same or opposite directions or idle as necessary to form straight, diagonal, and curved path segments in any 2 dimensional direction. As detailed herein, a slipping mechanism may permit the fiber filament 2 to be both ironed by the lip 726 and pulled from the printhead 199 while the driven roller 42 slips, or the actuators 116, 118 and driven roller 42 may be more actively or feedback controlled to maintain a neutral to positive tension in the fiber filament 2. T4 is preferably substantially simultaneous with T2, but may be slightly (e.g., one or two mm) before or after T2. Each of the driven roller 42 and active actuator(s) of 116 and 118 continues to drive throughout the planned path of the fiber along the segment being printed. A break in the timing chart accommodates a variable length of the segment.

As the end of the segment approaches, the fiber filament 2 must be severed. Preferably, one or both of the fiber drive 42 and the active actuator 116 and/or 118 are paused before severing, e.g., at T6 for the driven roller 42 and at T8 for the exemplary active actuator of 116 and 118. The fiber filament 2 is held between the part 14 and the driven roller 42 and can potentially be driven by either. The cutter 8 is actuated to quickly sever the fiber filament at T7. Subsequently, the runout distance R1 of fiber filament 2 remains in the printhead 199 extending to the cutter 8, but must still be printed. Accordingly, although the driven roller 42 does not restart after the pause (there is no need), the actuator(s) 116, 118 continue following the controller-directed path of the segment, again by the runout distance R1, until the tail of the fiber filament 2 is bonded to the part 14 at time T10. It is an optional part of the invention(s) herein that at least part of the printing and/or ironing of bonded ranks or segments into the part 14 is carried out with no driven roller 42 in contact with the filament 2 being printed. As show 11 in FIG. 5 by earlier times T6', T7', T8', and T'10', a preceding segment may follow the same steps. Similarly, a following segment may follow the same steps, and/or the build platen 16 may be indexed down (at time T12) to begin another segment of another slice.

With reference to the upper part of FIG. 5, it should be noted that while the threading process between TO and T2 preferably takes place immediately before the segment path is started, and must take place before the segment path is started, the runout distance may be taken up during idle periods. For example, immediately following T6, or any time during the span from T8' through T4, the driven roller 42 may advance the fiber at least to the end of the cold feed zone 712, to a position where the unattached terminal end of the fiber filament 2 may rest in an unmelted state, but more proximate the ironing lip. It an optional part of the present invention to advance fiber filament 2 along the path from the driven roller 42 to a position within the cold feed zone 712 during times when the actuators 116, 118 are printing and/or ironing the runout of the severed fiber filament 2 to complete a printing segment.

With reference to the lower part of FIG. 5, extrusion printing is different. When a segment is begun, at e.g. time T32, a priming pressure P (a higher feed rate) is applied for a very short time to ensure the end of the segment is level with the remainder of the segment. The actuators 116, 118 move the printing head 1800 beginning essentially simultaneously with the extrusion feed at time T34. The linear advance speed E of the thermoplastic filament advanced by the extrusion drive 1830 is remarkably different from the speed of printing (e.g., 10-100 times) because the pure thermoplastic filament is wholly melted and accumulated in the reservoir 1804, and subsequently extruded through the small diameter nozzle 1802. At the end of a segment, at time T36 for the extrusion drive and time T40 for the actuators 116, 118 moving the printhead 1800, the extrusion speed may be slightly reduced at time T36. However, the reservoir 1804 pressure is released primarily by the high speed retraction of the filament by the extrusion drive 1830 at time T38. A following segment may follow the same steps, and/or the build platen 16 may be indexed down (at time T42) to begin another segment of another slice.

As noted herein, deposition heads which guide a core reinforced filament therethrough with a matched velocity throughout are referred to as "conduit nozzles" whereas deposition heads which neck down and extrude under back pressure melted non-reinforced polymer at a higher velocity than the supply filament are referred to as "extrusion nozzles" (according to the conventional meaning of "extrude").

Figure 6C:
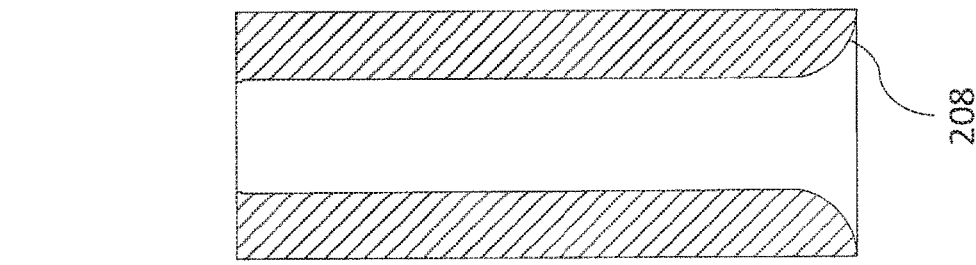
FIG. 6A-6C are schematic representations of conduit nozzles utilized in some embodiments of the printing system.
Figure 6B:
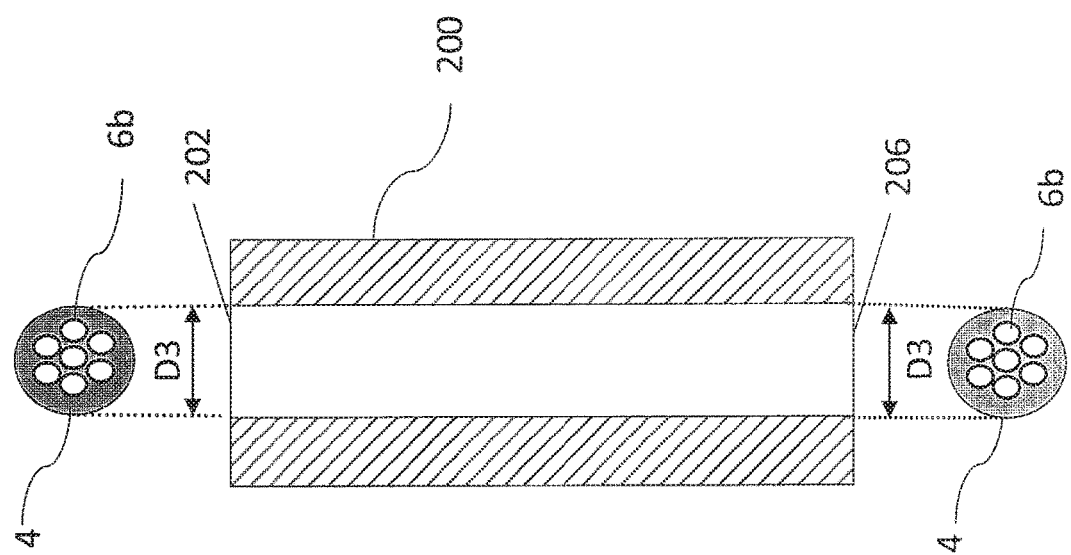
Figure 6A:
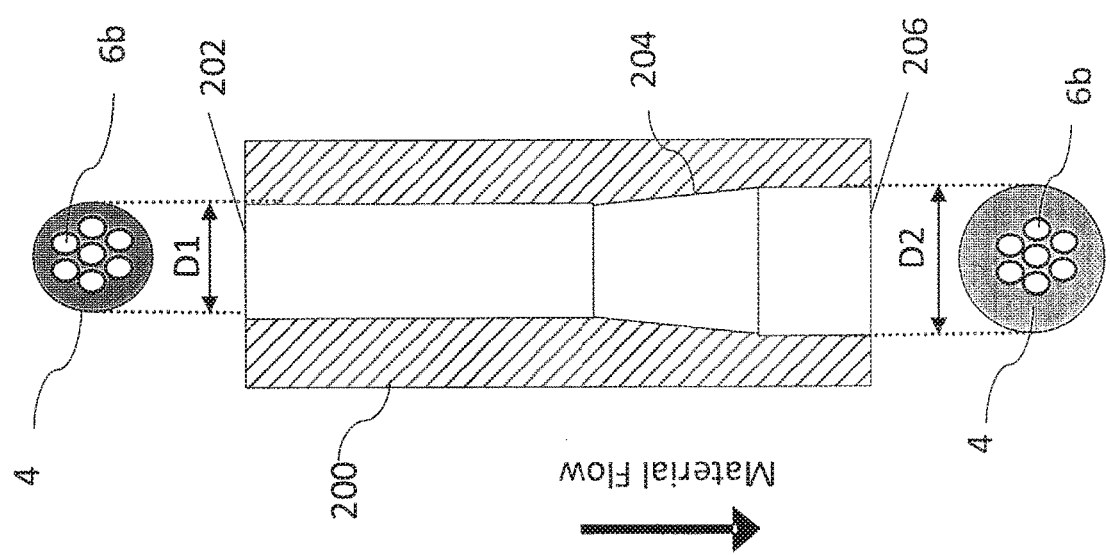

A family of straight and diverging conduit nozzles which maintain a matched velocity of the strand(s) of fiber material 6b and the polymer matrix 4 throughout the entire conduit nozzle (at least so that the matrix does not build up within) are shown in FIGS. 6A through 6C. FIG. 6A depicts a divergent conduit nozzle 200 with an increasing conduit nozzle throat diameter that matches the thermal expansion of the matrix material, the conduit nozzle 200 including an inlet 202 with a diameter D1, a section with an increasing diameter 204, and an outlet 206 with a diameter D2 that is greater than the diameter DI. Alternatively, where both the matrix material and the fiber strand(s) have relatively low coefficients of thermal expansion (such as carbon fiber and Liquid Crystal Polymer), the conduit nozzle 200 may include an inlet 202 and outlet 206 that have substantially the same diameter 03, see FIG. 6B. A conduit nozzle 200 or 708 may also include a rounded outlet 208 or 726, as shown in FIG. 6C. For example, the rounded outlet 208 may be embodied by an outwardly extending lip, a chamfer, a filet, an arc, or any other appropriate geometry providing a smooth transition from the outlet, which may help to avoid fracture, applying stresses to, and/or scraping, the filament as it is printed.

FIG. 8 depicts two embodiments of a cutter for use with a three dimensional printer. Like elements described with reference to, e.g., FIG. 1A or 1B are substantially similar. As depicted, a filament 2 or 2a, is supplied from a spool 38 and drawn and fed by driving roller 42 and idle wheel 40, which apply a force directed in a downstream direction to the filament 2a. Unheated, or at ambient or room temperature, or in any case below glass transition temperature in this zone (3010 or 3020), the matrix of the filament 2a is in a solid or "glass" state when this force is applied. The applied downstream force, as discussed herein, is transmitted via the glass state matrix 4A to the fiber strands 6A, which pushes the entire filament from a heated conduit nozzle 10 to build up a three dimensional part, despite that the matrix is then melted. The position of a cutter 8, 8a, 8b may reduce or eliminate the presence of tag-end over-runs in the final part, or permit them to be flexibly created if advantageous.

Positioning the cutter 8a (e.g., blade) at the outlet of the conduit nozzle 10 allows actuation of the cutter 8a to completely cut the deposited strip or bonded rank by severing the internal fiber strands, and/or may prevent further advance and/or dripping by physically blocking the conduit nozzle eyelet or outlet. A cutter 8a or 8b enables the deposition of filament (fiber reinforced or unreinforced) with precisely controlled lengths as controlled by the controller 20. In the alternative, positioning a cutter 8b upstream from the conduit nozzle 10, between the conduit nozzle 10 outlet and the feeding mechanism 40, permits a smaller gap between the conduit nozzle 10 outlet and the part. In the alternative or addition, the cutter 8b may cut the filament while the matrix temperature is below a melting, softening, or glass transition temperature, reducing the propensity of the resin to stick to the blade which may reduce machine jamming; and/or enable more precise metering of the deposited material.

If a relatively close (but in no circumstances binding) fit is maintained between the filament 2 and a guiding tube shown in FIG. 10 (which may be a clearance fit 3010 or larger guide), a downstream portion 2b of the cut strand is pushed by the abutting upstream portion 2*a* is driven by the driven roller 42. The previously bonded ranks (cooled) are adhered and under tension "drag" filament 2*b* from of the conduit nozzle 10 as the conduit nozzle 10 and build platen 16 are moved relative to one another. A combination of upstream forces from the feeding mechanism and downstream forces transferred via the unmelted or glass portion of the filament and the strands of the filament are used to deposit the bonded ranks.

As noted, a cutter 8, 8*a*, 8*b* is optional, but may also prevent buckling of the material to help ensure a uniform deposition and prevent machine jams. Further, small diameter (e.g., less than 30 thou) continuous fiber filament is more susceptible to buckling. In this case, a close-fitting guide tube 10, or close-fitting guide within 64, 712 (in zones 3010, 3020) adjacent the feeding mechanism comprising driven roller 42 and idle wheel 40 and/or near to the conduit nozzle 708 outlet, may help prevent buckling of the material. Therefore, in one embodiment, the feeding mechanism may be located within less than about 3-8 diameters from a guide tube or inlet to the nozzle. In one specific embodiment, the guide tube is a round hypodermic tube. However, if the filament is shaped other than circularly (e.g., oval, square, or tape), the guide tube is sized and shaped to match. Optionally, the filament 2 may include a smooth outer coating and/or surface where the fibers do not protrude through the filament 2 perimeter (reducing friction or resistance within the guide tube).

In some embodiments, the three-dimensional printing system does not include a guide tube. Instead, the feeding mechanism may be located close enough to an inlet of the nozzle, such as the receiving tube 64, such that a length of the continuous core filament 2 from the feeding mechanism to an inlet of the conduit nozzle is sufficiently small to avoid buckling. In such an embodiment, it may be desirable to limit a force applied by the feeding mechanism to a threshold below an expected buckling force or pressure of the continuous core filament, or other material fed into the nozzle.

In some embodiments, the maximum tension or dragging force applied to the deposited reinforcing fibers is limited to prevent the printed part from being pulled up from a corresponding build plane or to provide a desired amount of neutral to positive tensioning of the continuous core. For example, a one-way locking bearing may be used to limit the dragging force (e.g., with the speed of the feeding rollers set to be less than the speed of printing, but with the one-way bearing permitting the filament to be pulled through the rollers faster than they are driven). In such an embodiment, the drive motor, driving the driven roller 42 may rotate a drive wheel though a one-way locking bearing such that rotating the motor drives the wheel and advances material If the material dragging exceeds the driven speed of the drive wheel, the one-way bearing may slip, allowing additional material to be pulled through the feeding mechanism and nozzle, effectively increasing the feed rate to match the printing rate or head traveling speed while also limiting the driving force such that it is less than or equal to a preselected limit. The dragging (neutral to positive tension) force may also be limited using a clutch with commensurate built-in slip. Alternatively, in another embodiment, the normal force and friction coefficients of the drive and idler wheels may be selected to permit the continuous material to be pulled through the feeding mechanism above a certain dragging force. Alternatively or in addition, an AC induction motor, or a DC motor switched to the "off" position (e.g. a small resistance applied to the motor terminals or opening motor terminals) may be used to permit the filament to be pulled from the printer against motor resistance. In such an embodiment, the motors may be allowed to freewheel when a dragging force above a desired force threshold is applied to allow the filament to be pulled out of the printer. In view of the above, a feeding mechanism is configured in some form or fashion such that a filament may be pulled out of the printer conduit nozzle when a dragging force applied to the filament is greater than a desired force threshold. Additionally, in some embodiments, a feeding mechanism may incorporate a sensor and controller loop to provide feedback control of either a deposition speed, printer head speed, and/or other appropriate control parameters based on the tensioning of the filament.

According to the embodiments or aspects of the invention discussed herein, the printing process may be similar in all phases, or create a different balance of forces within the printer, filament, and part in different printing phases (e.g., threading phase versus printing phase, and/or straight phases versus curved phases). For example, in one embodiment or aspect of the invention, the printer may apply bonded ranks primarily via lateral pressing and axial tension in the main, continuous printing phase, and primarily via lateral pressing and axial compression in the threading phase where the end of the filament is first abutted to the platen or part and then translated under the ironing tip to be melted.

According to the embodiments or aspects of the invention discussed herein, the printing system may, under axial neutral to positive tension, drag a filament 2 out of a printer conduit nozzle 708 along straight printed sections (and this tension extends past the conduit nozzle 708 to the feeding mechanism controlled at a feed rate, but which may have a slipping or clutch mechanism). During such operation, a printer head may be displaced or translated at a desired rate by the controller 20, and the deposited material and/or bonded ranks which are adhered to a previous layer or printing surface will apply a dragging force to the filament within the printing nozzle. The filament is pulled out of the printing system and deposited onto the part 14. In contrast, in addition, or in the alternative, according to the embodiments or aspects of the invention discussed herein, when printing along curves and/or corners, the feeding mechanism feed rate, and printing rate of the printing system may be controlled by the controller 20 to pushes the deposited filament onto a part or build surface 16. However, embodiments or aspects of the invention in which a filament is pushed out of the printing system during a straight operation and/or where a filament is dragged out of a printer head when printing a curve and/or corner are also contemplated, as well as embodiments or aspects of the invention where the filament is substantially always dragged or substantially always pushed.

The deposition of tensioned internal strand reinforced filaments including a non-molten strand enables the deposited material to be pushed by the print head and adhered to the printed part at the (distal) end. The print head can suspend the filament across an open gap under tension, without the material sagging, enabling the construction of hollow-core components (with or without the use of soluble support material).

FIG. 8 depicts free-space printing enabled by the continuous core reinforced filament. With the continuous core reinforced filament 2*b* attached to the part at point 44, and held by the print head at point 46, it is possible to bridge the gap 48. Absent the tensioned internal fiber strands, the molten matrix material would sag and fall into the gap 48. In one example, the closed section box shown in FIG. 9 is formed by a section 50 which is bridges gap 48 and is affixed to opposing sections 52 and 54. Such free-space printing could also be used to produce cantilever beams that cannot be printed with typical unsupported materials. In such a case, optionally, a cooling mechanism such as a jet of cooling air may further prevent sagging by solidifying the polymer material surrounding the core, either continuously cooled over the entire or most of the build area during gap spanning, or cooled at the point of material advance during gap spanning. Selectively cooling material only while it is over a gap may lead to better adhesion in the remaining part since maintaining an elevated enhances diffusion bonding between adjacent layers.

In the above noted embodiments, a cutting blade is located upstream of the conduit nozzle to selectively sever a continuous core when required by a printer. While that method is effective, there is a chance that a reinforced filament will not "jump the gap" correctly between the cutter and the nozzle. Consequently, in at least some embodiments, it is desirable to increase the reliability of rethreading the core material after the cutting step. A cutter may be designed to reduce or eliminate the unsupported gap after the cutting operation, e.g., a tube-shaped shear cutter in which two abutting and coaxial tubes guiding the filament are temporarily displaced with respect to one another to shear the filament.

Figure 7:
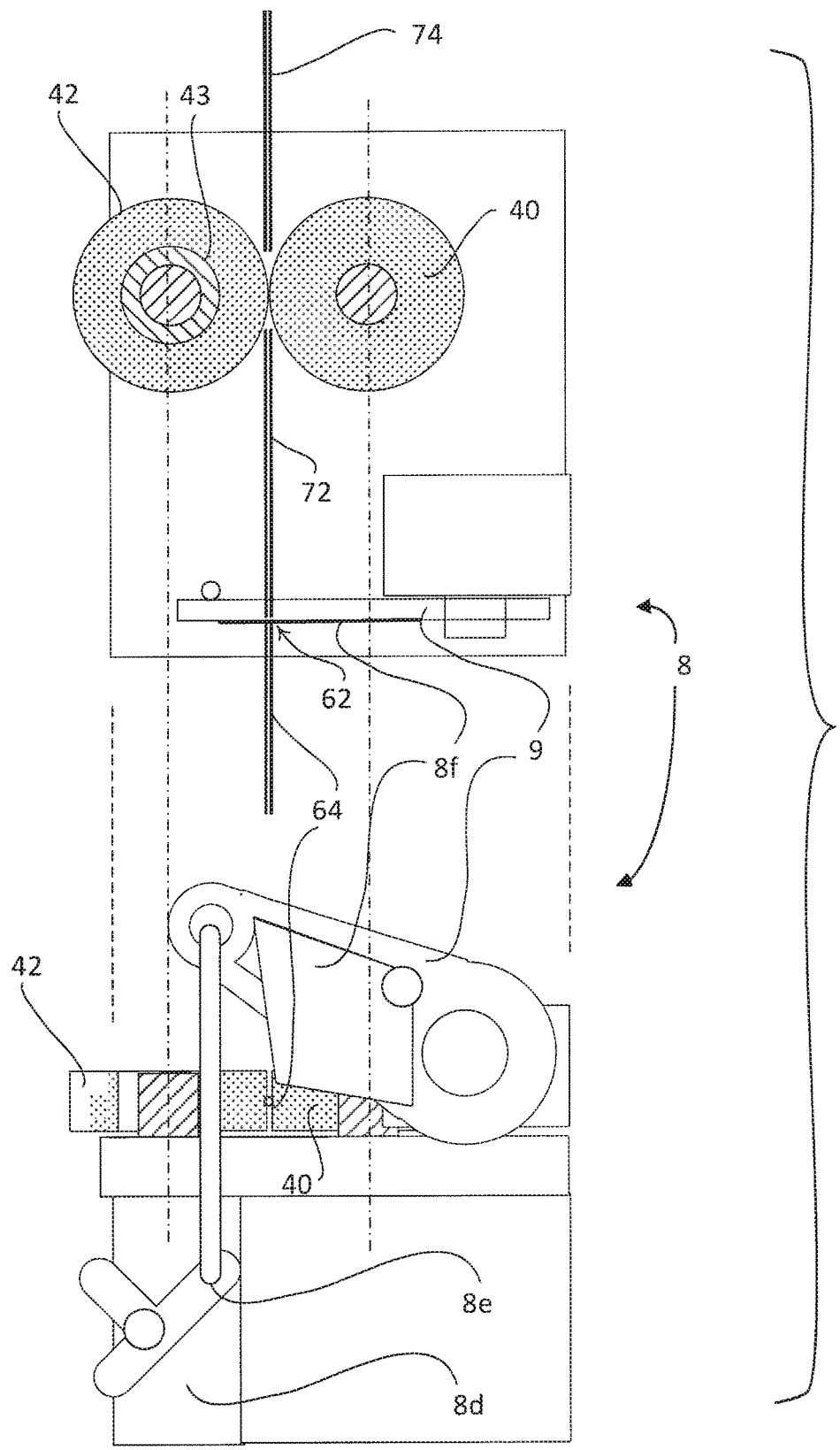
FIG. 7 is a schematic plan and side representation of a fiber filament feeding mechanism, guide tube, and cutter assembly.

FIG. 10, similar to FIGS. 1A and 1B, depicts a printer mechanism. FIG. 7 is a detailed depiction of a system implementation of the cutter and drive system shown in FIG. 10, including several components, showing the drive roller 42 and idle roller 40, as well as the close fitting tube 72, and filament 2 (which are each of very small diameter, between 10 and 50 thou). Like reference numerals and parts by appearance describe similar features. As shown in FIG. 10, the filament 2 is drawn into the rollers 40, 42 under tension, and to facilitate guiding and maintaining alignment of the filament 2 with the rollers 40, 42, the filament 2 passes through a guide tube 74 upstream of the rollers 40, 42. After passing through the rollers, 40, 42 the continuous core filament 2 is in axial compression (at least sufficient to overcome friction through any guiding tubes or elements). Depending on a length of the material under compression as well as a magnitude of the applied force, the continuous core filament 2 may tend to buckle. Accordingly, the continuous core filament 2 passes through a close-fitting guide tube 72 (e.g., clearance fit) positioned downstream of the rollers 40, 42 and upstream of the conduit nozzle 68. The guide tube 72 both guides the filament 2 and prevents buckling of the continuous core filament 2. A gap 62 is present between the printer head 70 and the cutter 8.

When the filament 2 is cut, the filament 2 is "rethreaded" passing from one side of the gap 62 to the receiving guide tube 64. The receiving tube 64 itself is optionally below the glass transition temperature of the material. Optionally, a thermal spacer or thermal resistor 66 between the receiving tube 64 and heated part of the conduit nozzle 68 reduces the heat transfer to the receiving tube 64 from the hot conduit nozzle 68.

In FIG. 10, difficulty in rethreading (i.e., through the entire system, versus during the threading or stitching process through the terminal end of the printhead which initiates printing) may be encountered because the filament is more flexible and prone to bending or buckling when the end is unsupported, than after it has been threaded and both ends are fully supported and constrained in a first order bending mode. After the filament has been threaded, the downstream portion guides all the subsequent filament. Cutting a filament, especially with a dull or thick blade, may also deform the end of the filament, tending to increase misalignment of the filament 2 and the receiving tube 64.

To improve the reliability of threading the filament past the cutter 8, 8a, or 8b, when not in use, the cutter 8 may be removed from the gap 62 and the guide tube 72 is displaced (down) and/or telescoped towards the receiving tube 64 during rethreading. The clearance (gap) between the guide tube 72 and receiving tube 64 may be reduced, or the tubes 64, 72 may essentially about the cutter 8 blade. Alternatively, pressurized fluid, such as air, may also be directed axially down the guide tube 72, such that the axial fluid flow centers the material to align the material with the receiving end 16 (and may cool the guide tube 72 tube for high-speed printing and/or higher printing temperatures, and/reduce friction of the material through the guide tube.

As shown in the upper part of FIG. 7 (plan view), the guide tube 74 may be include a capillary tube having an inner diameter between 1½ to 2½ times the diameter of the filament, and may be readily changed with a change in filament diameter and readily connected to a Bowden tube. The close fitting tube 72 may additionally include a similar capillary tube having an inner diameter between 1½ to 2½ times the diameter of the filament 2 (optionally in combination with a flexible tube made of Teflon/PTFE), while the receiving tube 64 may in the alternative or in addition also include a capillary tube having an inner diameter between 1½ to 3 times the diameter of the filament 2 (and may also be connected to a similar diameter Teflon/PTFE Bowden tube). Preferably and optionally, the capillary tube of the receiving tube 74 is a larger diameter, especially inner diameter, than the capillary tube of the close-fitting tube 72. As shown in FIG. 7, the driving roller 42 (and motor) may be mounted with its slipping mechanism 43 opposite the idle roller 40 in close proximity to the cutter 8.

As shown in the lower part of FIG. 7 (side view), a cutter blade 8f may be a very thin sharpened or blunt blade placed at a high angle to the filament, e.g., as shown in FIG. 7 to rotate with its supporting arm 9 in such a manner that it is not pushed into the blade at a direction normal to the filament 2, but is rapidly drawn or rotated across the filament to slice the filament 2. The cutter 8 assembly as a whole includes an actuator 8d driving the blade 8f, the blade 8f having a thickness of less than the diameter of the unmelted fiber reinforced composite filament 2, an entrance guide tube (the exemplary capillary tube of close fitting tube 72) guiding the unmelted fiber reinforced composite filament 2 to the cutter blade 8f, and an exit guide tube (the exemplary capillary tube of receiving tube 64) guiding the unmelted fiber reinforced composite filament 2 from the cutter blade 8, wherein the blade 8f severs the unmelted fiber reinforced composite filament 2 between the entrance guide tube 72 and the exit guide tube 64, and both the distance between the entrance and the exit guide tubes (e.g., 7 thou between the tubes) and the thickness of the blade (e.g., 5 thou) are equal to or less than the diameter of the unmelted fiber reinforced composite filament (e.g., 13 thou, as low as 5-8 thou). Preferably, the clearance (e.g., 1 thou) between the cutter blade 8f and each of the entrance and exit tubes 72, 64 is less than ¼ to ½ of the thickness of the cutter blade 8f, and an inner diameter of the exit guide tube 64 is greater than an inner diameter of the entrance guide tube 72. As shown in FIG. 7 and in FIG. 1C, a linkage 8e can provide a quick actuation and/or quick return for the servo, motor, solenoid, or other actuator of the cutter 8 attached to the supporting arm 9.

Figure 11:
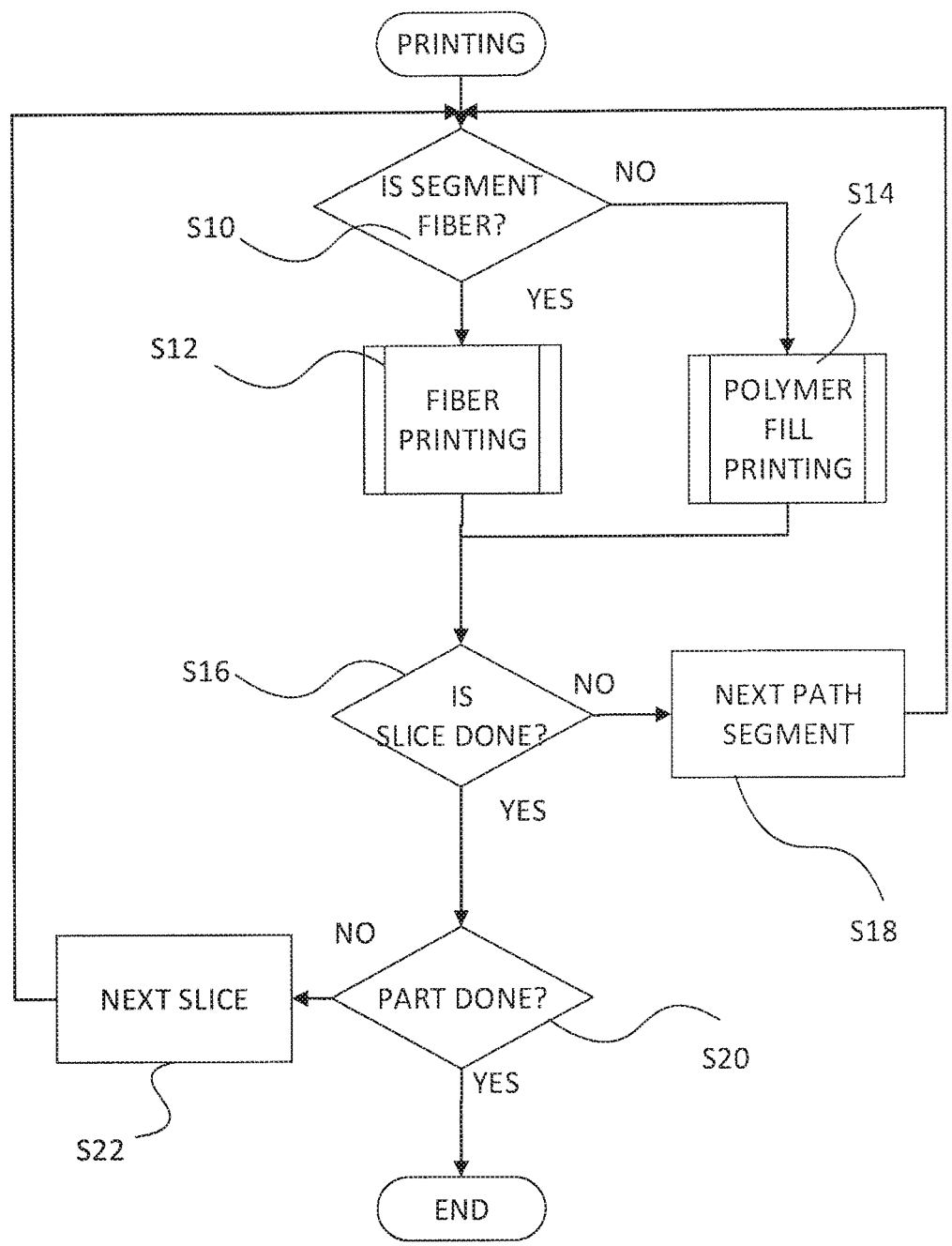
FIG. 11 is a flowchart describing control and command execution of the printer shown in FIG. 1C and 5, for printing in extrusion and fiber modes as shown in FIG. 5.

FIGS. 11-13 are flowcharts describing one particular implementation of the flowchart of FIG. 2. In particular, FIG. 12 describes a fiber composite printing process in detail and with commonality to the timing diagrams of FIG. 5 and the detail of FIGS. 1C and 1D, with like numbers, including step numbers, reflecting like functionality. Similar step numbers reflecting similar functionality but different execution order occur in the flow charts. FIG. 13 describes, for the purpose of contrast and coupled functionality, a FFF control process that may apply to the FFF printing head 1800 depicted in FIG. 1C. FIG. 11 describes, as a coupled functionality, control routines that may be carried out to alternately and in combination use the co-mounted FFF extrusion head 1800 and fiber reinforced filament printing head 199 of FIG. 1C.

In FIG. 11, at the initiation of printing, the controller 20 determines in step S10 whether the next segment to be printed is a fiber segment or not, and routes the process to S12 in the case of a fiber filament segment to be printed and to step S14 (e.g., FIG. 13) in the case of other segments, including e.g., base, fill, or coatings. Step S12 is described in detail with reference to FIGS. 2 and 12. After each or either of routines S12 and S14 have completed a segment, the routine of FIG. 11 checks for slice completion at step S16, and if segments remain within the slice, increments to the next planned segment and continues the determination and printing of fiber segments and/or non-fiber segments at step S18. Similarly, after slice completion at step S16, if slices remain at step S20, the routine increments at step S22 to the next planned slice and continues the determination and printing of fiber segments and/or non-fiber segments. "Segment" as used herein means a linear row, road, or rank having a beginning and an end, which may be open or closed, a line, a loop, curved, straight, etc. A segment begins when a printhead begins a continuous deposit of material, and terminates when the printhead stops depositing. A "slice" is a single layer or laminate to be printed in the 3D printer, and a slice may include one segment, many segments, lattice fill of cells, different materials, and/or a combination of fiber-embedded filament segments and pure polymer segments. A "part" includes a plurality of slices to build up the part. FIG. 12's control routine permits dual-mode printing with two different printheads, including the compound printheads 199, 1800 of FIG. 1C, and using both timing approaches of FIG. 5.

FIG. 12 optionally begins with the determination that a fiber segment will be printed in FIG. 11's master flowchart. Initially, the threading process described herein, e.g., in FIG. 5, is carried out. Before or simultaneously with parts of the threading process (an optionally between steps S103, S103A and S105, S105S), the printhead 199 is indexed to a beginning printing location at step S104A and the fiber drive 42 advances the fiber filament 2 to a holding position in the cold feed zone 712 (which is optionally adjacent the cutter as described herein and as shown in step S104B, but may be in any ready position where the temperature of the matrix material can be kept below the melting temperature). In preparation for step S111 of FIG. 2, at the same time, the platen is indexed in step S111B to a position below the printhead 199 less than the diameter of the fiber filament 2. For example, a 13 thou fiber-embedded filament 2 having a cross-sectional area of 0.08 to 0.1 mm$^2$ may compress to a flattened row of 0.1 mm thickness and 0.9 mm width, so the ironing lip 726 may be arranged 0.1 mm above the previous row. It is considered an optional part of the present invention(s) disclosed herein that a substantially round or oval fiber-embedded filament may be compressed, ironed, and/or flattened under heat and/or pressure to a changed shape (flattened, in some cases to a rectangular rank) and a flattened bonded rank height of less than ½ of its diameter, preferably less than ⅓ of its diameter; and a width of more than two times its diameter. These steps S104A, S111B, and S104B are shown to be concurrent because they do not depend on one another, but may be conducted in any order or partly or fully simultaneously.

In step S110A, as a subset or superset of step S110 of FIG. 2, the fiber reinforced filament 2 is fed by the driven roller 42 at a threading speed, which as described with reference to FIG. 5 is sufficient to prevent enough heat transfer from the walls of the system to sick the filament 2 to such walls, and until the runout distance R1 (or "cut-to-tip" distance, i.e., distance from the cutter 8 to the tip 726) is reached in step S110B. Threading is completed in this moment. Without stopping the fiber advance by the driven roller 42, the printhead 199 is then moved by the actuators 116,118 to follow the programmed fiber segment path in step S113B (additionally optionally keeping a certain tension as in step S113A of FIG. 2). This is conducted at an ironing or printing speed, which as described with respect to FIG. 5 and the disclosure may be different from threading speed of the driven roller 42. At the same time, in step S113 the driven roller 42 continues to advance the fiber filament 2, optionally as shown in FIG. 12 and as described herein at a speed (of linear advance of the controlling inelastic embedded fibers) less than that of the printing or ironing speed, e.g., greater than or equal to the 0.95 times the ironing speed of the printhead 199. The fiber feed speed of Fig. S113C is optionally different or the same as the threading speed.

As described with reference to FIG. 5, when the runout distance of R1 remains to be printed, the fiber in the system needs to be severed at a distance of R1 from the ironing tip 726. Accordingly, the routine checks at step S117B whether the segment termination will occur along the segment by a distance R1 ahead. It should be noted that the cutter actuation command can be marked at the correct time or distance along the segment path pursuant to runout distance R1 by path, slice, or SLT analysis ahead of time, such that step S117B would equate to checking for steps S117C and S117D along the path rather than anticipating the fiber segment termination ahead. Steps S117B-S117D of FIG. 12 are a subset or superset of steps S117, S117A of FIG. 2.

When the runout distance R1 remains, the printhead actuators 116, 118 and driven roller 42 are paused at step S117C, and subsequently, the fiber filament 2 is severed by the controller 20 command to the cutter 8 actuator at step S117D. As described with reference to FIG. 5, the remainder or runout of the fiber must still be laid along the programmed segment path. Accordingly, if the planned fiber segment S113D in the process of being printed is not complete at step S113D, the needed actuators 116, 118 of the printhead 199 (but not necessarily the driven roller 42, which may remain paused) are restarted and/or continued at step S113E. Steps S113D and S113E are a subset or superset of steps S113 and S113A of FIG. 2. When the fiber segment is complete, the process may return to the main printing routine to determine whether the next segment in the slice is a fiber filament segment. It should be noted that the routine of FIG. 12 can be performed independently of FIG. 11 or FIG. 13, i.e., in a printer without a compound printing head 1800 of FFF type, e.g., together with the SLA type printer of FIG. 26.

As noted, FIG. 12's control routine permits dual-mode printing, where FIG. 13 describes the non-fiber command execution. In FIG. 13, the FFF printhead 1800 and the platen 16 are indexed to a beginning printing location at step S121 and the extrusion drive 1830 quickly primes the extrusion filament, in other than a loading phase already loaded in the system, to increase pressure (step S123 corresponding to T32 of FIG. 5), then continues feeding to extrude. In step S125, corresponding to time T34 of FIG. 5, the printhead 1800 moves to receive the extrusion. In step S127, the extrusion drive 1830 continues to advance the FFF filament to the melt reservoir 1804 at a fraction of the speed that the printhead is moved, to create back pressure and extrude the material in the pressurized reservoir 1804, filled with liquefied thermoplastic resin. When the segment terminates, the extrusion drive 1830 and the printhead 1800 quickly pause at step S131, perform a retract operation (e.g., 15 mm of retract) at step S133 to release pressure in the melt reservoir and preferably create negative pressure at the nozzle 1802 tip to, e.g., prevent dripping or tailing. If called from FIG. 11, the process returns to the control of FIG. 11.

FIGS. 14A-14C depict a family of conduit nozzles having different outlets. FIG. 14A depicts a conduit nozzle 500 including an inlet 502 and an outlet 504 which includes a sharp exit corner suitable for some filaments 2 such as aramid, but which may lead to damage to fibers which are not resistant to abrasion, such as fiberglass, carbon, plating on metal cores, treatments to fiber optic cables. FIG. 14B depicts a smooth transition, multiple chamfered (e.g., twice chamfered, or 45 degree) conduit nozzle eyelet or outlet 506, which reduces shear cutting of fibers, and FIG. 14C depicts smoothly rounded conduit nozzle exit or ironing tip 508 which reduces shearing and cutting of non-molten strands.

Figure 15A:
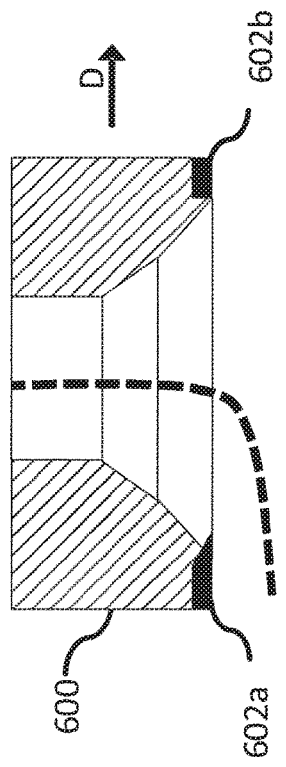
FIG. 15A is a schematic cross-sectional view of a cutter integrated with a conduit nozzle tip.
Figure 15B:
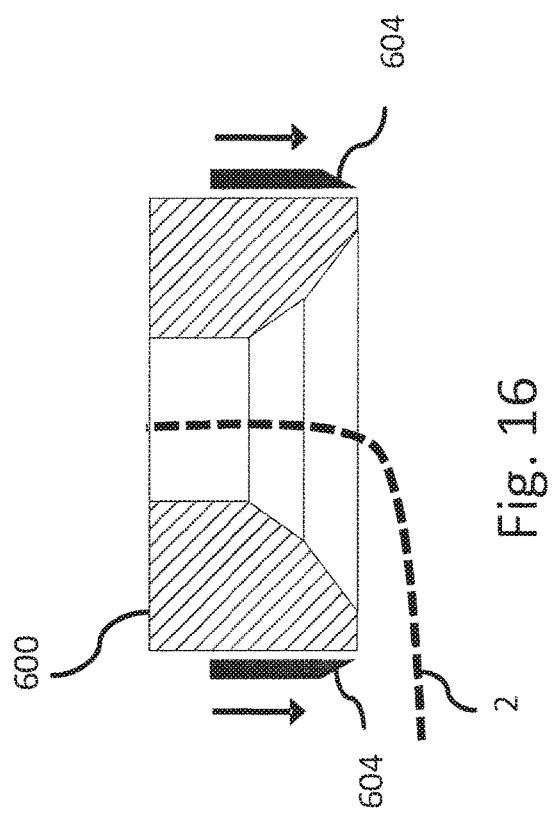
FIG. 15B is a schematic cross-sectional view of the cutter integrated with a conduit nozzle tip depicted in FIG. 14A rotated 90°.
Figure 15C:
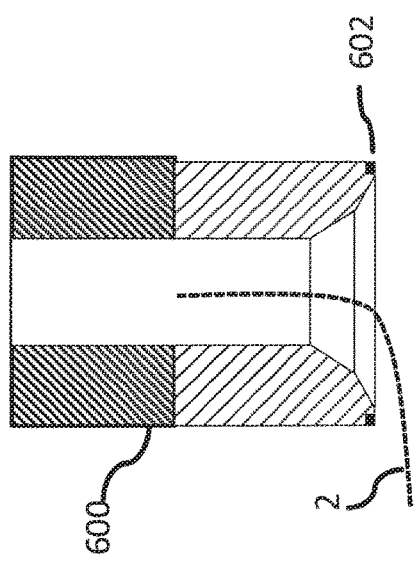
FIG. 15C-15D are bottom views an embodiment of a cutter integrated with a conduit nozzle tip.
Figure 15D:
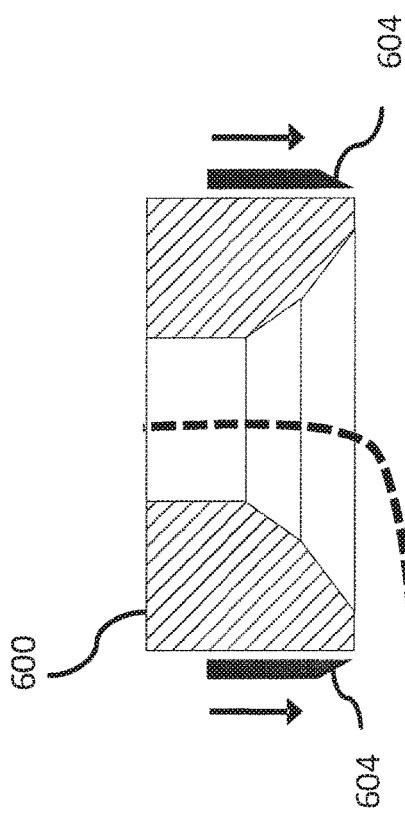

It may, in the alternative, be desirable to sever the filament 2, e.g., by pushing a sharp edged conduit nozzle down in the vertical Z direction, as shown by arrow 510. As depicted in FIG. 14C, the corner of a conduit nozzle exit 508 may be sharpened and oriented in the Z direction to sever the continuous when forced against the filament 2 (optionally under tension, optionally provided by any or all of driving the feeding mechanism and/or moving the print head, or moving the build table). As depicted in in FIGS. 15A-15D, a portion of a conduit nozzle is optionally be sharpened and directed towards an interior of the conduit nozzle eyelet or outlet to aid in cutting material output through the conduit nozzle. As shown, smoothie chamfered conduit nozzle 600 contains a filament 2, exiting from a chamfer conduit nozzle 600, and a ring 602 located at a distal outlet of the conduit nozzle. A first portion of the ring 602 is non-cutting and shaped and arranged to avoid interfering with the filament 2, and a second portion of the ring 602 includes a cutting portion or blade 602a (optionally steel, carbide, or ceramic) sharpened and oriented inwards towards the filament 2 path contained within the conduit nozzle 600 as seen in FIGS. 15B-15D, and occupying less than ⅒ of the conduit nozzle eyelet or outlet area. The cutting portion 602a may be any of: permanently attached; selectively retracted during printing and deployed to cut; recessed into a perimeter of the conduit nozzle eyelet or outlet; forming a part of the perimeter of the conduit nozzle exit as depicted in FIG. 15B; formed integrally with the conduit nozzle eyelet or outlet; and/or attached to the conduit nozzle eyelet or outlet.

Figure 16:
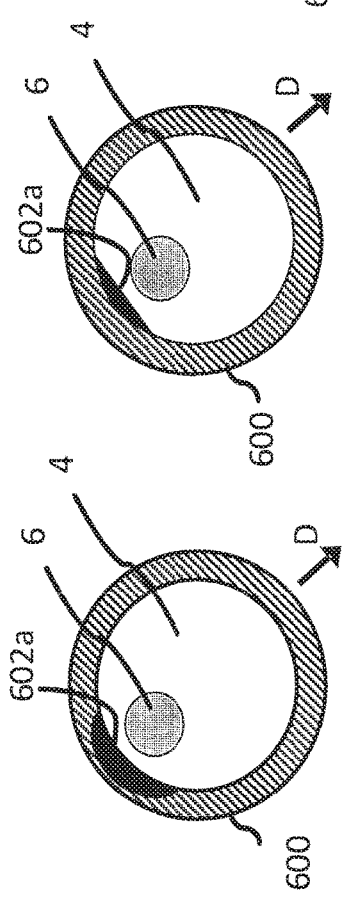
FIG. 16 is a schematic cross-sectional view of a cutter integrated with a conduit nozzle tip.

In operation as shown in FIGS. 15A-15D, the conduit nozzle 600 is translated in a direction D relative to a part being constructed on a surface while the filament 2 is stationary and/or held in place, resulting in the tensioning of the core material 6. As increasing tension is applied to the continuous core filament 2, the core 6 is cut through by the cutting portion 602a. Alternatively, the surface and/or part is translated relative to the conduit nozzle or the filament tensioned using the feeding mechanism to perform the severing action. FIG. 16 presents another embodiment of a conduit nozzle tip-based cutter m the depicted embodiment, a cutting ring 604 having a sharp and edge oriented towards the already deposited filament 2, which is actuated relative to the conduit nozzle 600 and part to expose the sharp edge to bring the filament in contact with the cutting element 604, and sever the core material 6.

For brittle materials, such as fiber optic cables, the cutting portion 602a or 604 may form a small score, and additional relative translation of the conduit nozzle and the part may complete the cut. For other materials, such as composite fibers, the rounded geometry of the conduit nozzle results in the core 6 being directed towards the cutting portion 602a or 604 under tension, with resulting consolidation (e.g. compaction) toward the cutting portion enables cutting of a large fiber with a relatively smaller section blade. For metal fibers or ductile materials, the cutting portion 602a or 604 may create enough of a weak point in the material that sufficient tensioning of the core breaks the core strand at the conduit nozzle exit.

The cutting portion 602a or 604 may be a high temperature heating element referred to as a hot knife, which may directly or indirectly heat the fiber to a melting temperature, carbonization temperature, or a temperature where the tensile strength of the 1,;ore is low enough that it may be broken with sufficient tensioning. The heating element may be a high-bandwidth heater that heats quickly and cools down quickly without harming the printed part; or an inductive heating element that isolates heating to the fiber.

Figure 17B:
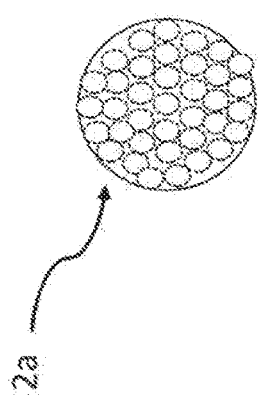
FIG. 17B is a schematic representation of a continuous core reinforced filament to be utilized with the printing system prior to deposition.
Figure 17C:
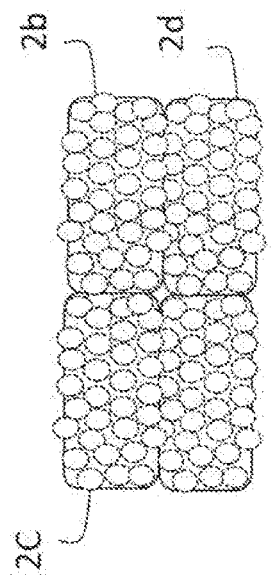
FIG. 17C is a schematic representation of the continuous core reinforced filament and surrounding beads of materials after deposition using compaction pressure.
Figure 17A:
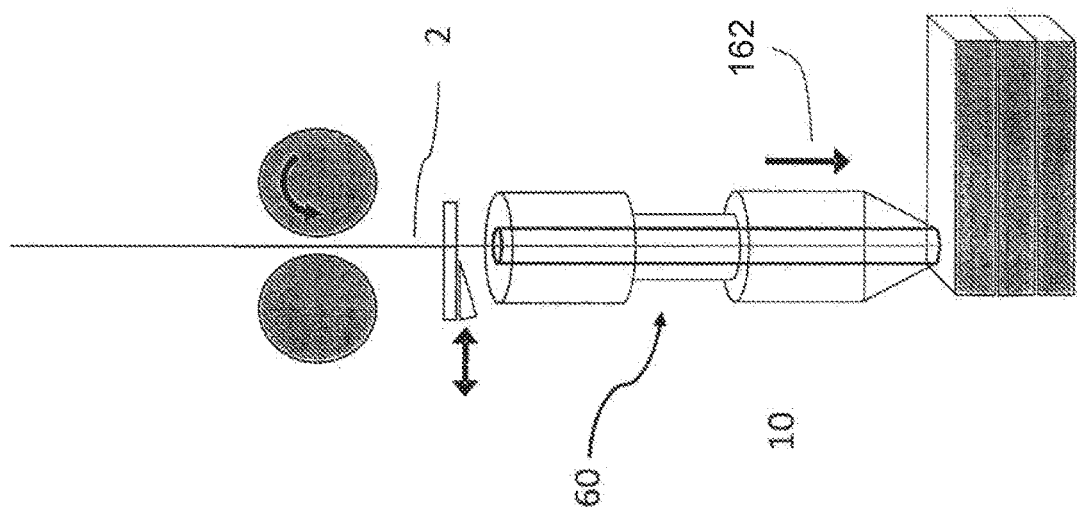
FIG. 17A is a schematic representation of a three-dimensional printing system applying a compaction pressure during part formation.

According to embodiments or aspects of the invention discussed herein, axial compression and/or laterally pressing the melted matrix filament 2 into bonded ranks may enhance final part properties. For example, FIG. 17A shows a composite fiber reinforced filament 2 applied with a compaction force, axial compression, or lateral pressure 162. The compaction pressure from axial compression and flattening from the ironing lip 508, 726, 208 in zone 3040, compresses or reshapes the substantially circular cross-section filament 2a, see FIG. 17B, into the preceding layer below and into a second, substantially rectangular cross-section compacted shape, see FIG. 17C. The entire filament forms a bonded rank (i.e., bonded to the layer below and previous ranks on the same layer) as it is shaped. The filament 2b both spreads and interior strands intrude into adjacent bonded ranks 2c on the same layer and is compressed into the underlying shaped filament or bonded rank of material 2d. This pressing, compaction, or diffusion of shaped filaments or bonded ranks reduces the distance between reinforcing fibers, and increases the strength of the resultant part (and replaces conventional techniques achieved in composite lay-up using post-processing with pressure plates or vacuum bagging). Accordingly, in some embodiments or aspect of the invention discussed herein, the axial compression of the filament 2 and/or especially the physical pressing by the printer head 70, conduit nozzle exit or ironing lip 508, 726, 208 in zone 3040 may be used to apply a compression pressure directly to the deposited material or bonded ranks to force them to spread or compact or flatten into the ranks beside and/or below. Cross-sectional area is substantially or identically maintained.

Alternatively or in addition under some embodiments or aspects of the invention, pressure may be applied through a trailing pressure plate behind the print head; a full width pressure plate spanning the entire part that applies compaction pressure to an entire layer at a time; and/or heat, pressure, or vacuum may be applied during printing, after each layer, or to the part as a whole to reflow the resin in the layer and achieve the desired amount of compaction (forcing of walls together and reduction and elimination of voids) within the final part.

As noted above, and referring to FIG. 18A, nozzles 700 used in Fused Filament Fabrication (FFF) three dimensional printers typically employ a constriction at the tip of the nozzle 700, leading to eventual clogging and jamming of the print head (nozzle). The nozzles on most FFF three-dimensional printers are considered wear items that are replaced at regular intervals.

In a divergent conduit nozzle according to some embodiments or aspects of the invention, material expands as it transitions from a feed zone, to a heated melt zone, enabling any particulate matter that has entered the feed zone to be ejected from the larger heated zone. A divergent conduit nozzle is both easier to clean, permitting permit material to be removed in a feed forward manner.

As used in the following discussion, "fluidly connected" is used in the context of a continuous connection permitting flow, and does not suggest that the filament 2 is or is not fluid at any particular stage unless otherwise indicated. FIG. 18B shows a conduit nozzle 708 including a material inlet 710, connected to a cold-feed zone 712, in turn fluidly connected to a heated zone 714. The cross-sectional area (perpendicular to flow direction) of the cavity or channel in the heated zone 714 and/or outlet 716 is greater than the cross-sectional area (perpendicular to flow direction) of the cavity or channel located in the cold-feed zone 712 and/or the inlet 710. The cold-feed zone 712 may be constructed of a material that is less thermally conductive than that of the heated zone 714, permitting the filament 2 to pass through the cold feed zone 712 and into the heated zone 714 without softening.

In one particular embodiment, the divergent conduit nozzle 708 is formed by using a low-friction feeding tube, such as polytetrafluoroethylene, fed into a larger diameter heated zone located within a conduit nozzle such that a portion of the heated zone is uncovered downstream from the tube. The heating zone may in addition or in the alternative be constructed from, or coated with, a low friction material such as polytetrafluoroethylene, and the transition from the cold feed zone 712 to the heated zone 714 may be stepped, chamfered, curved, or smooth.

FIG. 18C depicts an instance where a divergent conduit nozzle 708 has been obstructed by a plug 718 that has formed during use within the heated zone 714 and then removed. The divergent conduit nozzle 708 can be cleaned using a forward-feeding cleaning cycle, e.g., starting by applying and adhering a portion of plastic onto a print bed or cleaning area adjacent the print bed, after which the adhered plastic is cooled (left to cool) below its melting temperature, whereupon the print bed and conduit nozzle are moved relative to each other to extract the plug 718 from the conduit nozzle 708 (optionally helped by a unmelted compressive force from filament upstream in the feeding mechanism). While any appropriate material may be used with a divergent nozzle, nylon and nylon relatives are particularly advantageous because nylon's coefficient of thermal expansion for nylon causes it to pull away from the conduit nozzle slightly during cooling and nylons exhibit a low coefficient of friction. Polytetrafluoroethylene walls within either or both of the cold feed and heated zone may help with plug removal. A cleaning cycle may also be performed without the adhering step by extruding a section of plastic into free air, then removed by hand or using an automated tool.

Figure 19B:
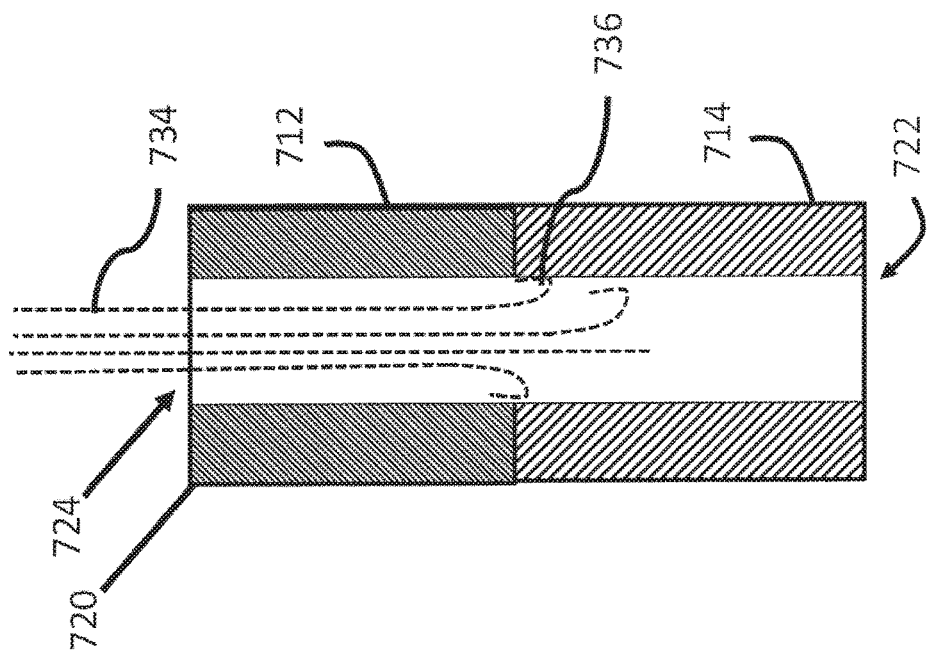
FIG. 19B is a schematic representation of a green towpreg being printed with a straight nozzle.
Figure 19A:
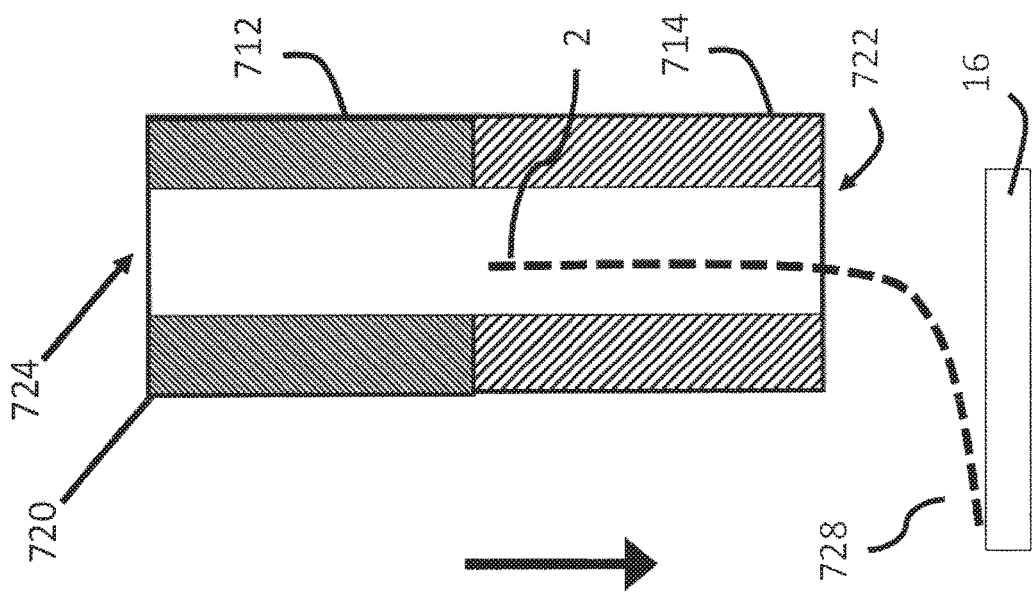
FIG. 19A is a schematic representation of a continuous core filament being printed with a straight nozzle.

In the case of a straight conduit nozzle, particularly for small diameter filaments on the order of about 0.001" up to 0.2", as shown in FIG. 19A, a conduit nozzle 720 may include an inlet 724 that is substantially the same size as conduit nozzle eyelet or outlet 722. A material such as a stranded reinforced composite filament 2 passes through a cold feed zone 712 and into a heated zone 714 (e.g., either or both zones low friction and/or polytetrafluoroethylene walled). The heated zone 714 is thermally conductive, e.g., made from copper, stainless steel, brass, or the like. The filament 2 is attached to a build platen 16 or cleaning area, and the process described with respect to FIGS. 18B and 1 8C carried out. Small diameter filaments are suited to this because the low thermal mass permits them to heat up quickly and be extruded (in the case of FFF) at substantially the same size as they are fed into the print head. FIG. 19B shows a hypothetical manner in which a conventional green towpreg may come apart in a straight conduit nozzle.

FIGS. 19C-19E illustrate a method of threading according to embodiments or aspects of the invention using a rigid push-pulpreg stranded filament fed through a divergent conduit nozzle 708, such that clogging is reduced or eliminated. "Threading", in this context, is the first step in printing of continuous deposition (straight sections and rows) of bonded ranks, and is only performed again after the filament is cut, runs out, is separated, or otherwise must be again started. FIG. 19C shows a continuous core filament 2 located within a cold feed zone 712, which may begin 5 inches or more from the heated zone 714. Where the filament 2 has a larger thermal capacity and/or stiffness, the cold feed zone may begin closer to the heated zone 714 to provide pre-heating of the material prior to stitching. Within the cold feed zone 712 (below a melting temperature of the matrix), the filament 2 remains substantially solid and rigid, and is maintained in this position until just prior to printing.

When printing is initiated, the filament 2 is quickly fed and threaded through the conduit nozzle, see FIG. 19D. The cold-feed zone 712 feeds into the larger cavity heated zone 714, and the filament 2 is constrained from touching the walls of the heated zone 714 by the rigidity of the upstream filament still located in the cold feed zone 712, see FIG. 19D. By maintaining a stiffness and preventing melting and wall contact until the material has been threaded to the outlet, fibers are prevented from peeling off, curling and/or clogging within the conduit nozzle, enabling the filament 2 to more easily pushed into and through the hot-melt zone 714. In some embodiments, a blast of compressed air may be shot through the conduit nozzle prior to and/or during threading in order to cool the conduit nozzle to reduce the chance of sticking to the sides of the nozzle. Additionally, heating of the heated zone 714 of the conduit nozzle may be reduced or eliminated during a stitching process to also reduce the chance of sticking to the sides of the nozzle.

Figure 20B:
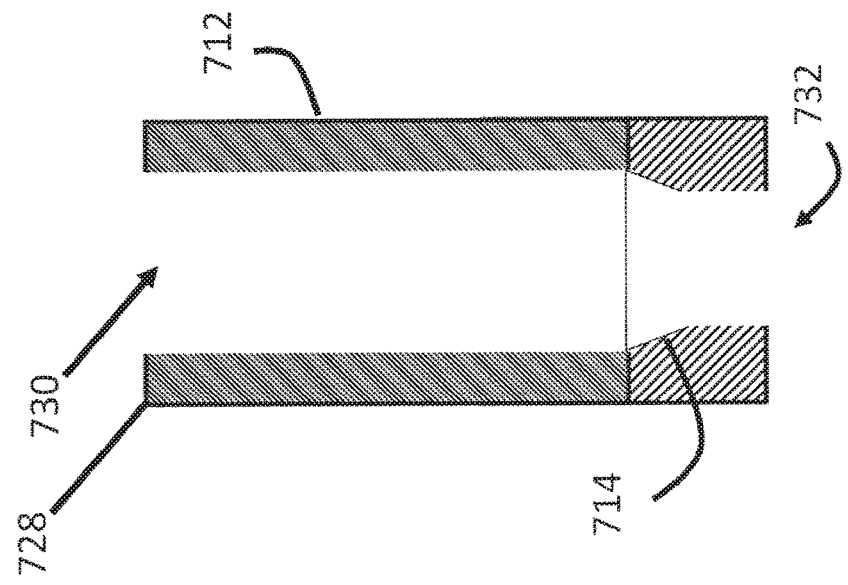
FIG. 20B is a schematic representation of a slightly convergent conduit nozzle including a low friction cold feeding zone.
Figure 20A:
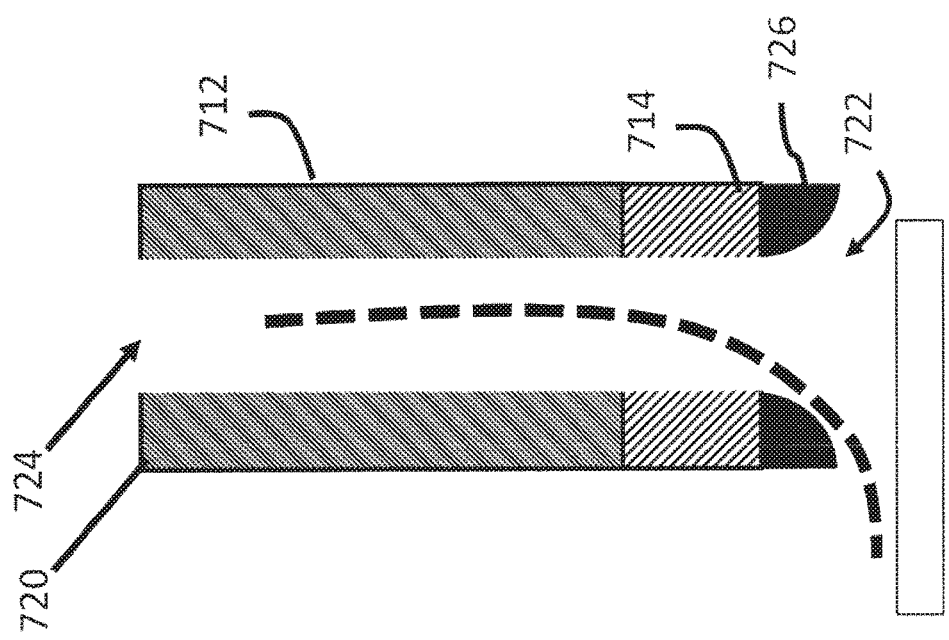
FIG. 20A is a schematic representation of a multi-material conduit nozzle with a low friction cold feeding zone.

As feeding of the continuous core filament 2 continues, the continuous core filament 2 contacts the build platen 16 or previous layer. The filament 2 is then laid or pressed along the surface by motion of the conduit nozzle relative to the build platen 16. Within a short distance, the filament 2 contacts the walls of the rounded or chamfered lip 726 next to the heated zone 714 or nearly contacts the walls of the heating zone 714, as illustrated in FIGS. 19E and 20A at or near the lip 726. Alternatively, instead of translating the printer head, the filament 2 could be driven to a length longer than a length of the conduit nozzle, and when the outlet is blocked by a previous layer or by the print bed, the filament buckles to the same effect. After contacting the rounded or chamfered ironing lip 726, the wall of the heating zone 714 (or nearly contacting the same), the continuous core filament 2 is heated to the deposition temperature (e.g., melting temperature of the matrix) for fusing the deposited material the build platen and/or previous layers. Threading speeds may be between about 2500 mm/min and 5000 mm/min.

The rounded or chamfered lip 726 located at a distal end of the conduit nozzle eyelet or outlet 716 may provide gradual transition at the conduit nozzle eyelet or outlet may help to avoid fracturing of the continuous core and also applies a downward, compaction, pressing, or ironing force to the continuous core filament 2 as it is deposited. That is, "ironing" refers to an act in which (i) a substantially lateral or transverse force to the side of the filament (e.g., downward if the filament is laid horizontally) is (ii) applied by a smooth surface (partially parallel to the build platen or rounded with a tangent thereof parallel to the build platen) (iii) that is translated in the printing direction as it presses upon the melted filament to become a bonded rank. The rounded or chamfered lip provides a downward force, and translates its lower smooth surface parallel to the build platen to iron the continuous core filament down to the previous layer. Ironing may be conducted by positioning the lip 726 at a distance relative to a deposition surface that is less than a diameter of the continuous core filament 2; and or by setting the height of a bonded rank to be less than the diameter of the filament 2, but appropriate compaction force may be achieved without this act (e.g., with sufficiently stiff materials, using the axial compression force only, positioning the lip at a distance greater than the diameter of the filament 2). This distance from the lip 726 to the previous layer or build platen, or the height of a bonded rank may be confirmed using an appropriate sensor.

The ironing and/or axial compression compaction(s) discussed herein do not require a divergent conduit nozzle. For example, the ironing or ironing lip or tip 726 may be incorporated with a substantially straight conduit nozzle 720 or a slightly convergent conduit nozzle, see FIG. 20A. Alternatively, or in addition, a convergent conduit nozzle may also use a separate cold feed zone and heated zone, e.g., as shown in FIG. 20B, which shows a convergent conduit nozzle 728 including a conduit nozzle inlet 730 that feeds into a cold feed zone 712 which is in fluid communication with a heated zone 714 and then a convergent conduit nozzle eyelet or outlet 732.

As discussed herein, a "semi-continuous" strand composite has a core that has been segmented along its length into a plurality of discrete strands. These discrete strands may be a single segmented strand, or a plurality of individual filaments strands bundled together but nonetheless segmented along their length. Discrete segments may be arranged such that they do not overlap. As described herein, the material instead of being cut, may be severed by applying a tension to the material, in most cases while the matrix is melted or softened, and most usefully at the termination of a printing cycle. The tension may be applied by either backdriving a feed mechanism of the printer and/or translating a printer head relative to a printed part without extruding material from the nozzle.

Figure 21:
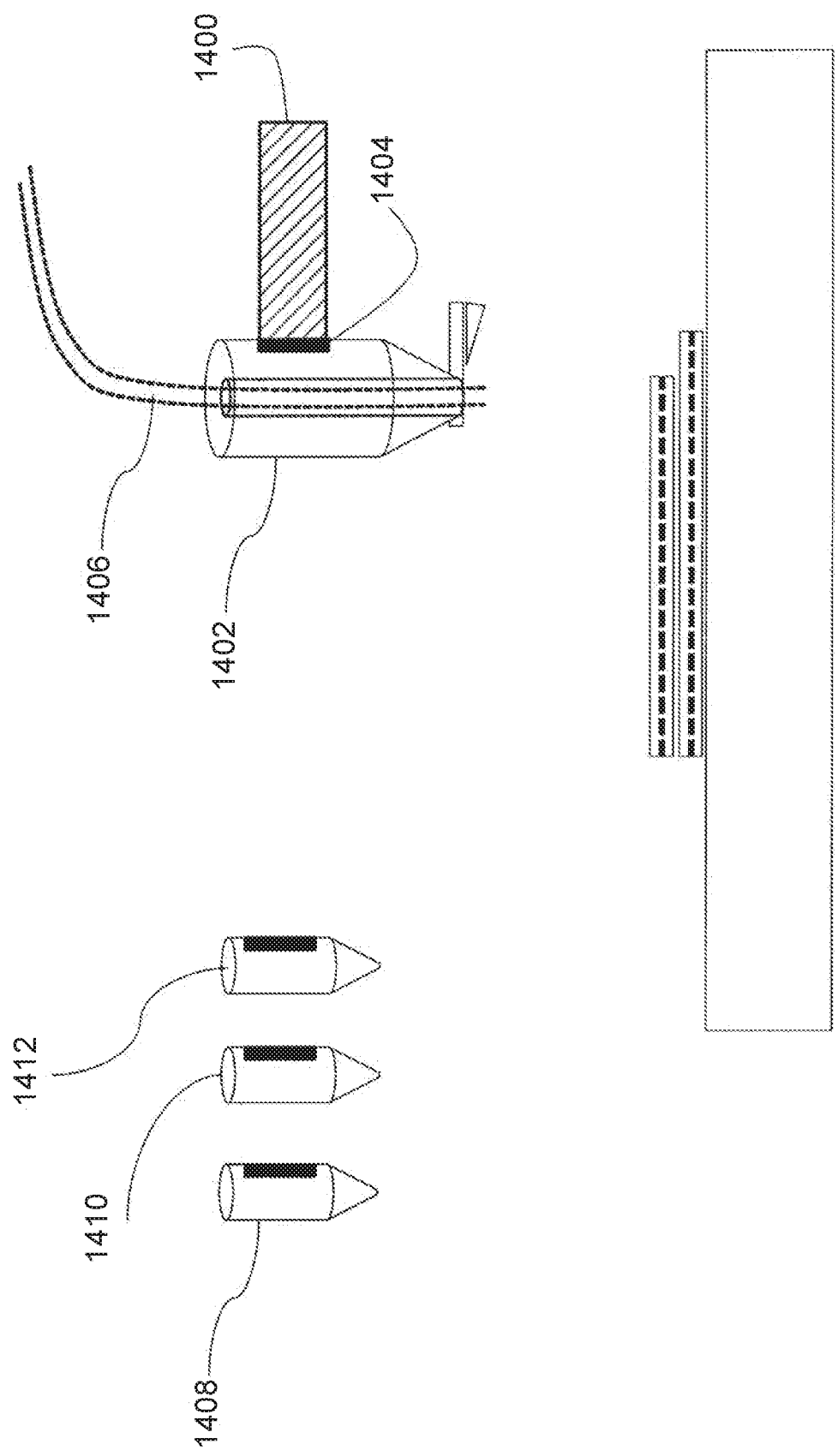
FIG. 21 is a schematic representation of a three dimensional printing system including a print arm and selectable printer heads.

FIG. 21 depicts an optional embodiment of a three dimensional printer with selectable printer heads. In the depicted embodiment, a print arm 1400 is capable of attaching to printer head 1402 at universal connection 1404. An appropriate consumable material 1406, such as a continuous core reinforced filament, may already be fed into the printer head 1402, or it may be fed into the printer after it is attached to the printer arm 1400. When another print material is desired, print arm 1400 returns printer head 1402 to an associated holder. Subsequently, the printer may pick up printer head 1408, 1410 or 1412 which are capable of printing consumable materials that are either different in size and/or include different materials to provide different.

Figure 22:
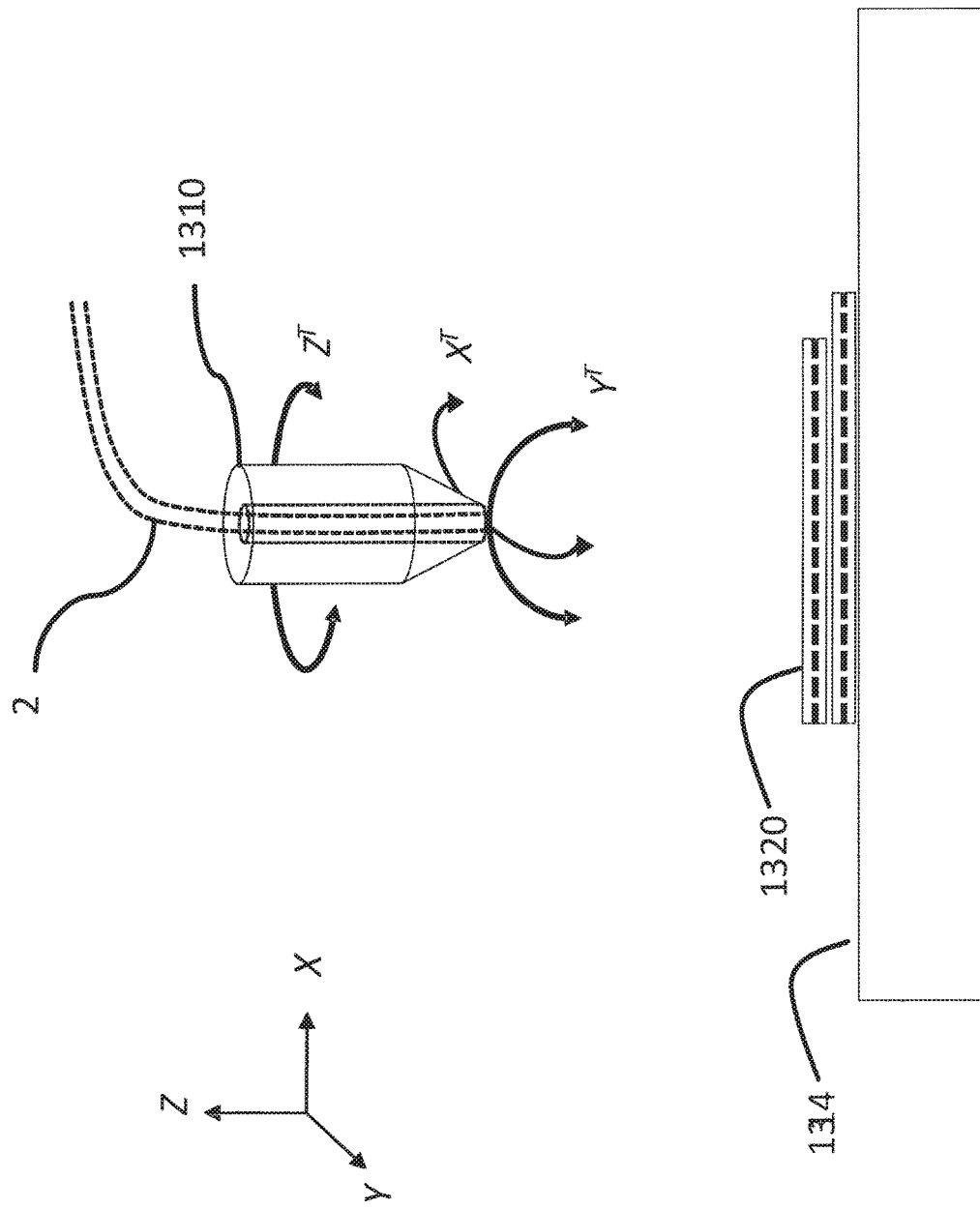
FIG. 22 is a schematic representation of a three dimensional printing system using a continuous core reinforced filament.
Figure 23:
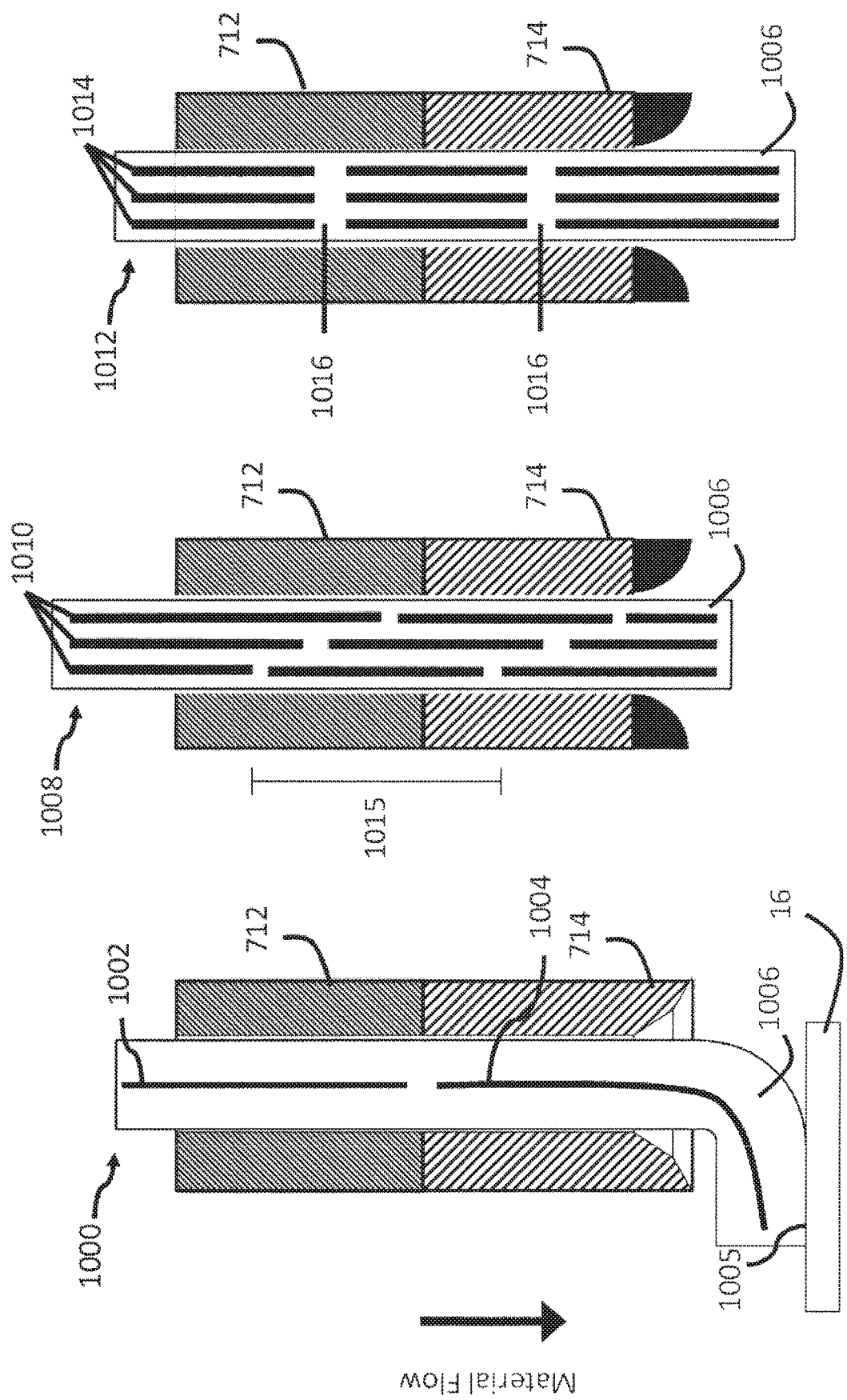
FIG. 23A is a schematic representation of a semi-continuous core filament positioned within a deposition head.
FIG. 23B is a schematic representation of a semi-continuous core filament with overlapping strands positioned within a nozzle.
FIG. 23C is a schematic representation of a semi-continuous core filament with aligned strands and positioned within a nozzle.

FIG. 22 shows a three dimensional printer head 1310 used to form a part including a three dimensionally printed shell. The printer head 1310 first deposits a series of layers 1320 (which may be fiber-reinforced or pure resin, or any combination) to build a part. The printer head 1310 is capable of articulating in the traditional XYZ directions, as well as pivoting in the XT, YT and ZT directions.

Figure 24:
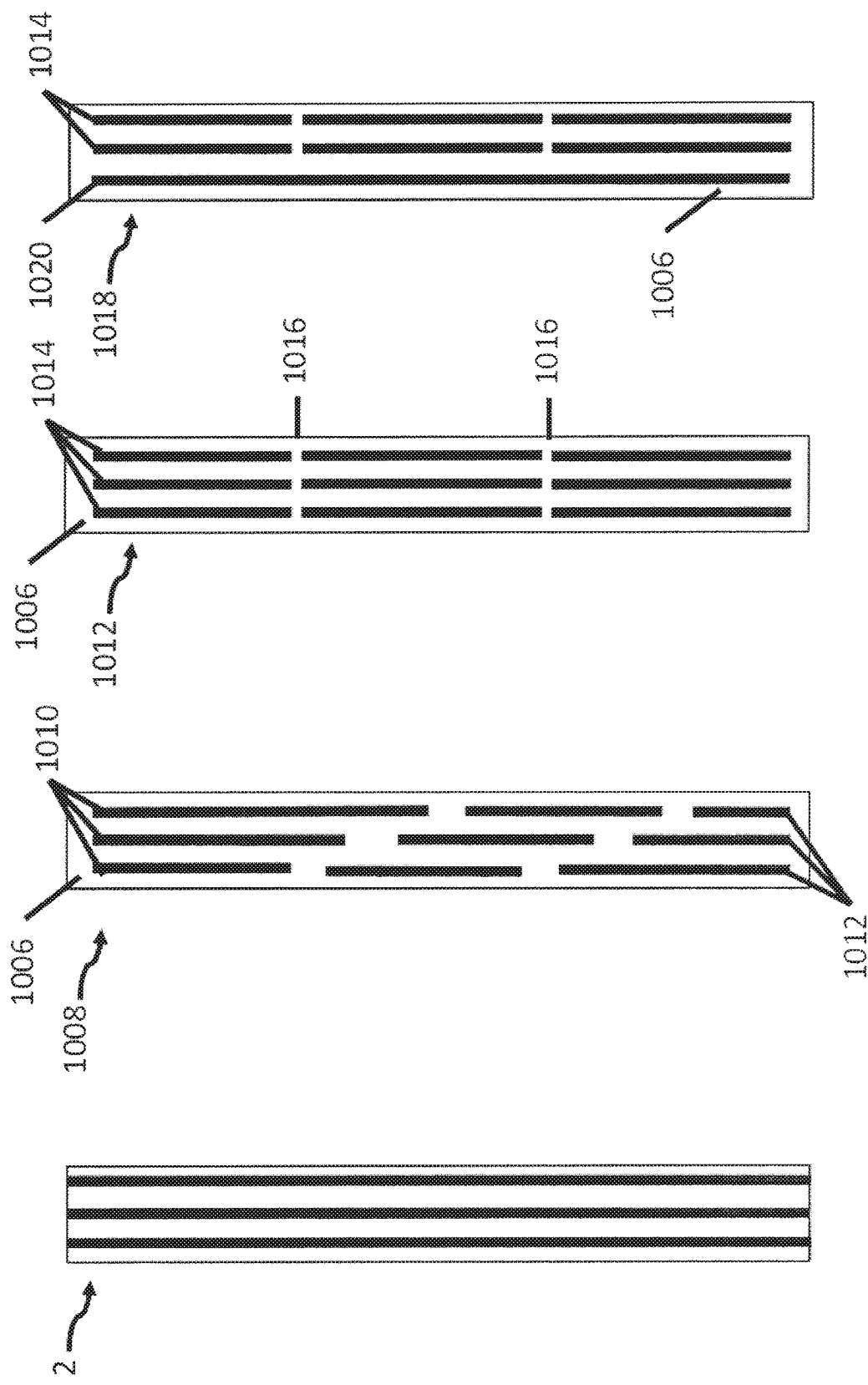
FIG. 24A is a schematic representation of a multifilament continuous core.
FIG. 24B is a schematic representation of a semi-continuous core filament with offset strands.
FIG. 24C is a schematic representation of a semi-continuous core filament with aligned strands.
FIG. 24D is a schematic representation of a semi-continuous core filament with aligned strands and one or more continuous strands.

FIGS. 23A-24D depict various embodiments of a semi-continuous strand core filament being deposited from a nozzle, as contrasted to the continuous strand core filament 2 depicted in FIG. 24A.

Semi-continuous strands embedded in a corresponding matrix material may also have discrete, indexed strand lengths, where termination of the semi-continuous core occurs at pre-defined intervals along the length of the filament (and the strand length may be larger than a length of the melt zone of an associated conduit nozzle). A semi-continuous strand core might include individual strands or strand bundles arranged in 3-inch (e.g., 2 to 5 inch) lengths, cleanly separated such that the fibers from one bundle about the next bundle but do not extend into the next bundle. A path planning algorithm controlled by the controller 20 may align breaks in the strand with ends, corners, edges and other stopping points in the print. Given a printer without a cutter and using indexed strands cannot terminate the printing process until an indexed break in the semi-continuous strand is aligned with the nozzle eyelet or outlet, the controller 20 optionally fills in areas below the minimum feature length with resin. For example, in many geometries, the outer portion of the cross section provides more strength than the core. In such cases, the outer section may be printed from semi-continuous strands up until the last integer strand will not fit in the printing pattern, at which point the remainder may be left empty, or filled with pure resin.

As depicted in FIG. 23A, a semi-continuous core filament 1000 including a first strand 1002 and a second strand 1004 located within the matrix 1006. The filament 1000 enters a cold feeding zone 712 of a conduit nozzle below the glass transition temperature of the matrix. The filament 1000 subsequently flows through heated or melt zone 714. The matrix 1006 in the filament 1000 is melted within the heated zone 714 prior to deposition. Upon exit from the nozzle, filament 1000 is attached to a part or build platen 16 at anchor point 1005. Severance may occur by moving the print head forward relative to the anchor point 1005, without advancing the semi-continuous core filament 1000; or alternatively the print head may remain stationary, and the upstream semi-continuous core filament 1000 is retracted to apply the desired tension. The tension provided by the anchor point 1005 permits the remaining portion of the second strand 1004 located within the conduit nozzle to pull the remnant of the embedded strand from the heated nozzle.

Figure 25:
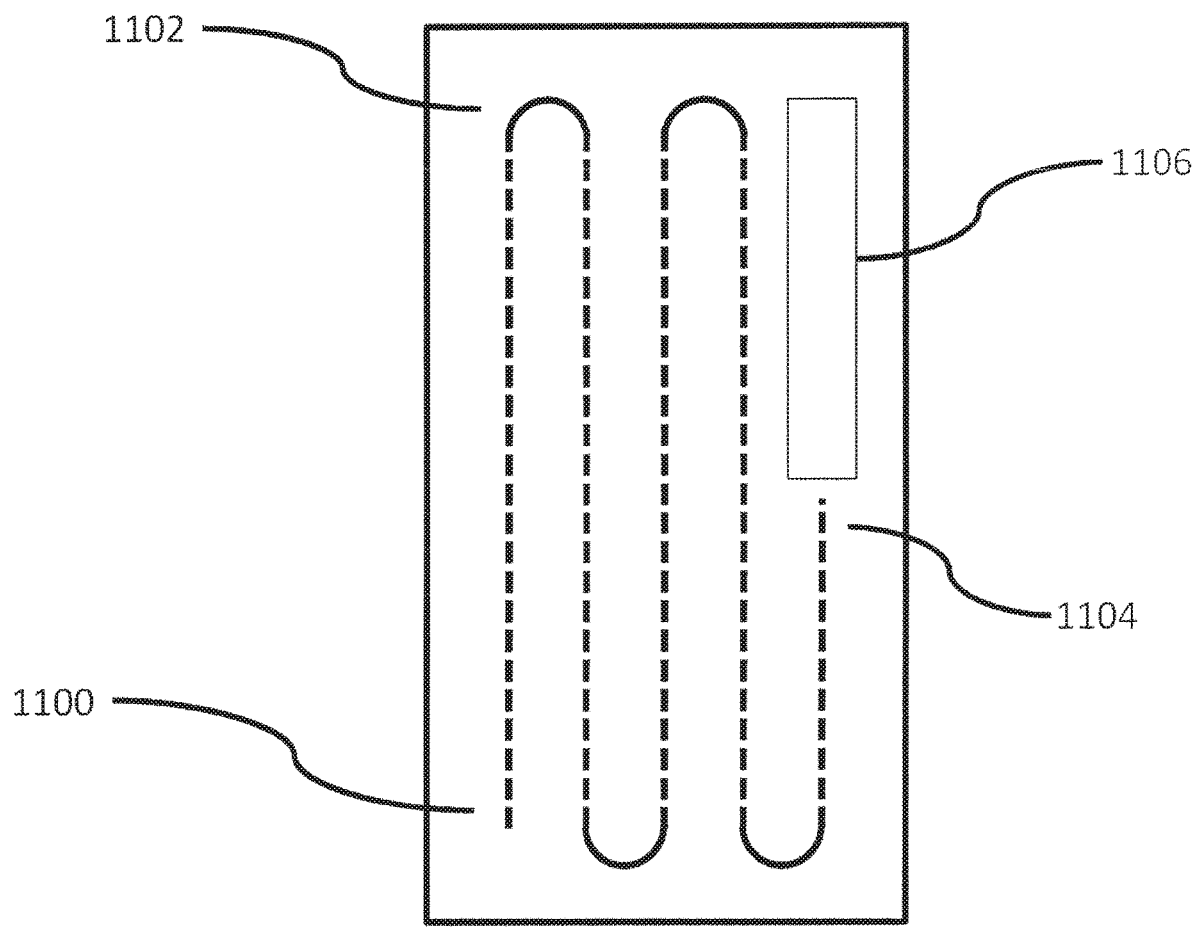
FIG. 25 is a schematic representation of a fill pattern using a semi-continuous core filament.

FIGS. 23C and 24C shows an indexed semi-continuous core filament 1012 where the termination of the core material is substantially complete at each section, thereby enabling clean severance at an integer distance. The individual sections of core material are separated from adjacent sections of core material at pre-indexed locations 1016. The material will exhibit a reduced strength (e.g., compared to bonded ranks including embedded fiber) at boundary locations corresponding to the pre-indexed locations 1016 depicted in the figures. FIG. 25 illustrates the use of such a semi-continuous core filament. As depicted in the figure, multiple strands 1100 are deposited onto a part or build platen. The strands 1100 are deposited such that they form turns 1102 as well as other features until the print head makes it final pass and severs the material at 1104 as described above. Since the individual strands are longer than the remaining distance on the part, the remaining distance 1106 may either be left as a void or filled with a separate material such as a polymer.

While FIG. 23A showed two individual strands, FIGS. 23B and 24B show a semi-continuous core filament 1008 including a distribution of similarly sized strands 1010 embedded in a matrix 1006. While three strands are shown in a staggered line, this is a simplified representation of a random, or staggered, distribution of strands. For example, material may include about 1,000 strands of carbon fiber (the fiber bundle termed a "lk tow", although in the present discussion this tow must be appropriately, void-free, embedded in a thermoplastic matrix as discussed herein). The strands 214 may be sized and distributed such that there are many overlapping strands of substantially similar length. As such, a semi-continuous strand filament may include segments sized relative to a melt zone of a printer conduit nozzle such that the individual strands may be pulled out of the outlet of the conduit nozzle. The melt zone could be at least as long as the strand length of the individual fibers in a pre-preg fiber bundle, or half as long as the strand length of the individual fibers in a pre-preg fiber bundle. During tensioning of the material to separate the filament, the strands embedded in a part or adhered to a printing surface provide an anchoring force to pull out a portion of the strands remaining within the nozzle. For long strands, some strands may be retained within the nozzle, which may result in vertically oriented strands, optionally pushed over by the print head, or optionally subsequently deposited layers placed strategically as vertically oriented strands within a material layer.

A material may combine indexed and overlapping strands. For example, indexed continuous strands may be used, in parallel with smaller length bundles located at transition points between the longer strands, such that the melt zone in the conduit nozzle includes sufficient distance to drag out the overlapping strands located in the melt zone. The advantage of this approach is to reduce the weak point at the boundary between the longer integer continuous strands. During severance of a given core and matrix material, it is desirable that the severance force is sufficiently low to prevent part distortion, lifting, upstream fiber breaking, or other deleterious effects. In some cases, strands may be broken during the extraction, which is acceptable at the termination point. While the strand length can vary based on the application, typical strand lengths may range from about 0.2" up to 36" for large scale printing.

FIG. 24D shows an example of a hybrid approach between a semi-continuous core filament and a continuous core filament. In the depicted embodiment, a material 1018 includes multiple discrete sections including one or more core segments 1014 embedded within a matrix 1006 that are located at pre-indexed locations similar to the embodiment described above in regards to FIGS. 24C and 25C. The material also includes a continuous core 1020 embedded within the matrix 1006 extending along a length of material. The continuous core −1−0±0 may be sized such that it may be severed by a sufficient tensile force to enable severing of the material at the pre-indexed locations simply by the application of a sufficient tensile force. Alternatively, any of the various cutting methods described above might also be used.

Figure 26:
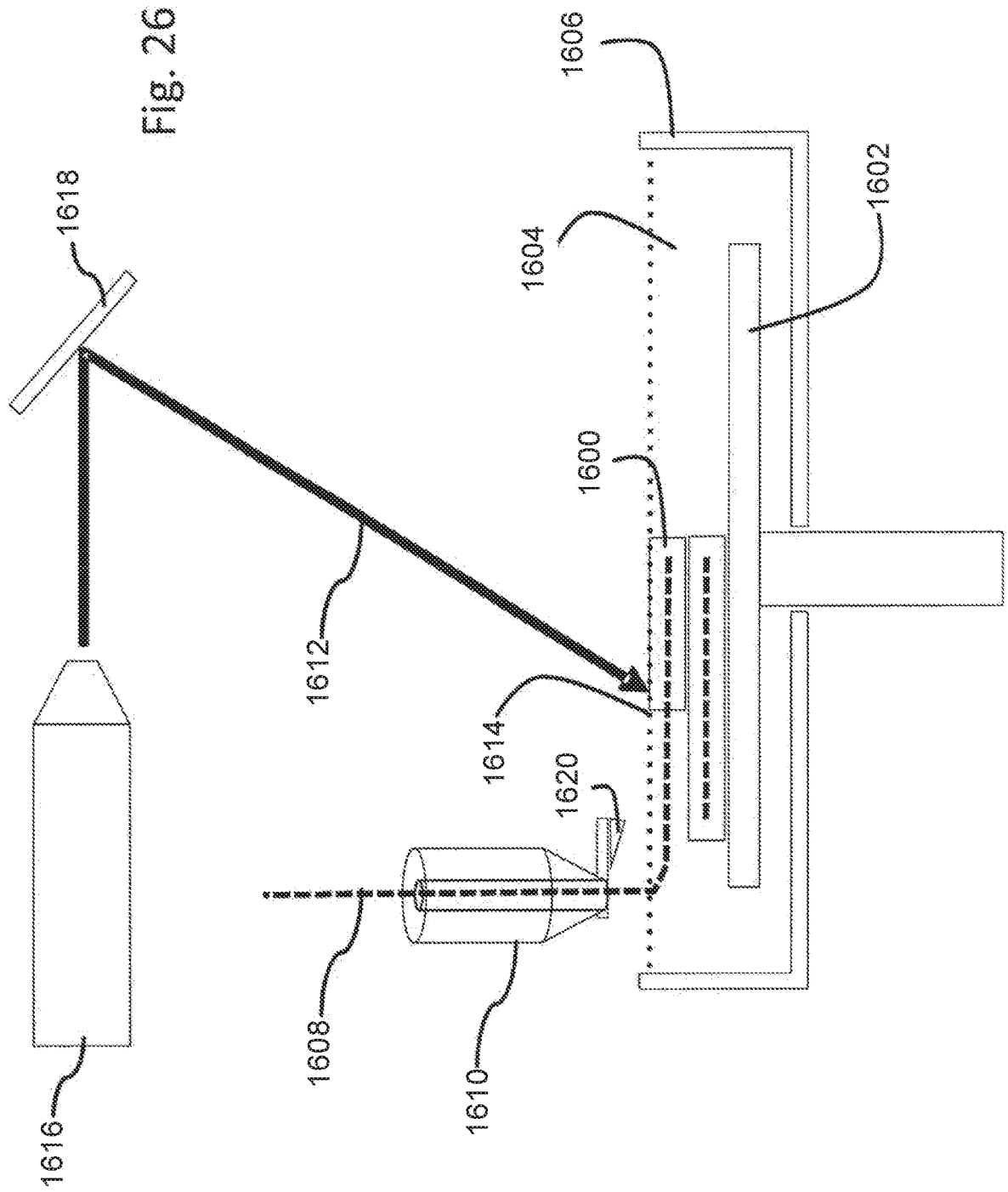
FIG. 26 is a schematic representation of a stereo-lithography three dimensional printing process including deposited reinforcing fibers.

Successive layers of composite may, like traditional lay-up, be laid down at 0°, 45°, 90°, and other desired angles to provide part strength in multiple directions and to increase the strength-to-weight ratio. The controller 20 may be controlled to functionality to deposit the reinforcing fibers with an axial alignment in one or more particular directions and locations. The axial alignment of the reinforcing fibers may be selected for one or more individual sections within a layer, and may also be selected for individual layers. For example, as depicted in FIG. 26 a first layer 1200 may have a first reinforcing fiber orientation and a second layer 1202 may have a second reinforcing fiber orientation. Additionally, a first section 1204 within the first layer 1200, or any other desired layer, may have a fiber orientation that is different than a second section 1206, or any number of other sections, within the same layer.

Although one embodiment or aspect of the invention uses thermoplastic matrix, hybrid systems are possible. A reinforced filament may employ a matrix that is finished by curing cycle, e.g., using heat, light, lasers, and/or radiation. For example, continuous carbon fibers are embedded in a partially cured epoxy such that the extruded component sticks together, but requires a post-cure to fully harden. Similarly, while one embodiment or aspect of the invention use preformed continuous core reinforced filaments, in some embodiments, the continuous core reinforced filament may be formed by combining a resin matrix and a solid continuous core in a heated extrusion nozzle. The resin matrix and the solid continuous core are able to be combined without the formation of voids along the interface due to the ease with which the resin wets the continuous perimeter of the solid core as compared to the multiple interfaces in a multistrand core. Therefore, such an embodiment may be of particular use where it is desirable to alter the properties of the deposited material.

FIG. 26 depicts a hybrid system employing stereolithography (and/or selective laser sintering) to provide the matrix about the embedded fiber, i.e. processes in which a continuous resin in liquid or powder form is solidified layer by layer by sweeping a focused radiation curing beam (laser, UV) in desired layer configurations. In order to provide increased strength as well as the functionalities associated with different types of continuous core filaments including both solid and multistrand materials, the stereolithography process associated with the deposition of each layer can be modified into a two-step process that enables construction of composite components including continuous core filaments in desired locations and directions. A continuous core or fiber may be deposited in a desired location and direction within a layer to be printed, either completely or partially submerged in the resin. After the continuous fiber is deposited in the desired location and direction, the adjoining resin is cured to harden around the fiber. This may either be done as the continuous fiber is deposited, or it may be done after the continuous fiber has been deposited. In one embodiment, the entire layer is printed with a single continuous fiber without the need to cut the continuous fiber. In other embodiments, reinforcing fibers may be provided in different sections of the printed layer with different orientations. In order to facilitate depositing the continuous fiber in multiple locations and directions, the continuous fiber may be terminated using a cutter as described herein, or by the laser that is used to harden the resin.

FIG. 26 depicts a part 1600 being built on a platen 1602 using stereolithography. The part 1600 is immersed in a liquid resin (photopolymer) material 1604 contained in a tray 1606. During formation of the part 1600, the platen 1602 is moved by a layer thickness to sequentially lower after the formation of each layer to keep the part 1600 submerged. During the formation of each layer, a continuous core filament 1608 is fed through a conduit nozzle 1610 and deposited onto the part 1600. The conduit nozzle 1610 is controlled to deposit the continuous core filament 1608 in a desired location as well as a desired direction within the layer being formed. The feed rate of the continuous core filament 1608 may be equal to the speed of the conduit nozzle 1610 to avoid disturbing the already deposited continuous core filaments. As the continuous core filament 1608 is deposited, appropriate electromagnetic radiation (e.g., laser 1612) cures the resin surrounding the continuous core filament 1608 in a location 1614 behind the path of travel of the conduit nozzle 1610. The distance between the location 1614 and the conduit nozzle 1610 may be selected to allow the continuous core filament to be completely submerged within the liquid resin prior to curing. The laser is generated by a source 1616 and is directed by a controllable mirror 1618. The three dimensional printer also includes a cutter 1620 to enable the termination of the continuous core filament as noted above.

Figure 27:
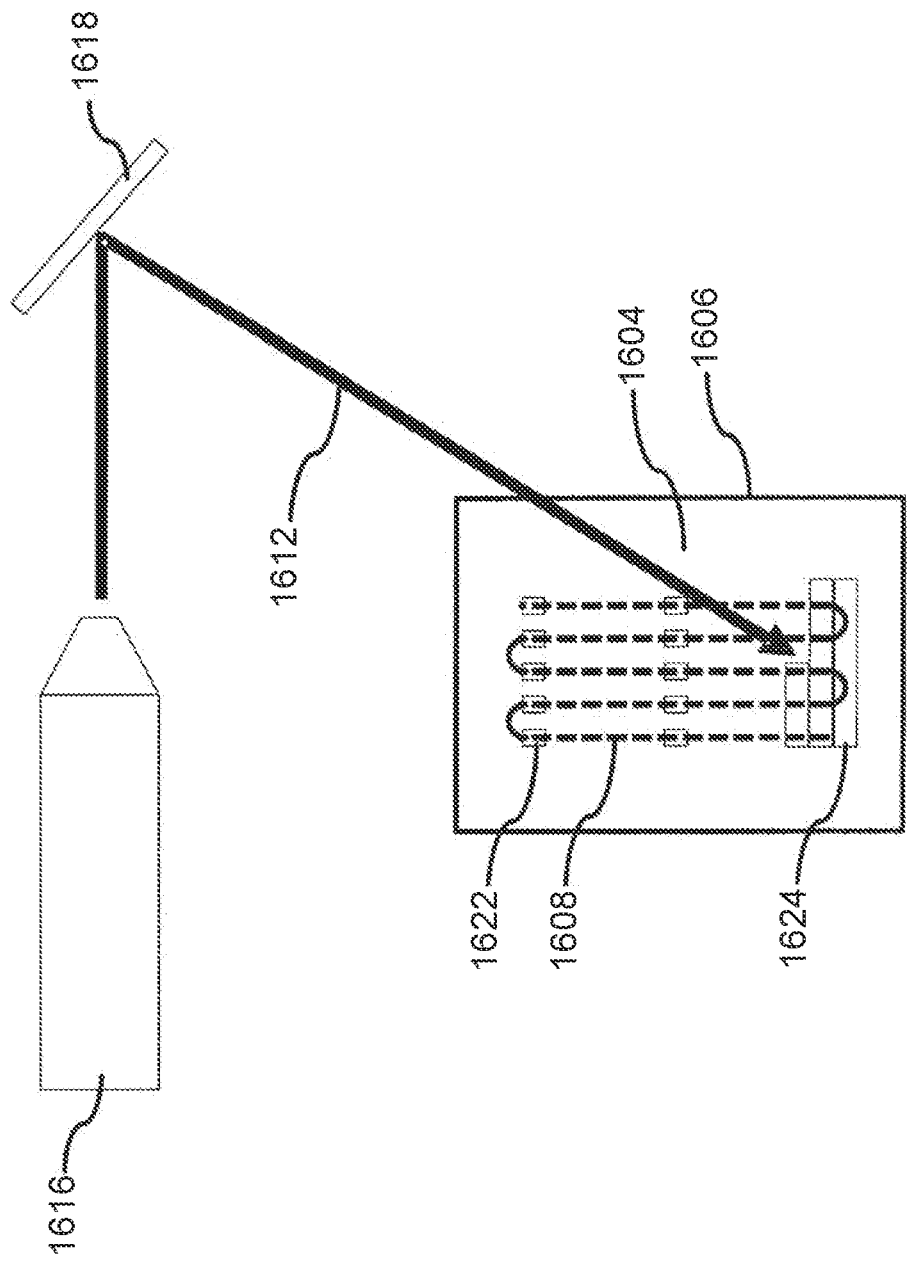
FIG. 27 is a schematic representation of a stereo lithography three-dimensional printing process including deposited reinforcing fibers.

Optionally, the deposited filament is held in place by one or more "tacks", which are a sufficient amount of hardened resin material that holds the continuous core filament in position while additional core material is deposited. As depicted in FIG. 27, the continuous core filament 1608 is tacked in place at multiple discrete points 1622 by the laser 1612 as the continuous core filament is deposited by a nozzle, not depicted. After depositing a portion, or all, of the continuous core filament 1608, the laser 1612 is directed along a predetermined pattern to cure the liquid resin material 1604 and form the current layer. Similar to the above system, appropriate electromagnetic radiation (e.g., laser 1612), is generated by a source 1616 and directed by a controllable mirror 1618. The balance of the material can be cured to maximize cross linking between adjacent strands is maximized, e.g., when a sufficient number of strands has been deposited onto a layer and tacked in place, the resin may be cured in beads that are perpendicular to the direction of the deposited strands of continuous core filament. Curing the resin in a direction perpendicular to the deposited strands may provide increased bonding between adjacent strands to improve the part strength in a direction perpendicular to the direction of the deposited strands of continuous core filament. If separate portions of the layer include strands of continuous core filament oriented in different directions, the cure pattern may include lines that are perpendicular or parallel to the direction of the strands of continuous fibers core material in each portion of the layer.

To avoid the formation of voids along the interface between the continuous core filament and the resin matrix during the stereolithography process, it may be desirable to facilitate wetting or wicking. Wetting of the continuous fiber and wicking of the resin between the into the cross-section of the continuous multistrand core may be facilitated by maintaining the liquid resin material at an elevated temperature, for a certain amount of time, using a wetting agent on the continuous fiber, applying a vacuum to the system, or any other appropriate method.

In addition to using the continuous core reinforced filaments to form various composite structures with properties in desired directions using the fiber orientation, in some embodiments it is desirable to provide additional strength in directions other than the fiber direction. For example, the continuous core reinforced filaments might include additional composite materials to enhance the overall strength of the material or a strength of the material in a direction other than the direction of the fiber core. For example, carbon fiber core material may include substantially perpendicularly loaded carbon nanotubes. Loading substantially perpendicular small fiber members on the core increases the shear strength of the composite, and advantageously increases the strength of the resulting part in a direction substantially perpendicular to the fiber direction. Such an embodiment may help to reduce the propensity of a part to delaminate along a given layer.

The composition of the two polymer matrix binders used in the internal portion and outer coating of a composite filament may differ by one or more of the following factors: polymer molecular weight, polymer weight distribution, degree of branching, chemical structure of the polymer chain and polymer processing additives, such as plasticizers, melt viscosity modifiers, UV stabilizers, thermal stabilizers, optical brighteners, colorants, pigments or fillers.

In another embodiment, it is desirable to increase the bonding strength with a build platform to help prevent lifting off of a part, or section of a part, from the build platform. Consequently, in some embodiments, a surface energy modifier is applied to the build platform to facilitate the adhesion of the extruded filament to said platform. In some embodiments, the noted adhesion modification is used to increase the adhesion of the first bonding layer to the build platform in a few key areas, such as the corners of a box, thereby causing greater adhesion where the part is most likely to peel up from the platform. The center of the box, however, may be substantially free of surface energy modifiers to facilitate easy removal.

In some embodiments, a continuous core, such as continuous carbon fibers, is combined with a semi-aromatic polyamides and/or a semi-aromatic polyamide blends with linear polyamides which exhibit excellent wetting and adhesion properties to the noted continuous carbon fibers. Examples of such semi-aromatic polyamides include blends of semi-aromatic and linear polyamides from EMS-Grivory, Domat/Ems, Switzerland, such as Grivory HT], Grivory HT2, Grivory HT3 and other similar blends. By combining continuous reinforced fiber towpregs with high-temperature melting and fiber wetting polyamides and their blends, parts may be manufactured which are characterized by exceptional mechanical strength and long-term temperature stability at use temperatures 120 degrees C. and higher while ensuring extrudability of the composite tow, excellent fiber-matrix wettability, complete fiber towpreg permeation with the resin and excellent shear strength at the fiber-matrix interface.

Appropriate rheological pretreatments of a continuous core include the use of a low viscosity or high melt flow index resins or polymer melts. Additionally, polymers exhibiting low molecular weights and/or linear chains may be used. Polymers exhibiting a sharp melting point transition with a large change in viscosity might also be used. Such a transition is a typical property exhibited by polyamides.

Appropriate fiber wetting pretreatments may include precluding the fiber surfaces with a very thin layer of the same or similar polymer from a dilute polymer solution followed by solvent evaporation to obtain a like-to-like interaction between the melt and the fiber surface. Polymer or resin solutions in neutral and compatible solvents can have concentrations from about 0.1 wt.-% to 1 wt.-% or higher. Additionally, one or more surface activation methods may be used to introduce or change the polarity of the fiber surface and/or to introduce chemically reactive surface groups that would affect wetting/impregnation (contact angle) and adhesion (matrix-fiber interfacial shear strength) by physically or chemically bonding the polymer matrix with the fiber surface. The fiber surface may also be chemically activated using: activation methods in gas and liquid phase, such as silanization in the presence of hexamethyldisilizane (HMDS) vapors, especially at elevated temperatures; and solvent-phase surface modification using organosilicon or organotitanium adhesion promoters, such as tris (ethoxy)-3-aminopropylsilane, tris(ethoxy) glycidyl silane, tetraalkoxytitanates and the like.

It should be noted that specific measurements given herein may have the following approximate SI equivalents.

| Imperial | SI | Imperial | SI |
|---|---|---|---|
| "5-8 thou" = 0.005"-0.008" | 0.1-0.2 mm | "1-2 thou" = 0.001"-0.002" | 0.025 to 0.05 mm |
| "63 thou" = 0.063" | 1.6 mm (1.2-2.0 mm) | "40 thou" = 0.040" | 1.0 mm (0.8-1.2 mm) |
| "13 thou" = 0.013" | 0.3-0.4 mm | "28 thou" = 0.028" | 0.7 mm (0.6-0.8 mm) |
| "50 thou" = 0.050" | 1.2-1.4 mm | "32 thou" – 0.032" | 0.8 mm (0.7-0.9 mm) |

What is claimed is:

1. A method for additive manufacturing using a three-dimensional printer comprising at least one linear feed mechanism and a print head positioned proximate a build platen, the method comprising:
feeding an unmelted fiber reinforced composite filament to the print head at a feed rate by the at least one linear feed mechanism;
heating the filament to a temperature at which a matrix material therein flows within at least one rounded outlet of the print head;
moving the print head and the build platen relative to one another at a printing rate;
applying a spreading force to the filament between the at least one rounded outlet of the print head and the build platen; and
controlling a differential in the feed rate and printing rate using the at least one linear feed mechanism so that the feed rate and the printing rate are substantially the same.

2. The method of claim 1, wherein one or both of the feed rate and/or printing rate are set to apply a neutral to positive tension force through a fiber strand of the filament and unmelted matrix of the filament.

3. The method of claim 1, wherein one or both of the feed rate and/or printing rate are set to apply a neutral to positive tension force through a fiber strand of the filament and the build platen.

4. The method of claim 1, further comprising adjusting the feed rate and/or printing rate using a controller operatively coupled to the three-dimensional printer.

5. The method of claim 4, wherein adjusting the feed rate and/or printing rate includes adjusting the feed rate to be less than the printing rate.

6. The method of claim 1, wherein the at least one linear feed mechanism comprises at least one of frictional rollers, a conveyor, a feeding track, a gravity feed, or a hydraulic feed.

7. The method of claim 6, wherein the frictional rollers comprise a drive roller and an idle roller.

8. The method of claim 1, wherein applying the spreading force includes applying the spreading force using an ironing lip or an ironing tip of the print head.

9. The method of claim 1, further comprising cutting the fiber reinforced composite filament at a predetermined termination point.

10. A method for additive manufacturing using a three-dimensional printer comprising at least one linear feed mechanism and a print head positioned proximate a build platen, the method comprising:
providing a fiber reinforced composite filament at a feed rate to the print head, the feed rate applied by the at least one linear feed mechanism;
moving the print head and the build platen relative to one another at a printing rate;
controlling a differential in the feed rate and printing rate along the filament using the at least one linear feed mechanism so that the feed rate and printing rate are substantially the same; and
applying a spreading force to the filament between the print head and the build platen.

11. The method of claim 10, wherein controlling the differential in the feed rate and printing rate along the filament includes absorbing the differential between the feed rate and the printing rate along the filament using the at least one linear feed mechanism.

12. The method of claim 10, further comprising setting one or both of the feed rate and the printing rate to maintain a neutral to positive tension in the fiber reinforced composite filament between the print head and a part being printed.

13. The method of claim 10, further comprising providing a compressive force to the fiber reinforced composite filament at a position downstream of the at least one linear feed mechanism.

14. The method of claim 10, further comprising adjusting the feed rate and/or printing rate using a controller operatively coupled to the three-dimensional printer.

15. The method of claim 14, wherein adjusting the feed rate and/or printing rate includes adjusting the feed rate to be less than the printing rate.

16. The method of claim 10, wherein the at least one linear feed mechanism comprises at least one of frictional rollers, a conveyor, a feeding track, a gravity feed, or a hydraulic feed.

17. The method of claim 16, wherein the frictional rollers comprise a drive roller and an idle roller.

18. The method of claim 10, wherein applying the spreading force includes applying the spreading force using an ironing lip or an ironing tip of the print head.

19. The method of claim 10, further comprising cutting the fiber reinforced composite filament at a predetermined termination point.

* * * * *